US011348173B2

(12) United States Patent
Bauerschmidt et al.

(10) Patent No.: US 11,348,173 B2
(45) Date of Patent: *May 31, 2022

(54) DETECTION OF INTRA-FIRM MATCHING AND RESPONSE THERETO

(71) Applicant: Chicago Mercantile Exchange Inc., Chicago, IL (US)

(72) Inventors: Paul Andrew Bauerschmidt, Glenview, IL (US); Ari L. Studnitzer, Northbrook, IL (US); William J. Albert, Arlington Heights, IL (US); Paul J. Callaway, Chicago, IL (US); James W. Farrell, Wheaton, IL (US); A. Shanthi Thiruthuvadoss, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/818,648

(22) Filed: Mar. 13, 2020

(65) Prior Publication Data
US 2020/0219192 A1 Jul. 9, 2020

Related U.S. Application Data

(63) Continuation of application No. 11/601,489, filed on Nov. 17, 2006, now Pat. No. 10,628,883.
(Continued)

(51) Int. Cl.
*G06Q 40/04* (2012.01)
*G06Q 40/02* (2012.01)
(Continued)

(52) U.S. Cl.
CPC ............ *G06Q 40/04* (2013.01); *G06Q 10/10* (2013.01); *G06Q 20/381* (2013.01); *G06Q 40/00* (2013.01);
(Continued)

(58) Field of Classification Search
None
See application file for complete search history.

(56) References Cited

U.S. PATENT DOCUMENTS

| 4,980,826 A | 12/1990 | Wagner |
| 5,963,923 A | 10/1999 | Garber |

(Continued)

FOREIGN PATENT DOCUMENTS

| GB | 2417345 A | 2/2006 |
| JP | 7-506916 | 7/1995 |

(Continued)

OTHER PUBLICATIONS

CME "Glossary for Retail FX", http://www.cme.com/files/FXWebglossary.pdf; 16 pages, accessed Apr. 7, 2009.
(Continued)

*Primary Examiner* — Jason Borlinghaus
(74) *Attorney, Agent, or Firm* — Lempia Summerfield Katz LLC

(57) ABSTRACT

The disclosed systems and methods relate to allowing trading of over the counter ("OTC") foreign exchange ("FX") contracts on a centralized matching and clearing mechanism, such as that of the Chicago Mercantile Exchange's ("CME"'s) futures exchange system (the "Exchange"). The disclosed systems and methods allow for anonymous transactions, centralized clearing, efficient settlement and the provision of risk management/credit screening mechanisms to lower risk, reduce transaction costs and improve the liquidity in the FX market place. In particular, the disclosed embodiments increase speed of execution facilitating growing demand for algorithmic trading, increased price transparency, lower cost of trading, customer to customer trading, and automated asset allocations, recurring trades as well as clearing and settlement efficiencies.

20 Claims, 23 Drawing Sheets

Related U.S. Application Data

(60) Provisional application No. 60/738,246, filed on Nov. 18, 2005.

(51) Int. Cl.
*G06Q 40/08* (2012.01)
*G06Q 40/00* (2012.01)
*G06Q 40/06* (2012.01)
*G06Q 10/10* (2012.01)
*G06Q 20/38* (2012.01)

(52) U.S. Cl.
CPC .......... *G06Q 40/02* (2013.01); *G06Q 40/025* (2013.01); *G06Q 40/06* (2013.01); *G06Q 40/08* (2013.01)

(56) References Cited

U.S. PATENT DOCUMENTS

| | | |
|---|---|---|
| 6,021,397 A | 2/2000 | Jones |
| 6,279,007 B1 * | 8/2001 | Uppala .............. G06F 16/9027 |
| 6,317,727 B1 | 11/2001 | May |
| 6,321,212 B1 | 11/2001 | Lange |
| 6,347,307 B1 | 2/2002 | Sandhu et al. |
| 6,405,180 B2 | 6/2002 | Tilfors |
| 6,421,653 B1 | 7/2002 | May |
| 6,618,707 B1 | 9/2003 | Katz |
| 6,658,393 B1 | 12/2003 | Basch |
| 6,721,715 B2 | 4/2004 | Nemzow |
| 6,963,856 B2 | 11/2005 | Lutnick |
| 6,996,540 B1 | 2/2006 | May |
| 7,039,610 B2 | 5/2006 | Morano et al. |
| 7,043,457 B1 | 5/2006 | Hansen |
| 7,080,050 B1 | 7/2006 | Himmelstein |
| 7,089,206 B2 | 8/2006 | Martin |
| 7,130,789 B2 | 10/2006 | Glodjo |
| 7,177,833 B1 | 2/2007 | Marynowski |
| 7,194,481 B1 | 3/2007 | Van Roon |
| 7,734,538 B2 | 6/2010 | Bauerschmidt |
| 7,801,810 B2 | 9/2010 | Glinberg et al. |
| 7,809,631 B2 | 10/2010 | Bauerschmidt et al. |
| 7,930,245 B2 | 4/2011 | Glinberg |
| 8,086,527 B2 | 12/2011 | Bauerschmidt |
| 2001/0014875 A1 | 8/2001 | Young |
| 2001/0042785 A1 | 11/2001 | Walker |
| 2001/0056398 A1 | 12/2001 | Scheirer |
| 2002/0002530 A1 | 1/2002 | May |
| 2002/0035531 A1 | 3/2002 | Push |
| 2002/0046152 A1 | 4/2002 | Kinney |
| 2002/0052827 A1 | 5/2002 | Waelbroeck |
| 2002/0070915 A1 | 6/2002 | Mazza |
| 2002/0077947 A1 | 6/2002 | Ward |
| 2002/0099651 A1 | 7/2002 | May |
| 2002/0116314 A1 | 8/2002 | Spencer |
| 2002/0116315 A1 | 8/2002 | May |
| 2002/0156719 A1 | 10/2002 | Finebaum |
| 2002/0169774 A1 | 11/2002 | Greenbaum |
| 2002/0178102 A1 | 11/2002 | Scheinberg |
| 2002/0184134 A1 | 12/2002 | Olsen |
| 2003/0001877 A1 * | 1/2003 | Duquesnois ........... H04N 19/25 715/716 |
| 2003/0009419 A1 | 1/2003 | Chavez |
| 2003/0023542 A1 | 1/2003 | Kemp |
| 2003/0033240 A1 | 2/2003 | Balson et al. |
| 2003/0050879 A1 | 3/2003 | Rosen |
| 2003/0093360 A1 | 5/2003 | May |
| 2003/0125982 A1 | 7/2003 | Ginsberg |
| 2003/0200167 A1 | 10/2003 | Kemp |
| 2003/0220868 A1 | 11/2003 | May |
| 2003/0229571 A1 | 12/2003 | May |
| 2003/0236737 A1 | 12/2003 | Kemp |
| 2004/0015430 A1 | 1/2004 | May |
| 2004/0015431 A1 | 1/2004 | May |
| 2004/0024691 A1 | 2/2004 | Satow |
| 2004/0024692 A1 | 2/2004 | Turbeville |
| 2004/0049738 A1 | 3/2004 | Thompson |
| 2004/0064395 A1 | 4/2004 | Mintz |
| 2004/0093300 A1 | 5/2004 | Burns |
| 2004/0103054 A1 | 5/2004 | Singer |
| 2004/0148242 A1 | 7/2004 | Liu |
| 2004/0153391 A1 | 8/2004 | Burns |
| 2004/0153392 A1 | 8/2004 | West |
| 2004/0153393 A1 | 8/2004 | West |
| 2004/0153394 A1 | 8/2004 | West |
| 2004/0172337 A1 | 9/2004 | Spoonhower |
| 2004/0177302 A1 | 9/2004 | Mori |
| 2004/0186806 A1 | 9/2004 | Sinclair |
| 2004/0210514 A1 | 10/2004 | Kemp |
| 2004/0236662 A1 | 11/2004 | Korhammer et al. |
| 2004/0254804 A1 | 12/2004 | Peterffy |
| 2004/0260640 A1 | 12/2004 | Crosthwaite |
| 2004/0267758 A1 * | 12/2004 | Katsurashima ....... G06F 16/184 |
| 2005/0044027 A1 | 2/2005 | Rodgers |
| 2005/0080703 A1 | 4/2005 | Chiesa |
| 2005/0086152 A1 | 4/2005 | Sweeting |
| 2005/0097027 A1 | 5/2005 | Kavanaugh |
| 2005/0137964 A1 | 6/2005 | Nordlicht |
| 2005/0152538 A1 * | 7/2005 | Stedron .................. H04L 9/065 380/28 |
| 2005/0171890 A1 | 8/2005 | Daley |
| 2005/0171894 A1 | 8/2005 | Traynor |
| 2005/0246263 A1 | 11/2005 | Ogg |
| 2005/0283422 A1 | 12/2005 | Myr |
| 2006/0059064 A1 | 3/2006 | Glinberg |
| 2006/0059065 A1 | 3/2006 | Glinberg |
| 2006/0059066 A1 | 3/2006 | Glinberg |
| 2006/0059067 A1 | 3/2006 | Glinberg |
| 2006/0059068 A1 | 3/2006 | Glinberg |
| 2006/0059069 A1 | 3/2006 | Glinberg |
| 2006/0095363 A1 | 5/2006 | May |
| 2006/0173761 A1 | 8/2006 | Costakis |
| 2006/0173771 A1 | 8/2006 | Johnston |
| 2006/0190371 A1 | 8/2006 | Almgren |
| 2006/0190383 A1 | 8/2006 | May |
| 2006/0218071 A1 | 9/2006 | Sweeting |
| 2006/0224494 A1 | 10/2006 | Pinkava |
| 2006/0265296 A1 | 11/2006 | Glinberg |
| 2007/0011079 A1 | 1/2007 | May |
| 2007/0239591 A1 | 10/2007 | May |
| 2007/0282733 A1 | 12/2007 | May |
| 2008/0077320 A1 | 3/2008 | Loftus |
| 2010/0312720 A1 | 12/2010 | Glinberg |

FOREIGN PATENT DOCUMENTS

| | | |
|---|---|---|
| JP | 11-507150 | 6/1999 |
| JP | 2002207881 A | 7/2002 |
| JP | 2003050912 A | 2/2003 |
| JP | 2003-536170 | 12/2003 |
| JP | 2004021906 A | 1/2004 |
| JP | 2004234197 A | 8/2004 |
| WO | 9315467 | 8/1993 |
| WO | WO9641293 A1 | 12/1996 |
| WO | WO0111518 A8 | 11/2001 |
| WO | WO0198968 A8 | 12/2001 |
| WO | WO2004042514 A3 | 5/2004 |
| WO | WO2005041079 A2 | 5/2005 |

OTHER PUBLICATIONS

CME EOS Trader™ Enhancements: Credit Controls, Chicago Mercantile Exchange, Inc., Mar. 25, 2007, 3 pages.

CME® Clearing Services "CME and LCH", advisory notice, obtained from http://www.web.archive.org/web/20050306002321/http://www.cme.com/clearing/rmspan/cm/lch . . . last accessed Feb. 22, 2007, 1 page.

CME® Foreign Exchange Products "Trading CME FX Futures: Maximizing the Opportunity for the Individual Investor", 6 pages © 2005.

Decision of Refusal from corresponding Japanese Patent Application No. 2008-541147, 2 pages., dated Oct. 30, 2013.

EP Examination Report in EP Application No. 06838080.7, dated Jan. 12, 2016.

(56) References Cited

OTHER PUBLICATIONS

Examiner's Report from corresponding Canadian Patent Application No. CA 2,626,935, 5 pages, dated Jul. 3, 2013.
Examiner's Report from corresponding Canadian Patent Application No. CA 2,628,879, 4pp., dated Jan. 3, 2014.
Hall "Getting Started in Stocks", Third Edition; Google Book Search; http://books.google.com/books?id=mA-sSkmBsC&dg=margin+account+maintenance . . . , Sep. 26, 2008; pp. 105-114; Coughlan Publishing; 1997.
Hiroshi Yonemura, Theory of Monetary Economics and Securities for Investment Engineering, Mar. 29, 2001, Toyo Keizai Inc., pp. 53-55.
http://wvvw.rulebook.cme.com/Rulebook/utilityes/allPositionlimits.html, CME Rulebook—Position Limits and Accountability for All Products, Chicago Mercantile Exchange, Inc., 40 pages.
http://www.cbot.com/cbot/pub/con_detail/0,3206,1032+42998,00.html, Position Limits in Treasury Futures for Dec. 2006 Contracts, Chicago Board of Trade, 1 page.
http://www.cftc.gov/index.htm, U.S. Commodity Futures Trading Commission, "What's New at the CFTC", Mar. 18, 2009, 2 pages.
http://www.cftc.gov/industryoversight/clearingorganizations.index.htm, Clearing Organizations, Jun. 17, 2008, 2 pages.
http://www.cftc.gov/industryoversight/contractsandproducts/sfpspeculativelimits.html, SecurityFutures Products Speculative Position Limits, Jul. 26, 2007, U.S. Commodity Futures TradingCommission, 1 page.
http://www.cftc.gov/industryoversight/tradingorganizations/index.htm3, "Trading Organizations",Nov. 9, 2007, 1 page.
http://www.investopedia.com/terms/p/positionlimit.asp, Position Limit, Mar. 19, 2009, 4 pages.
International Search Report, PCT/IB04/52236, dated Mar. 23, 2006.
International Search Report, PCT/US06/28001, dated May 7, 2007.
International Search Report, PCT/US06/43282, dated May 30, 2008.
International Search Report, PCT/US06/44932, dated Aug. 19, 2008.
International Search Report, PCT/US08/71452, dated Oct. 7, 2008.
International Search Report, PCT/US2006/027762, dated Mar. 9, 2007.
International Search Report, PCT/US2006/044702, dated Aug. 17, 2007.
International Search Report, PCT/US2006/044917, dated Aug. 28, 2007.

Japanese Office Action, cited in corresponding Japanese patent application No. 2008-541219, 5 pages, dated Jan. 30, 2013.
Jennifer Basye Sander et al., "The Complete Idiot's Guide to Day Trading Like a Pro", Alpha Books, 1999, pp. 65-67.
Kuprianov, "Money Market Futues", Federal Reserve Bank of Richmond, Economic Review, Nov./Dec. 1992, 19 pages.
Makoto Saito, Concept and Usage of Financial Technologies, Jul. 20, 2000, Yuhikaku Publishing Co., Ltd., pp. 60-62.
Nina Mehta, "Fast and Furious: Risk Management in a OMA Environment", Jul./Aug. 2006 Futures Industry, 3 pages.
Nobuyuki Kitamura et al., "The Current Situations and Issues of Electronic Commerce: Birth of New Type Brokers and Their Trust Formation", Discussion Papers Series 2000 J-13, Institue for Money and Economic Studies, Bank of Japan, p. 26.
Notice—Revised Position Limits in Treasury Futures During Last Ten Trading Days, Jul. 19, 2006, Paul J. Draths—Vice President & Secretary, Chicago Board of Trade, 3 pages.
Office Action dated Feb. 2, 2012 for Canadian Application No. 2,626,935, 4 pages.
Office Action dated Mar. 21, 2012 for Japanese Application No. 2008-541147, 9 pages.
Office Action dated May 23, 2012 for Canadian Application No. 2,628,879, 3 pages.
Office Action dated May 8, 2012 for corresponding Japanese Application No. 2008-541219, 5 pages.
Office Action dated May 8, 2012 for corresponding Japanese Application No. 2008-541410, 5 pages.
Position Limits and Position Accountability, ICE Futures U.S., Feb. 15, 2008, www.theice.com, 5 pages.
Sam Y. Cross, "All About . . . the Foreign Exchange Market in the United States", Federal Bank of New York, 1998, pp. 42-60 and 121-132 of Japanese translation, pp. 21-30 and 59-66 of original version.
Sam Y. Cross, "All About . . . the Foreign Exchange Market in the United States", Federal Bank of New York, 1998, pp. 62-74 of Japanese translation, pp. 31-36 of original version.
Second Japanese Office Action, cited in corresponding Japanese patent application No. 2008-541219, 5 pages, dated Jan. 30, 2013.
Special Executive Report, Increase in Position Limits on CME Russell 2000® and e-Mini® Russell 2000 Contracts, w pages, Apr. 20, 2006, Chicago Mercantile Exchange, Inc.
Takashi Nishizawa, Introduction to FX Net-Trading, Mar. 30, 2005, Nihonbungeisha, p. 12.

\* cited by examiner

FIG. 3

Example – FX OTC Inter-bank style

| USD/CHF | SHOWN | | HIDDEN / IMPLIED PRICES | | | |
|---|---|---|---|---|---|---|
| | Bid | Offer | SWAP Leg Prices | | Outright Forward Prices | |
| Spot | 1.2882 | 1.2885 | 1.2884 | | | |
| | | | Calculated | | | |
| Fwd pt multiplier | | 0.0001 | Bid | Offer | Bid | Offer |
| | Forward points | | | | | |
| T/N | -1.12 | -1.10 | 1.288236 | 1.288240 | 1.288088 | 1.288390 |
| SN | -1.13 | -1.08 | 1.288237 | 1.288242 | 1.288087 | 1.288392 |
| 1W | -8.25 | -8.05 | 1.287525 | 1.287545 | 1.287375 | 1.287695 |
| 1M | -37.90 | -37.40 | 1.284560 | 1.284610 | 1.284410 | 1.284760 |
| 2M | -73.20 | -71.60 | 1.281030 | 1.281190 | 1.280880 | 1.281340 |
| 3M | -111.40 | -108.90 | 1.277210 | 1.277460 | 1.277060 | 1.277610 |
| 4M | -149.40 | -146.90 | 1.273410 | 1.273660 | 1.273260 | 1.273810 |
| 5M | -182.90 | -179.90 | 1.270080 | 1.270360 | 1.269910 | 1.270510 |
| 6M | -219.30 | -218.00 | 1.266420 | 1.266550 | 1.266270 | 1.266700 |
| 9M | -324.75 | -322.75 | 1.255875 | 1.256075 | 1.255725 | 1.256225 |
| 1Y | -426.50 | -422.50 | 1.245700 | 1.246100 | 1.245550 | 1.246250 |
| 2Y | -833.00 | -745.00 | 1.205050 | 1.213850 | 1.204900 | 1.214000 |

Spot leg of a swap is done at "mid-point" of the spot bid/offer.

In this example, the spot leg is priced at 1.2884.

Forward leg of a swap is anchored off the mid-point of outright spot bid/ask, i.e. 1.2884 in this example.
Further, the forward points are expressed in multiples of the "finest tick" in the spot price, i.e. 0.0001 in this example.
Thus, the forward leg of the 2yr Swap (on the bid side) is 1.2884 + .0001 x (-833.00) = 1.205050
The offer side of the same swap is
1.2884 + .0001 x (-745.00) = 1.213850

Precision of the forward leg (both in swaps and outright forwards) is two additional significant figures vs. the spot quotes.

Outright forward bids are anchored off the Spot bid. Same multiplier applies
e.g. 2yr Outright Bid =
1.2882 + .0001 x (-833.00) =
1.204900.

Similarly, outright forward offers are anchored off the Spot offer.
e.g. 2yr Outright Offer =
1.2885 + .0001 x (-745.00) =
1.214000.

FIG. 4 — Directed RFQ – Business Message Flow

| Source/Dest | Direction | Message Type | Information in the Message | Globex Component Activity |
|---|---|---|---|---|
| *Normal Flow* | | | | |
| Trader | → | RFQ | Size/AON qualifier | Normal RFQ process |
| Trader | ← | RFQ ACK/NACK | Unique RFQ ID | |
| MDP | ← | M4 | Unique RFQ ID | |
| MarketMaker | → | ActionableRFQResponse | RFQ ID, one or two sides, Time To Live (TTL) | Validate exact size match with RFQ, store MM info under this new ID |
| MarketMaker | ← | ActRFQRes ACK/NACK | Unique ActionableRFQResp ID | |
| Trader | ← | ActionableRFQResponse | Anonymized, ActionableRFQResp ID | Trader gets all responses, no filtering is done by Globex component |
| Trader | → | Block/Hit one of them | ActionableRFQResp ID as only counterparty info | Validate TTL on the ActionableRFQResp, validate that only a single Block may be used for any given original RFQ |
| Trader | ← | Block ACK/NACK | | |
| Trader & MM | ← | ExecutionReports | | Book the trade normally |
| MDP | ← | Normal M6, MO, etc | | |
| *MM Cancellation Flow* | | | | |
| MarketMaker | → | ActionableRFQResponseCancel | Unique ActionableRFQResp ID | |
| MarketMaker | ← | ActionableRFQResponseCancel ACK/NACK | | |
| Trader | ← | ActionableRFQResponseCancel | Unique ActionableRFQResp ID | |

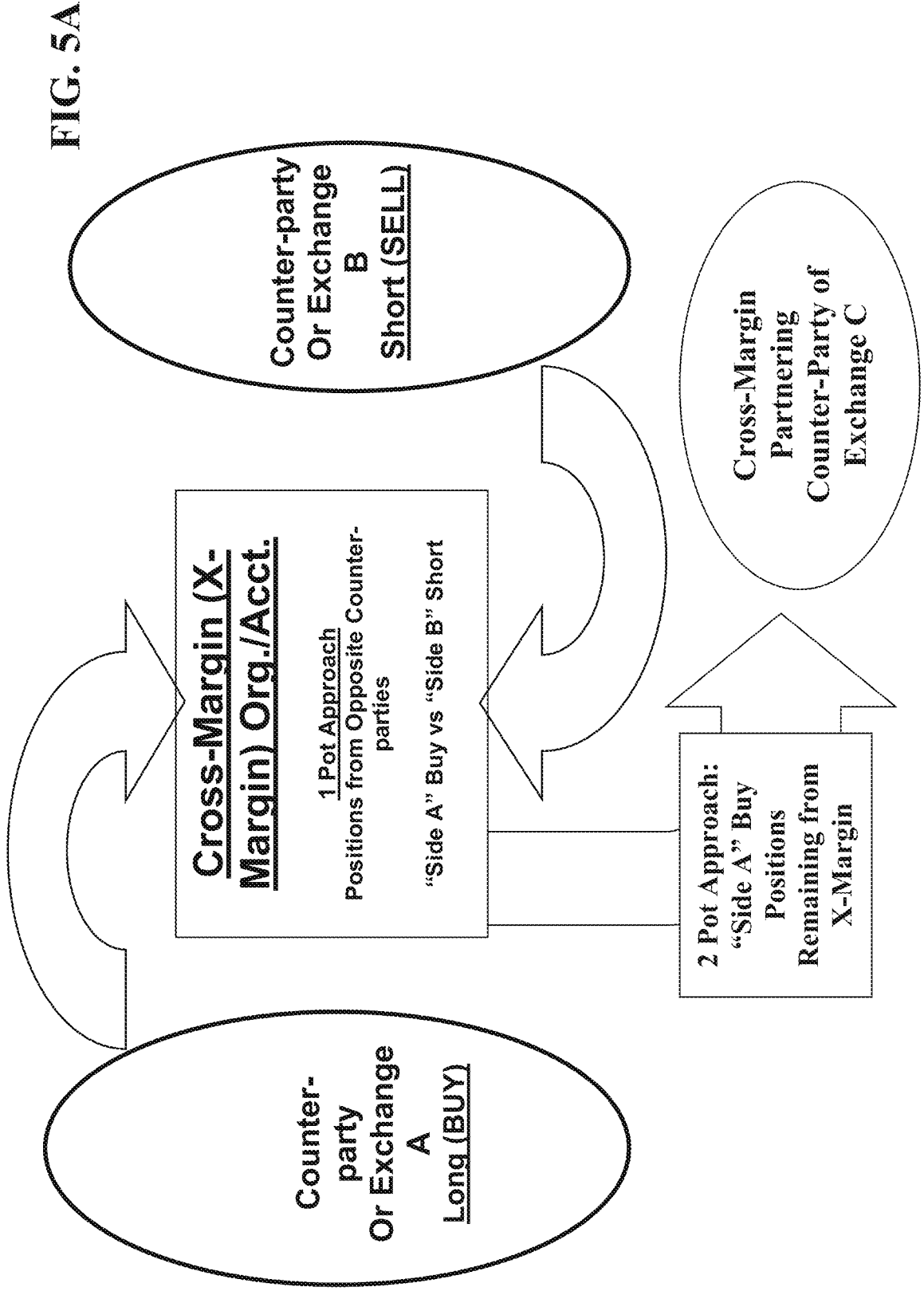

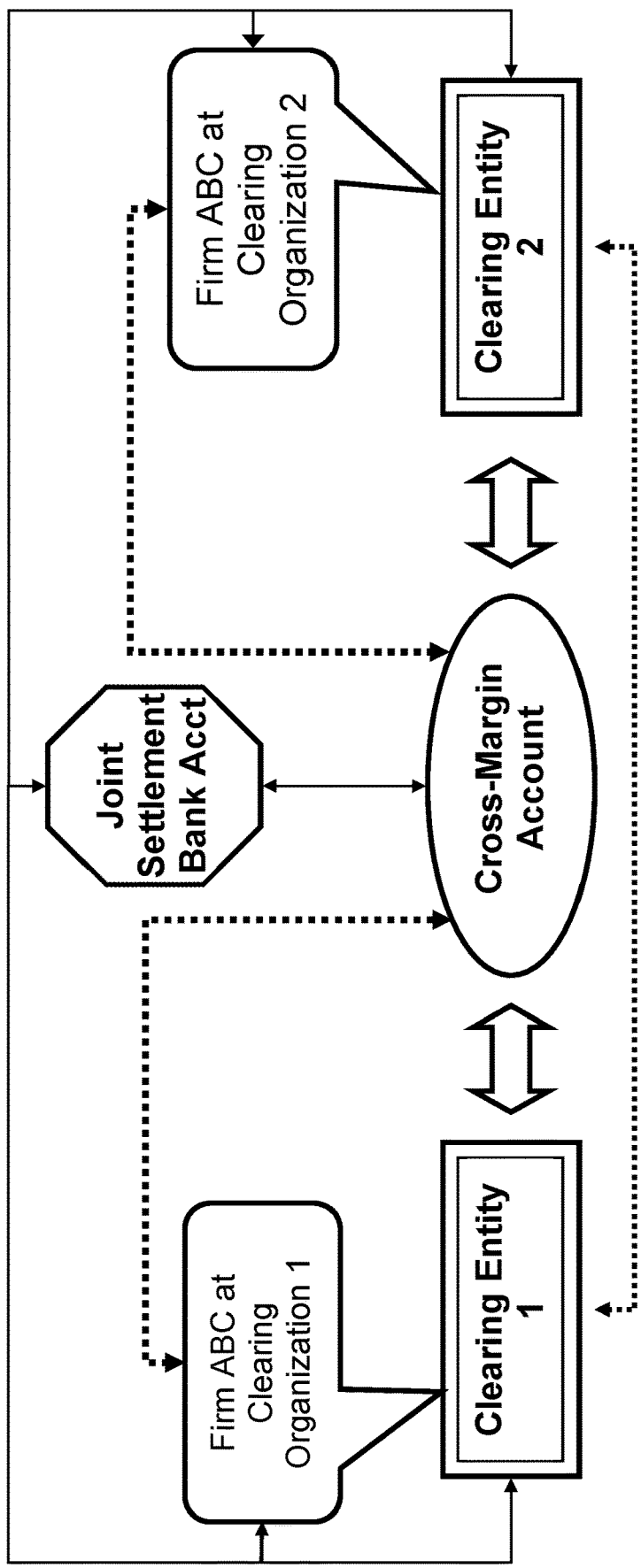

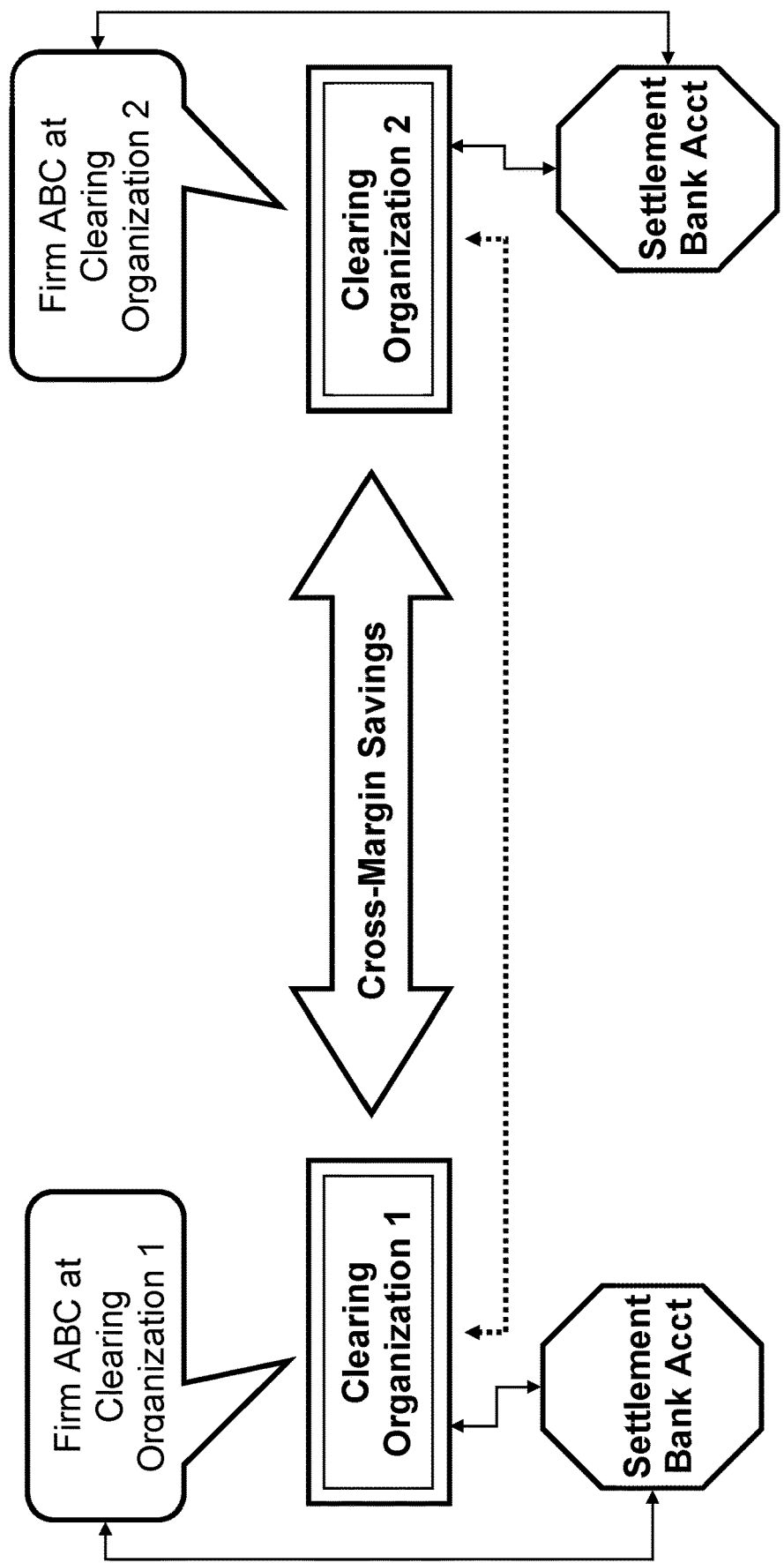

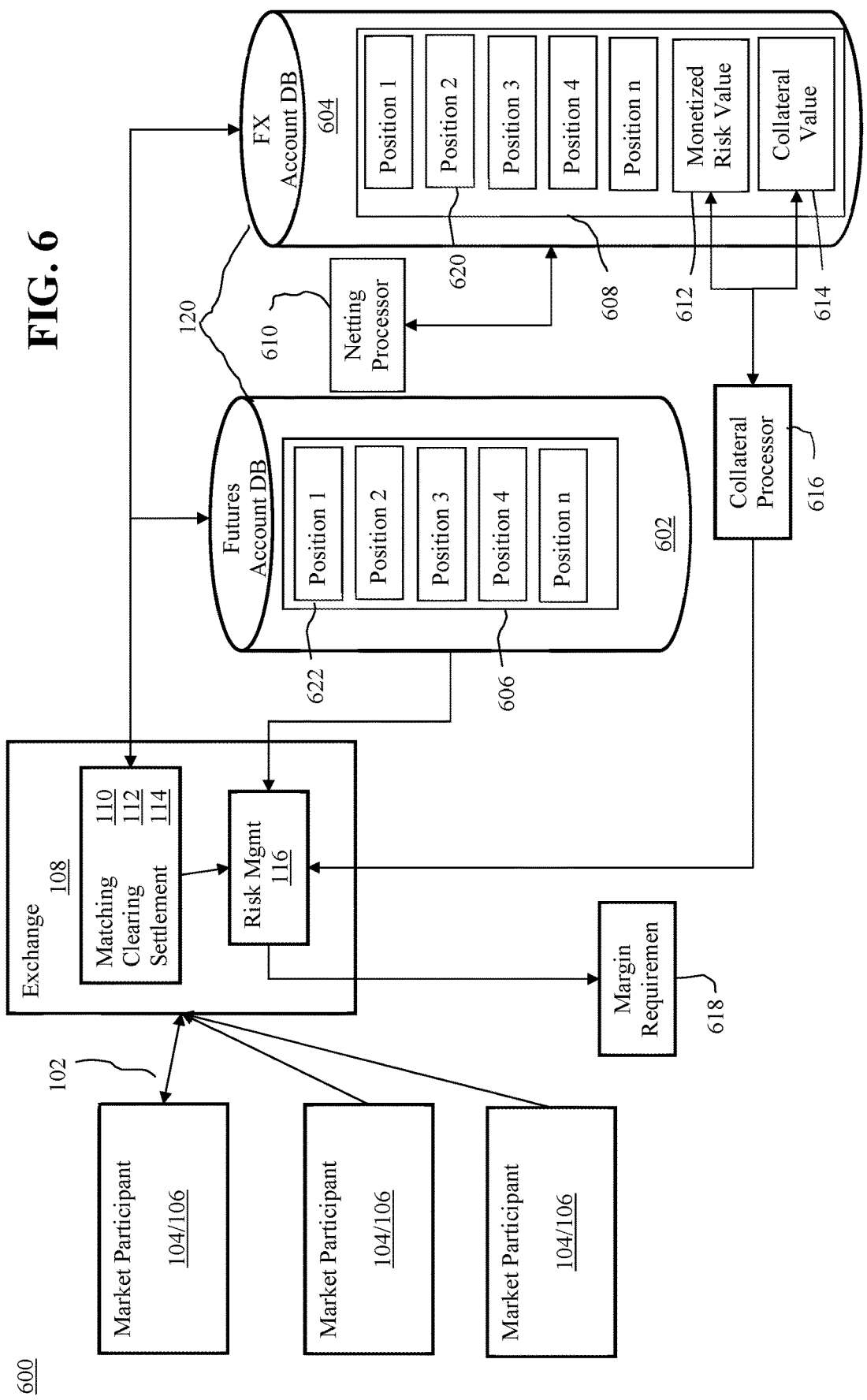

DETECTION OF INTRA-FIRM MATCHING AND RESPONSE THERETO

REFERENCE TO RELATED APPLICATIONS

This application is a continuation under 37 C.F.R. § 1.53(b) of U.S. patent application Ser. No. 11/601,489 filed Nov. 17, 2006, now U.S. Pat. No. 10,628,883 issued Apr. 21, 2020, which claims the benefit of the filing date under 35 U.S.C. § 119(e) of U.S. Provisional Application Ser. No. 60/738,246 filed Nov. 18, 2005, which is hereby incorporated by reference.

The following co-pending and commonly assigned U.S. Patent Applications have been filed on the same date as the present application. These applications relate to and further describe other aspects of the embodiments disclosed in the present application and are herein incorporated by reference:

U.S. patent application Ser. No. 11/600,993, "CROSS-CURRENCY IMPLIED SPREADS", filed herewith; and U.S. patent application Ser. No. 11/600,984, "MULTIPLE QUOTE RISK MANAGEMENT", filed herewith.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Futures Exchanges, referred to herein also as an "Exchange", such as the Chicago Mercantile Exchange Inc. (CME), provide a marketplace where futures and options on futures are traded. Futures is a term used to designate all contracts covering the purchase and sale of financial instruments or physical commodities for future delivery on a commodity futures exchange. A futures contract is a legally binding agreement to buy or sell a commodity at a specified price at a predetermined future time. Each futures contract is standardized and specifies commodity, quality, quantity, delivery date and settlement. An option is the right, but not the obligation, to sell or buy the underlying instrument (in this case, a futures contract) at a specified price within a specified time.

The foreign exchange market is the largest and most liquid financial market in the world, representing more than $1.2 trillion worth of transactions each day. Also known as forex or FX, currency trading typically involves the simultaneous purchase of one currency while selling another currency. Currencies are typically traded in pairs, such as U.S. dollar/Japanese yen (USD/JPY) or Euro/U.S. dollar (EUR/USD), or via currency indexes, such as the CME$INDEX(TM).

In order to capitalize on the foreign exchange market, CME also offers FX futures products, i.e. futures contracts where the underlying financial instrument is a foreign currency transaction, in addition to futures products based on other commodities and financial instruments. However, FX futures are not the only mechanisms by which foreign currencies may be traded. For example, the FX interbank market is a global network of the world's banks with no centralized location for trading. Much of the business is conducted over the-phone or electronically bank-to-bank.

The FX market is a 24-hour-per-day market during the FX business week. The day starts in Asia, extends over to Europe and then into the U.S. daytime trading hours. Currencies are traded around the world, around the clock, from Monday morning (Sunday afternoon Chicago/New York time) in New Zealand/Asia to the close of the business week on Friday afternoon in Chicago/New York.

Over the Counter ("OTC") is the term often used to refer to currency trading instruments which are not classified as a "futures" instrument as defined above and not traded on a futures exchange such as CME, i.e. that which is not a futures contract is an OTC contract. Such OTC contracts include "forward" contracts, i.e. private agreements between buyers and sellers, i.e. bilateral contracts, for the future delivery of a commodity at an agreed price. While futures contracts are regulated by the Commodity Futures Trading Commission ("CFTC"), forward or OTC contracts are not so regulated, making them more flexible and an attractive device to certain investors and certain markets.

Speculators are active in the FX markets, as they are attracted to the opportunities that volatile and changing market conditions create. A multitude of economic forces impact the world's currencies. Some of the forces at work include interest rate differentials, domestic money supply growth, comparative rates of inflation, central bank intervention and political stability. In times of global uncertainty, some currencies may benefit from perceived "flight-to-safety" status. Or, if one country's economic outlook is perceived as strong by market forces, its currency may be firmer than another country's currency, where economic or political conditions are viewed with caution.

FX traders include governments, corporations and fund managers doing business with foreign countries, that need to exchange one currency for another, and speculators who seek to profit from price movements in the markets.

The highly liquid and volatile currency markets offer opportunities for speculators every day. Most speculators tend to focus on the so-called "majors," which are the most actively traded currencies and include the U.S. dollar, the euro, the Japanese yen, the British pound, the Swiss franc, the Australian dollar and the Canadian dollar.

While the OTC FX market offers advantages such as less regulation and more product flexibility, CME's futures exchange offers its own benefits, such as centralized and anonymous matching and clearing, as well as efficiency optimization and risk management/credit screening mechanisms not available in the present OTC markets. It would therefore be advantageous to be able to trade OTC FX products via the same mechanisms used to trade futures contracts in order to secure these same benefits and protections.

Accordingly, there is a need for systems and methods to allow OTC FX products to be traded in a centralized matching and clearing environment such as the environment utilized by CME's futures exchange.

BRIEF DESCRIPTION OF THE DRAWINGS

FIG. 3 shows an exemplary screen display and price determination.

FIG. 4 shows an exemplary business message flow for the Directed RFQ functionality for use with the disclosed embodiments.

FIGS. 5A-5G depict block diagrams of a Flexible Hybrid Central Counter-party Cross-Margining or Cross Collateralization system according to one embodiment.

FIG. 6 depicts a more detailed block diagram of the system of FIG. 1 according to one embodiment.

DETAILED DESCRIPTION OF THE DRAWINGS AND PRESENTLY PREFERRED EMBODIMENTS

The disclosed systems and methods relate to allowing trading of over the counter ("OTC") foreign exchange ("FX") contracts on a centralized matching and clearing mechanism, such as that of the Chicago Mercantile Exchange's ("CME"'s) futures exchange system (the "Exchange"). The disclosed systems and methods allow for anonymous transactions, centralized clearing, efficient settlement and the provision of risk management/credit screening mechanisms to lower risk, reduce transaction costs and improve the liquidity in the FX market place. In particular, the disclosed embodiments increase speed of execution facilitating growing demand for algorithmic trading, increased price transparency, lower cost of trading, customer to customer trading, and automated asset allocations, recurring trades as well as clearing and settlement efficiencies.

Figure 1:
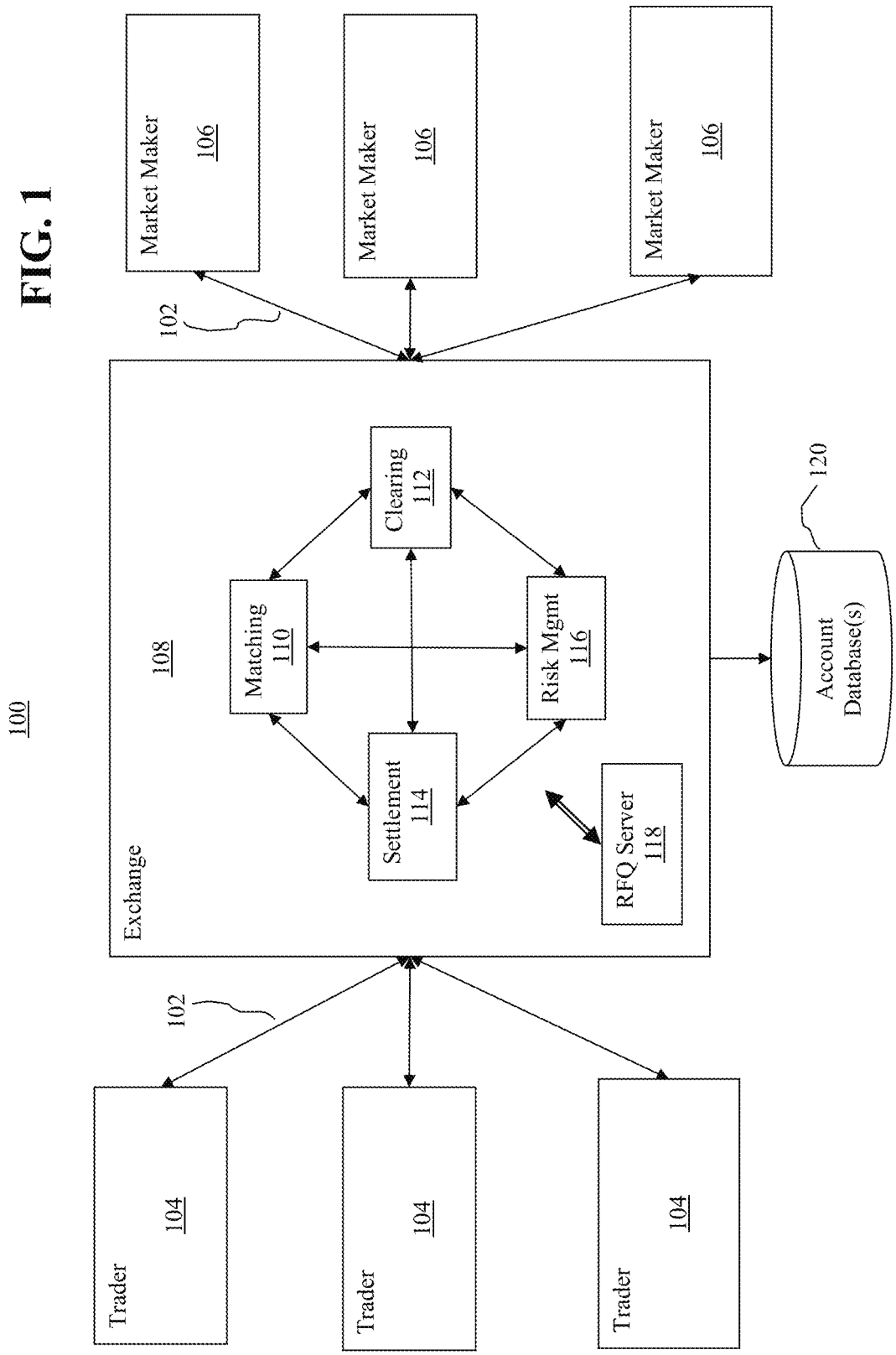
FIG. 1 depicts a block diagram of an exemplary system for trading OTC FX instruments according to the disclosed embodiments.
Figure 2A:
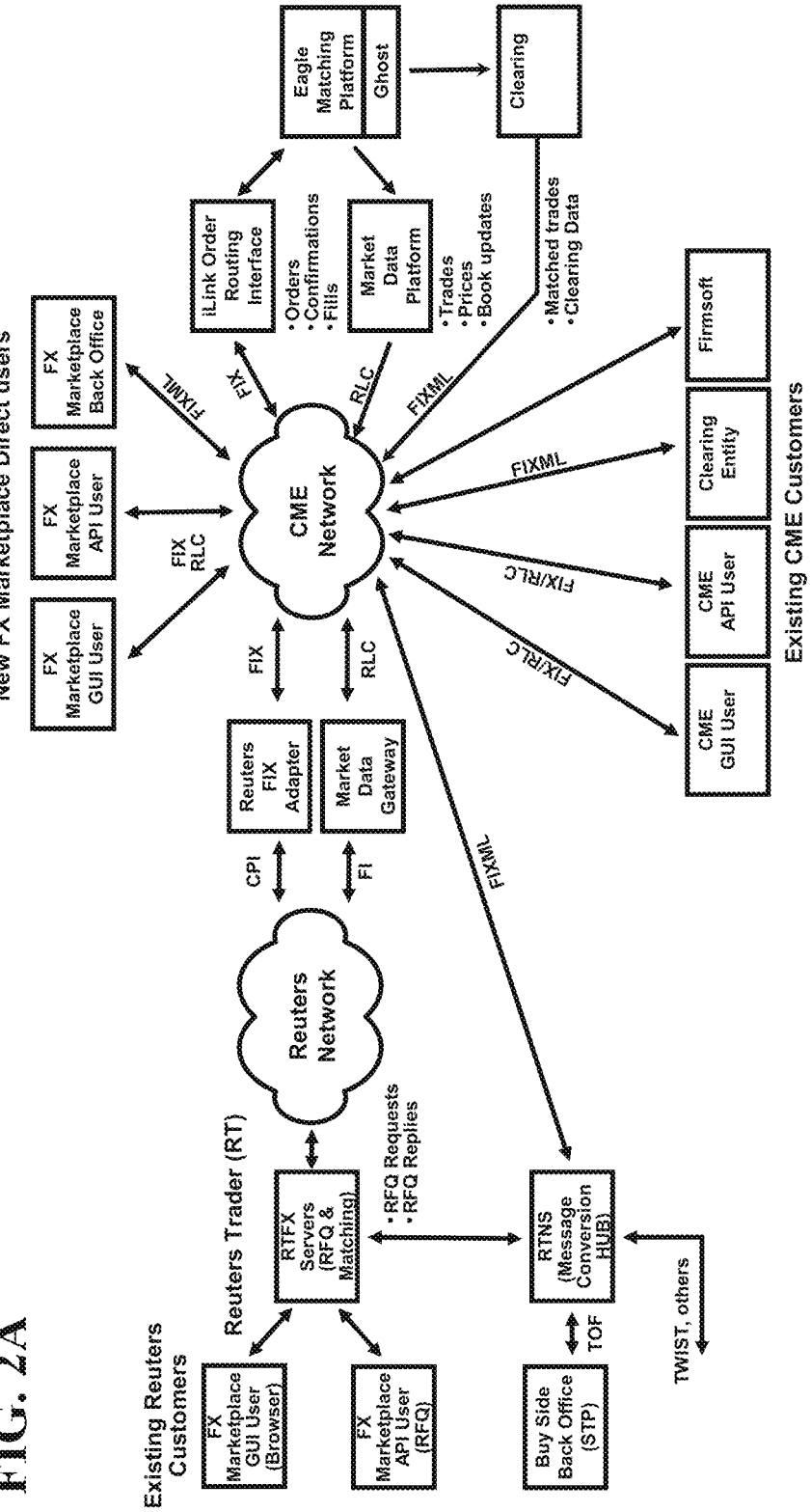
FIG. 2A shows a more detailed block diagram of the system of FIG. 1 according to one embodiment.
Figure 2B:
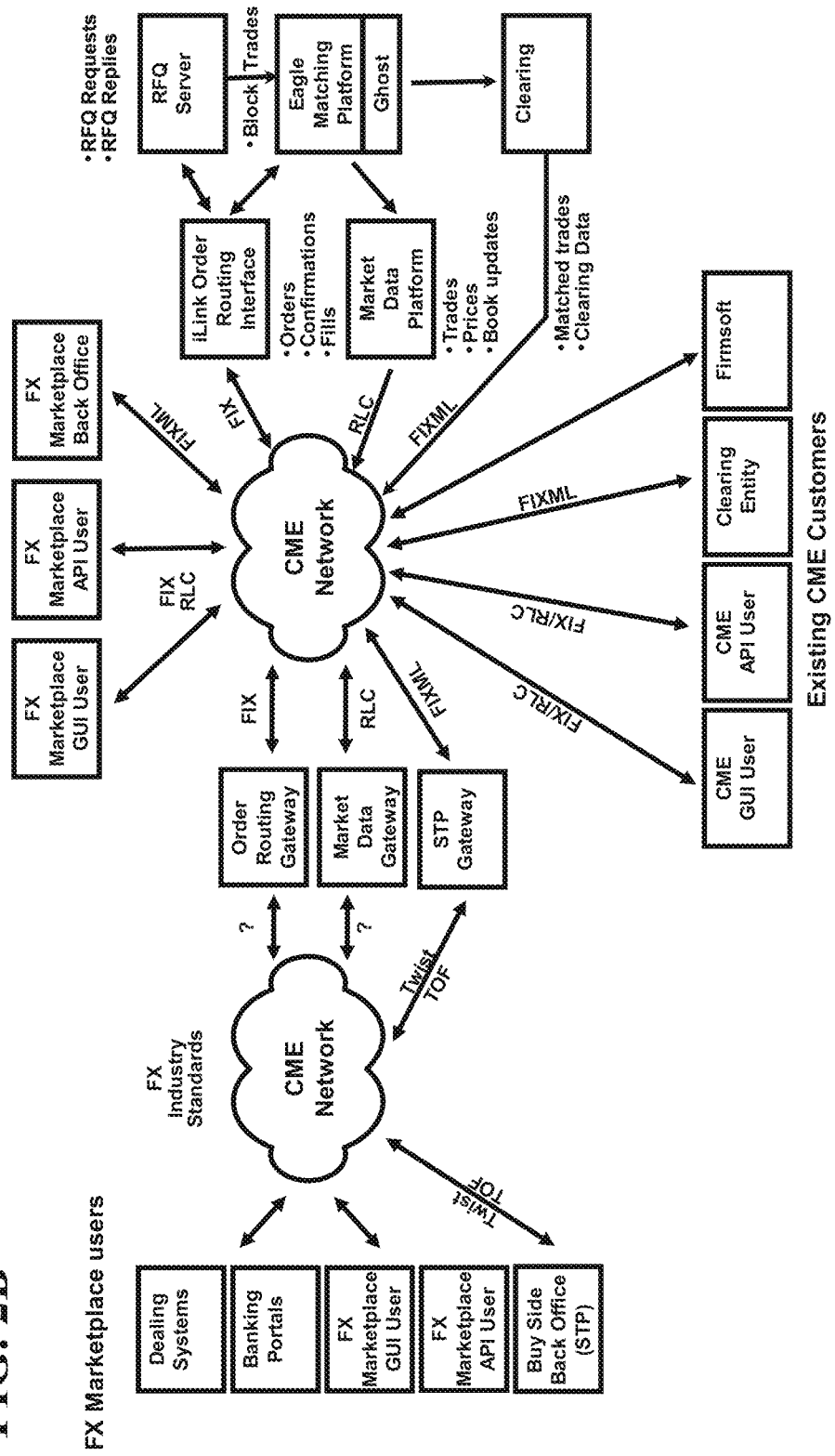
FIG. 2B shows a more detailed block diagram of the system of FIG. 1 according to an alternative embodiment.

FIG. 1 shows a block diagram of an exemplary system 100 for trading OTC FX instruments according to the disclosed embodiments. The system 100 is essentially a network 102 coupling market participants 104 106, including traders 104 and market makers 106 with the Exchange 108. Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, ... and <N>" or "at least one of <A>, <B>, ... <N>, or combinations thereof" are defined by the Applicant in the broadest sense, superseding any other implied definitions herebefore or hereinafter unless expressly asserted by the Applicant to the contrary, to mean one or more elements selected from the group comprising A, B, ... and N, that is to say, any combination of one or more of the elements A, B, ... or N including any one element alone or in combination with one or more of the other elements which may also include, in combination, additional elements not listed. The Exchange 108 provides the functions of matching 110 buy/sell transactions, clearing 112 those transactions, settling 114 those transactions and managing risk 116 among the market participants 104 106 and between the market participants and the Exchange 108, as well as request-for-quote functionality 118, as is discussed in more detail below. FIGS. 2A and 2B show more detailed block diagrams of the logical architecture of the system 100 of FIG. 1. In particular, FIG. 2A shows a block diagram of the system 100 according to one embodiment in which the Exchange 108 is interconnected with a second FX marketplace to allow existing FX market participants to transact over the Exchange as described herein. In this embodiment, the second FX marketplace is provided by Reuters. FIG. 2B shows a block diagram of the system 100 according to a second embodiment in which the Exchange 108 further provides connectivity to existing FX market participants.

While the disclosed embodiments relate to the trading of OTC FX instruments, the mechanisms and methods described herein are not limited thereto and may be applied to any OTC product.

Typically, the Exchange 108 provides a "clearing house" which is a division of the Exchange 108 through which all trades made must be confirmed, matched and settled each day until offset or delivered. The clearing house is an adjunct to the Exchange 108 responsible for settling trading accounts, clearing trades, collecting and maintaining performance bond funds, regulating delivery and reporting trading data. Essentially mitigating credit. Clearing is the procedure through which the Clearing House becomes buyer to each seller of a futures contract, and seller to each buyer, also referred to as a "novation," and assumes responsibility for protecting buyers and sellers from financial loss by assuring performance on each contract. This is effected through the clearing process, whereby transactions are matched. A clearing member is a firm qualified to clear trades through the Clearing House. In the case of the CME's clearing house, all clearing members not specifically designated as Class B members are considered Class A clearing members. In the CME there are three categories of clearing members: 1) CME clearing members, qualified to clear transactions for all commodities; 2) IMM clearing members, qualified to clear trades for only IMM and IOM commodities; and 3) IMM Class B clearing members, solely limited to conducting proprietary arbitrage in foreign currencies between a single Exchange-approved bank and the IMM and who must be guaranteed by one or more Class A non-bank CME or IMM clearing member(s). Note that a "member" is a broker/trader registered with the Exchange. As will be discussed below, in the disclosed embodiments, a new clearing member class may be introduced for the purposes of trading OTC FX, exclusively or along with other CME products, i.e. futures, as described herein. It will be appreciated that such classifications are implementation dependent.

In the presently disclosed embodiments, the Exchange 108 assumes an additional role as the central intermediary in OTC FX transactions, i.e., the Exchange 108 will become the buyer to each seller and seller to each buyer, and assume responsibility for protecting buyers and sellers from financial loss by assuring performance on each contract, as is done in futures transactions. As used herein, the term "Exchange" 108 will refer to the centralized clearing and settlement mechanisms, risk management systems, etc., as described below, used for futures trading, including the described enhancements to facilitate OTC FX transactions. By assuming this intermediary role and employing credit screening and risk management mechanisms, parties previously not able to trade OTC FX, because for example they were credit screened out, may now trade anonymously. In prior OTC FX markets, banks were the only sell-side to transactions. The presently disclosed embodiments permit traders to take either sell or buy-side positions and sell-side is no longer limited to banks.

While the disclosed embodiments will be described in reference to the CME, it will be appreciated that these embodiments are applicable to any Exchange 108, including those which trade in equities and other securities. The CME Clearing House clears, settles and guarantees all matched transactions in CME contracts occurring through its facilities. In addition, the CME Clearing House establishes and monitors financial requirements for clearing members and conveys certain clearing privileges in conjunction with the relevant exchange markets.

As an intermediary, the Exchange 108 bears a certain amount of risk in each transaction that takes place. To that end, risk management mechanisms protect the Exchange via the Clearing House. The Clearing House establishes clearing level performance bonds (margins) for all CME products and establishes minimum performance bond requirements for customers of CME products. A performance bond, also referred to as a margin, is the funds that must be deposited by a customer with his or her broker, by a broker with a clearing member or by a clearing member with the Clearing House, for the purpose of insuring the broker or Clearing House against loss on open futures or options contracts. This is not a part payment on a purchase. The performance bond helps to ensure the financial integrity of brokers, clearing members and the Exchange as a whole. The Performance Bond to Clearing House refers to the minimum dollar deposit which is required by the Clearing House from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e. a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance. As will be discussed below, additional functionality is provided in the disclosed embodiments to provide risk management for OTC FX transactions.

The accounts of individual members, clearing firms and non-member customers doing business through CME must be carried and guaranteed to the Clearing House by a clearing member. As mentioned above, in every matched transaction executed through the Exchange's facilities, the Clearing House is substituted as the buyer to the seller and the seller to the buyer, with a clearing member assuming the opposite side of each transaction. The Clearing House is an operating division of the Exchange 108, and all rights, obligations and/or liabilities of the Clearing House are rights, obligations and/or liabilities of CME. Clearing members assume full financial and performance responsibility for all transactions executed through them and all positions they carry. The Clearing House, dealing exclusively with clearing members, holds each clearing member accountable for every position it carries regardless of whether the position is being carried for the account of an individual member, for the account of a non-member customer, or for the clearing member's own account. Conversely, as the contra-side to every position, the Clearing House is held accountable to the clearing members for the net settlement from all transactions on which it has been substituted as provided in the Rules. As will be explained below, these mechanisms will be augmented so as to handle OTC FX transactions.

More information about minimizing the risk to the Exchange 108 while similarly minimizing the burden on members, approximating the requisite performance bond or margin requirement as closely as possible to the actual positions of the account at any given time and improving the accuracy and flexibility of the mechanisms which estimate performance bond requirements, may be found in the following U.S. Patent Applications, all of which are incorporated by reference herein:

U.S. patent application Ser. No. 11/030,815, "SYSTEM AND METHOD FOR ACTIVITY BASED MARGINING", filed Jan. 7, 2005, now U.S. Pat. No. 7,769,667;

U.S. patent application Ser. No. 11/030,796, "SYSTEM AND METHOD FOR EFFICIENTLY USING COLLATERAL FOR RISK OFFSET", filed Jan. 7, 2005, now U.S. Pat. No. 7,426,487;

U.S. patent application Ser. No. 11/030,833, "SYSTEM AND METHOD FOR ASYMMETRIC OFFSETS IN A RISK MANAGEMENT SYSTEM", filed Jan. 7, 2005, now U.S. Pat. No. 7,509,275;

U.S. patent application Ser. No. 11/030,814, "SYSTEM AND METHOD FOR DISPLAYING A COMBINED TRADING AND RISK MANAGEMENT GUI DISPLAY", filed Jan. 7, 2005, now U.S. Pat. No. 8,849,711;

U.S. patent application Ser. No. 11/031,182, "SYSTEM AND METHOD FOR FLEXIBLE SPREAD PARTICIPATION", filed Jan. 7, 2005, now U.S. Pat. No. 7,593,877;

U.S. patent application Ser. No. 11/030,869, "SYSTEM AND METHOD FOR HYBRID SPREADING FOR RISK MANAGEMENT", filed Jan. 7, 2005, now U.S. Pat. No. 7,428,508; and U.S. patent application Ser. No. 11/030,849, "SYSTEM AND METHOD OF MARGINING FIXED PAYOFF PRODUCTS", filed Jan. 7, 2005, now U.S. Pat. No. 7,430,539.

In the present OTC FX markets, liquidity and access to pricing is fragmented creating inefficiencies for market participants. Such fragmentation is due in part to traditional reliance on bi-lateral counterpart credit that compartmentalizes trading, as well as the legacy role of banks as market makers to non-bank traders/firm. The centrally cleared marketplace for OTC FX provided by the disclosed embodiments permits access to the best pricing, equal access for all market segments, and buy-side and sell-side, as well as operational efficiencies, as will be discussed.

In bi-lateral trading, buyers and sellers essentially consummate deals on their own. Sellers must accept each buyer's credit, buyers send payment directly to each seller and buyers must accept each seller's ability to perform on the contract. If either party wishes to close out a deal prior to delivery, they must negotiate exclusively with their original counterparty. Such bi-lateral trading creates inefficiencies for the FX buy-side. For example, bi-lateral trading creates inefficient pricing in that the market consists of multiple trading counterparties and the requirement to open and close positions with the same bank. Further, bi-lateral trading creates inefficient use of collateral, e.g. there may be requirements to place margin at several banks, and creates excessive operational risk, e.g. multiple back-office confirmation relationships.

Present FX trade settlement utilizes the Continuous Linked Settlement ("CLS") Bank. Prior to the availability of the CLS Bank, FX trade settlements resulted in separate currency payments between trade counterparties, which incurred heightened risk that one party might default, especially in view of time zone differences, also known as "Herstaat Risk." The CLS Bank eliminates 'temporal' settlement risk by settling both sides of dual currency payments by delivery-vs.-payment, thereby mitigating Herstaat Risk in daily settlements.

Straight-Through-Processing ("STP") provides the benefits of reduction in errors during processing, acceleration of trade processing, real time risk management, automated account allocations, and back office staffing efficiencies. However, in the present OTC FX markets, the benefits of STP are limited by lack of standardization and real time delivery of both electronic trade affirmations and trade confirmations.

The disclosed embodiments offer reduced cost of market access, and thereby better access to best-pricing, lower infrastructure support costs and easier and less costly trade execution, price and volume transparency, efficient risk transfer, STP standardization and auditable prices and mark-to-market.

In particular, the disclosed embodiments feature centralized OTC FX execution and clearing via a centralized matching and clearing platform accessed, for example, via prime brokers/direct clearing. The disclosed systems and methods may be used by institutional participants in the OTC FX markets, such as banks, asset managers, leveraged trading firms (hedge funds, CTA's, prop firms, etc.), and/or currency program and overlay managers. The disclosed systems and methods may support OTC FX products, such as Spot, FX forward swap and FX options instruments. The disclosed systems and methods utilize trade matching technology as well as graphic user interface ("GUI") and application program interface ("API") based methods of interaction. Further, a novel request for quote process is provided. In the disclosed embodiments, clearing takes place via the Exchange clearing house, such as the CME Clearing House. Daily settlements may still occur utilizing the CLS bank but with added efficiencies which will be discussed below. Collateralized risk margining is also provided as will be discussed below. Further, OTC STP protocols are supported.

The disclosed embodiments provide value for the buy-side of OTC FX transactions. In particular, the disclosed systems and methods address customer demand for increased FX market efficiencies, pre-trade, trade and post-trade. For example, the disclosed embodiments provide access to trading lines and limits as well as audited and published FX price and volume data. Further, access to best pricing is provided as well as trade anonymity, improved execution speed, access to a primary liquidity pool, and access to multiple FX products. In addition, real time STP is provided as is efficient trade/position management via multi-lateral netting. Further all trading styles are accommodated, such as algorithmic trading, GUI/Keyboard trading and request for quote ("RFQ") based trading.

On the sell-side, the disclosed embodiments further provide value to banks. For example, they permit the ability to extend market making activities beyond the limits of bilateral credit relationships, e.g. trade with new customers, extend trading with existing customers, etc. Further, increased access to FX liquidity and accommodation of various trading styles is also provided. In addition, access to real time risk management and STP is provided along with credit and settlement risk mitigation.

In at least one of the disclosed embodiments, a hybrid market model may be provided which combines exchange central limit order book matching and bilateral trading of the OTC market with expanded electronic, anonymous access and clearing. Alternatively, other embodiments may provide sub-sets of this functionality.

The disclosed embodiments support one or more of the following FX instrument types: forwards, spot and swaps. Forwards refers to FX forward contracts that expire daily starting from tomorrow, i.e. the day after the transaction date, and running out for two years, for each currency-pair. A "Spot" refers the Forward which expires in two days after the transaction date. A swap is essentially a calendar spread, i.e. the simultaneous purchase (sale) of contract(s) in a near delivery month (first leg) and the sale (purchase) of an equal number of contract(s) in a far delivery month of the same contract (second leg), where the first leg is a Spot and the second leg is a further out Forward.

In one embodiment, a defined number of swap products are offered including Spot against the following (37 in total, assuming it the stated day or next day thereafter which is not a holiday in either currency):

Tomorrow—Tom Next (T/N)¬—The Swap which has a first Forward leg expiring tomorrow and the next Forward leg as "Spot"

The day after tomorrow—Spot Next (S/N)

Swap Forwards at 1 week, 2 weeks, 3 weeks

Monthly Swap Forwards from 1 month through 24 months

Except if this date is on a weekend or a holiday in either currency, go to the first preceding week date which is not a holiday in either currency Except if the spot value date is the last date of the month, then go to the last week date of the N'th month following which is not a holiday in either currency.

Swap Forwards at the 8 IMM dates over the next 2 years

Broken-Dated Swap—Any Swap which is not one of the pre-defined Swaps above.

It will be appreciated that other product combinations may also be offered.

Further, the disclosed embodiments utilize Daily Rolling Instruments wherein the contract symbol used by the customers to reference a given Swap or Spot does not change, day-to-day, but the Swap legs do change each day, i.e. the temporal references within the instrument are treated as relative to the transaction date rather than being expressed in absolute form thereby necessitating a significantly increased symbol set to reference them:

From the trader perspective, contract symbols for electronically matched instruments are "generic"—Fill messages include the value dates and prices of each leg;

Instrument definitions would therefore include contract symbols like "USDSPYSP" for Spot and "USDJPY1M" to specify the 1 month, forward Swap.

Each day, new instruments are used:
Forward for the 2 year date
All Swap instruments are refreshed with new legs The appropriate value dates for electronically matched contracts are assigned by the system at match time and provided to the user within the order entry/front office fill messages for each leg. For Directed Request For Quote ("Directed RFQ" or "DRFQ"), discussed in more detail below, users may enter the desired legs for a Directed RFQ using generic contracts, with the requested value dates. For example, a user wishing to do an RFQ for a forward outright, i.e. an order to buy or sell only one specific type of contract, with a specific value date should be able to specify that, without having to specify a unique contract that is associated internally with that value date.

Referring to FIG. 3, in one embodiment, the Spot leg price is the mid-point between the bid/ask in the current Spot market or last traded within a specific time period; the other Forward leg price is made based on the Spot price plus the differential (e.g. "30" is a 0.0030 differential between the Spot and the Forward leg).

If the mid-point between the bid/ask in the current Spot market is stale, settlement information may be used. If the spot market is not liquid and no market data is currently being produced, customers will be kept up to date with secondary sources to minimize unexpected results when the leg price comes in. A business rule of having the Spot markets regularly quoted by market makers may be provided.

For some markets, the Swap does not use the Spot for that market, but rather an associated market. This is accomplished by doing a reciprocal (1/current-price) calculation of the spot, or spot mid-point in that associated market.

In the disclosed embodiments, for the purposes of determining the value date, value date conventions are employed. For example, the value-date convention for spot for USD/CAD is one business day and for all others it is two business days. A value date is valid for a currency pair if it is a banking business day for both currencies of the pair. Trading may physically occur on any weekday. However, for trading occurring on any given weekday, the rule for taking holidays into account when determining the value date for "spot" trading on that weekday differs depending on the currency in which the holiday occurs. For holidays in USD, you need only one full working day before you can settle a spot trade. For example: Wednesday July 4th (US Independence Day), a USD holiday; Monday's spot trading in USD/JPY has value date Thursday (because Wednesday is a USD holiday); Tuesday's spot trading in USD/JPY also has value date Thursday (because you only need one USD working day). For holidays in currencies other than USD, two full working days before settlement may be required. For example: Wednesday December 7th (Pearl Harbor Day), a JPY holiday; Monday's spot trading in USD/JPY has value date Thursday (because Wednesday is a JPY holiday); Tuesday's spot trading in USD/JPY has value date Friday (because Wednesday is a JPY holiday and you need two full working days in JPY).

In the disclosed embodiments, support for the instruments listed in Table 1 is provided. It will be appreciated that the instrument offerings may vary and are implementation dependent. In particular, the Central Limit Order Book ("CLOB") will support Spot and/or standardized Swap forwards. The Directed RFQ mechanism, discussed in more detail below, will support Spot, Forwards (any date out to 2 years), Swap forwards (standardized cases), Broken-dated swaps, or combinations thereof.

TABLE 1

| Currency Pair | Shorthand | Quoted In | Spot Trading Unit | Swap Trading Unit | Spot Tradable via CLOB | Swaps Tradable via CLOB | Number Contracts via CLOB | Number Contracts Including Forwards |
|---|---|---|---|---|---|---|---|---|
| Euro - USD | EUR/USD | USD | EUR | USD | x | x | 38 | 541 |
| USD - Japanese Yen | USD/JPY | JPY | USD | USD | x | x | 38 | 541 |
| British Pound - USD | GBP/USD | USD | GBP | USD | x | x | 38 | 541 |
| Australian Dollar - USD | AUD/USD | USD | AUD | USD | x | x | 38 | 541 |
| USD - Swiss Franc | USD/CHF | CHF | USD | USD | x | x | 38 | 541 |
| USD - Canadian Dollar | USD/CAD | CAD | USD | USD | x | x | 38 | 541 |
| Euro - Japanese Yen | EUR/JPY | JPY | EUR | | x | | 1 | 504 |
| Euro - British Pound | EUR/GBP | GBP | EUR | | x | | 1 | 504 |
| Euro - Swiss Franc | EUR/CHF | CHF | EUR | | x | | 1 | 504 |
| British Pound - Japanese Yen | GBP/JPY | JPY | GBP | | x | | 1 | 504 |

TABLE 1-continued

| Currency Pair | Shorthand | Quoted In | Spot Trading Unit | Swap Trading Unit | Spot Tradable via CLOB | Swaps Tradable via CLOB | Number Contracts via CLOB | Number Contracts Including Forwards |
|---|---|---|---|---|---|---|---|---|
| Japanese Yen - USD | JPY/USD | USD | | JPY | | x | 37 | 541 |
| Swiss Franc - USD | CHF/USD | USD | | CHF | | x | 37 | 541 |
| Canadian Dollar - USD | CAD/USD | USD | | CAD | | x | 37 | 541 |
| | | | | | | total | 343 | 6885 |

*Swaps are not listed for the non-USD currency pairs.

In disclosed embodiments, three currency-pairs will have a secondary market for the alternate listing (e.g. a ¥/$ contract and a $/¥ contract will both exist, as completely separate markets):
  Japanese Yen
  Swiss Franc
  Canadian Dollar
Forward outright instruments will be quoted in terms of one currency only (e.g. a $/¥ Forward is quoted in JPY, not USD). Swap instruments will be quoted in differential.

In the disclosed embodiments, there are 10 currency pairs, but only 6 with swaps defined. Contract sizes will be 1 million units of the base currency. Instruments tick in tenths, not quarters nor in a variable tick table (VTT).

With regard to daily value date roll-over, users need only be notified that the value date has changed for the Spot and Swaps, rather than what the change is for each instrument. In one embodiment, users are notified as to what the current value dates are for each instrument. Participants can request value dates for each instrument from the marketplace.

A new flag on the Instrument Definition market data message is provided (the MO, em-oh) which is available for use in this market. One example usage could be in the situation where each instrument was listed individually. This flag could change daily for many of these instruments, as indicated by the "Tradable" flags in the table above.

In one embodiment, any of the listed forwards, while not on a central limit order book, may be traded via the Directed RFQ system (noted below). Traders may also use the Directed RFQ system to dynamically create a Broken-dated Swap market consisting of those Swaps not pre-defined (i.e. those which have a non-standard forward leg). These markets are also not on a central limit order book.

It will be appreciated that the foregoing instrument definitions and conventions are implementation dependent and suitable modifications to accommodate alternative instruments and conventions are contemplated herein. For example, while it is advantageous to utilize existing product symbology and instrument standards in the FX market place today, other symbology or standards, now available or later developed, may also be used with the disclosed systems and methods.

To facilitate clearing of OTC FX products using the clearing and settlement mechanism, the disclosed embodiments feature a new class of clearing member for banks and prime brokers addition to existing Clearing house members. Existing Exchange membership may be used to trade on this new market as well. Further, for the disclosed embodiments, only Institutional users will be permitted to use the platform (no retail). Clearing firms will have to guarantee that their customers meet the established criteria for access. These criteria may be based on capitalization. The same single risk pool will be used for the safeguard system. In alternative embodiments, the market participants may be defined differently.

With regard to market access, authorization may be required before order entry can occur. Authorization should occur at the SubscriberAlias (originating location of the order) as well as the TraderID (order originator) and/or Account (entity on behalf of which the order is being submitted) level of granularity but may affect the registration process. In one embodiment, authorization occurs by TraderID and/or Account. In one embodiment authorization is for the entire market rather than granular to currency pair The application of a central counterparty to OTC FX transactions permits additional functionality to be offered to OTC FX market participants. In one embodiment, netting is provided which allows various FX positions to be netted together for settlement rather than separately settled, thereby reducing the number of settlement transactions and the associated transaction costs. The individual transactions are still tracked and reported but the actual number of settlement transactions, for example, those sent to CLS, is reduced. In another embodiment, collateralization is provided which allows the value of an entity's FX account, which may change in value via debits and credits but not based on the actual movement of value, to be used against that entity's margin requirement of their futures trading account, thereby simplifying margin requirements and reducing the overall burden.

In one embodiment, as shown in FIG. 2A, CME provides clearing and settlement functionality while a separate market, such as Reuters, provides matching functionality and access to sell-side entities, such as banks. In an alternate embodiment, as shown in FIG. 2B, CME provides matching, clearing and settlement functionality. It will be appreciated that the division of functionality for in-taking, processing and completing a given transaction is implementation dependent.

In order to implement OTC FX within the clearing and settlement mechanisms of the Exchange, additional market functionality is needed, such as: match engine functionality; surveillance, market control and registration functionality; RFQ functionality; market data functionality; trade data functionality; clearing/trade reporting/straight-through-processing ("STP") functionality; fee functionality; and front-end/distribution functionality.

In particular, the match engine matches up sell-side and buy-side orders to complete trades. In one embodiment, the match engine utilizes a first-in-first-out ("FIFO") matching algorithm for Spot transactions and a FIFO with Lead Market Maker matching algorithm for Forward Swap transactions. In this embodiment, simple market maker protection is provided for Forward Swap transactions. Mass quoting is also permitted with Forward Swap transactions.

In one embodiment, specific features are provided for forward swap markets. In particular, approximately 10 to 20 Market Makers are targeted for the forward Swap markets, across all markets. Leg pricing for swaps is done on a differential basis, given the derived spot price and the swap differential.

In one embodiment, the allocation will respect the 1 million currency base unit contract size (i.e. products trade in base units of 1 million). The match engine is not required to have credit controls nor is it required to track the position of traders. Traders must know the delivery/value dates of all leg fills. This can be accomplished either via the fill notification, a daily instrument creation market data message, or some other standardized electronic means.

Traders need to get leg fill notifications with prices immediately after a match. Accordingly, order entry leg messages back to the trader for forward swaps should reflect one Spot leg, with its associated value date, and a generic forward leg, with its associated value date. This is true regardless of whether the messages are generated as the result of an electronic match, or a Directed RFQ-based block trade. Further, order entry leg messages back to the trader for Spot contracts should reflect the generic Spot contract and its associated value date, regardless of whether the messages are generated as the result of an electronic match, or an Directed RFQ block trade. In addition, order entry leg messages back to the trader for forward out-rights should reflect the generic forward outright, and it's associated value date. Note that such messages can only be the result of an execution from a Directed RFQ block trade, since forward out-rights will not be electronically matched.

The Trading Engine must produce information on a trade as to whether a given side was the aggressor order (i.e. the non-resting order). This is for the purposes of the fee functionality, discussed below.

Implied functionality, as discussed in more detail below, may also be provided.

The matching engine may support one or more of the following order types, or combinations thereof:
Fill and Kill ("FAK") & Limit orders;
RFQ for quantity will be available for those markets which are traded in a central limit order book;
Stop Orders and Stop Price Logic;
Good Til Cancel ("GTC") order types;
Good Til Day ("GTD") order types;
Block trades;
The match engine may also provide consolidated fill reporting (front-office, back-office, and market data)

The Match Event/Trade Report to Clearing may need to include information about the entire spread. This will require either using the D1 message (as well as the M1) from the Match Engine to Clearing, or a new interface/message altogether. See the Section below on Clearing/Settlement for more information.

In one embodiment, the market will operate in continuous trading all week (24 hours×5.5 days), with existing trade date rollover daily:

Markets open at 11:45 AM Chicago time on Sunday for a Monday trade date. There may be no trade date rollover at 4:00 PM on Sunday;
Markets close weekly at 4:00 PM on Friday;
There is no maintenance window from 4:00 PM to 5:00 PM. There may be no IOP-like opening state;
The cutoff to the next trading day occurs at 4 PM Chicago time (5 pm New York time);
Markets are open on most normal holidays;
All orders remain on book. On trade date rollover the legs of that Swap are redefined (perhaps as an entirely new market, but with the same External ID/Contract Symbol); and
If there is open interest in a Swap or Spot market on trade date rollover, the orders remain actionable in that "generic" market, but if traded will have new leg forward instruments.

The Surveillance, Market Control & Registration functionality provides audit, security and authentication services. In one embodiment, order management tools are provided such as CME's FirmSoft, which is a browser-based order management tool that provides real-time visibility into working and filled orders, across multiple firm IDs, in the CME® Globex® Order Management database. Accessible through the CME portal (via the internet) or through a production connection to the CME Globex platform, CME FirmSoft provides important alternative access to working and filled orders during system failures Globex Control Center ("GCC") must have current capabilities provided with Eagle/Ghost for Market Surveillance
a. Status/Cancel Working Orders
b. Status Mass Quotes
c. Status/Bust Trades
d. Status Blocks
e. Plus:
 1. Surveillance by value-date
 2. Agent shall use single Ghost instance to be able to perform status across FX Marketplace and other CME markets
 3. Status on Directed RFQ requests and responses can be done in the same way as RFQ's are currently, but with information on both parties available
 4. Differences in terms & convention between the end trader & GCC need to be taken into account for all tools (generic instruments, value dates, etc.)

The system may make available the following audit reports
Order & trade activity—overall and per market
Directed RFQ request and response activity—overall and per market
A given Market Maker's activity in the above
The Exchange will control the account numbers that are authorized in this market and for or each new participant, a unique account number is created
The set of registration data that should be collected for this marketplace is similar to existing data for other markets:
 1. First Name
 2. Last Name
 3. Date of Birth
 4. Social Security #
 5. Work Phone
 6. Work fax (mandatory)
 7. Email (mandatory)
 8. Mobile Phone
 9. City of birth
 10. Secondary School
 11. Trader ID(s) authorized 12. Account #s (new addition but see below already part of TeleStat)
13. Interfaces used
   a. iLink 2
   b. EOS
   c. Globex trader
   d. Firmsoft
   e. FX Marketplace
14. Contact type
   a. Technical
   b. Market
   c. Firm Admin Primary
   d. Firm Admin Secondary
15. TeleStat
   a. Security Question
   b. Security Answer
   c. Trading Address
      i. City
      ii. Country
      iii. State
   d. Tag 50/Sender Sub ID
   e. Firm and Account # Combinations
16. Authorized Contact Signature
17. Clearing Firm Representation and Agreement
   a. Name of clearing firm
   b. signature of officer
   c. name of officer
   d. title
   e. date
18. Customer Representation and Agreement
   a. name of customer
   b. signature of officer
   c. printed name of officer
   d. title
   e. date The FX Marketplace may require an error trade policy that will be administered by the Globex Control Center ("GCC"). Existing error trade tools may be used. GCC should have current capabilities provided by ETP plus, as information about the spread will be passed to clearing, the ETP system should allow inquiry based on this criteria The Clearing House will provide each day the most economically appropriate end of day settlement prices need to be determined for open contracts, with no need for operations or GCC support.

FIG. 6 shows a more detailed block diagram of the system 100 of FIG. 1 according to one embodiment. As was described above, the market participants, e.g. traders 104 and market makers 106, interact with the Exchange 108 to match 110, clear, 112 and settle 114, transactions. Risk management functionality 116 is provided which monitors and manages margin requirements, etc., as was described above, to manage and mitigate the risk undertaken by the Exchange 108 and the market participants 104/106 ensuring a stable market. The Exchange 108 further includes one or more account databases 120 which store records reflecting, tracking and/or recording the transactions undertaken by the market participants 104/106 and/or the results thereof. For example, as a market participant 104/106 places orders, completes transactions or otherwise creates positions 620, 622, i.e. matches, settles and clears trades, the account database(s) are updated to reflect those transactions and/or positions 620, 622, thereby allowing the associated market participant 104/106, as well as the Exchange, to audit, account for, and manage trading activity.

In one embodiment, a futures account database 602 is provided which maintains account records 606 for market participants 104/106 related to their trading activity of futures instruments. Further, a separate FX account database 604 is provided which maintains account records 608 for market participants 104/106 related to their trading activity of FX instruments. It will be appreciated, that while the databases 602, 604 may be logically distinct, they may be implemented in a single storage medium and/or data structure and that such arrangements are implementation dependent and may be further subject to regulatory control.

As discussed above, by acting as an intermediary between market participants 104/106 for the transaction of FX instruments, the Exchange 108 obviates many of the requirements of a bilateral system of trading. In particular, the Exchange novates itself into the transactions between the market participants, i.e. splits a given transaction between the parties into two separate transactions where the Exchange substitutes itself as the counterparty to each of the parties for that part of the transaction, sometimes referred to as a novation. In this way, the Exchange acts as a guarantor and central counterparty and there is no need for the market participants 104/106 to disclose their identities or subject themselves to credit or other investigations by a potential counterparty. For example, the Exchange insulates one market participant from the default by another market participant. Market participants 104/106 need only meet the requirements of the Exchange 108. Anonymity among the market participants 104/106 encourages a more liquid market environment as there are lower barriers to participation.

In addition, by acting as an intermediary, the Exchange 108 is able to provide additional functionality that may not be available in bilateral contracting situations. In one embodiment, the Exchange 108 provides a netting processor 610 coupled with the FX account database 604 which analyzes and/or correlates the various positions 620 within a given account 608 to automatically recognize and/or net positions 620 together where applicable. For example, when a particular market participant 104/106 holds positions 620 which are offsetting with respect to one another, those positions 620 may be netted together. Such netting may reduce and/or eliminate a particular obligation associated with a position 620, thereby reducing the number of settlement transactions that the market participant 104/106 must engage in at the time of settlement. In a bilateral trading environment, offsetting positions 620 may not be netted together as they may be held with respect to different counterparties, possibly under different contractual conditions. Accordingly, the market participant 104/106, in a bilateral trading environment, must settle each position 620 individually. Effectively, the Exchange's role as a central counterparty to transactions consolidates the transacting parties to just the Exchange and the transacting market participant thereby allowing any correlation and subsequent netting of positions to be performed independent of the market participant engaging in the counter-transaction or holding the counter position. With respect to the transactions themselves, the net result between the bilateral environment and the central counterparty environment of the disclosed embodiments may be the same once all positions have been settled or otherwise reconciled. However, there are associated costs with each settlement transaction. Accordingly, by reducing the number of settlement transactions, the transaction costs in the central counterparty system of the disclosed embodiments are reduced as compared with the costs incurred in the bilateral environment.

In yet another embodiment, the Exchange 108 provides a Collateral processor 616 which is operative to determine a collateral value 614 of a given FX account 608 of a market participant 104/106 and provide this collateral value 614 to the risk management functionality 116, such as a risk processor, of the Exchange 108 to be used in offsetting the margin requirement 618 of that market participant's 104/106 Futures account 606. This is referred to as collateralization. In particular, a given FX account 608 will have both a monetized risk value 612 and a collateral value 614 associated with it. The monetized risk value 612 is the monetary value of risk associated with all of the positions 620 in the account. The monetized risk value 612 may be computed similarly to the margin requirement of a future account as has been described. Assuming there has been no collateralization yet of the particular account 608, the collateral value 614 represents the amount of the monetized risk value 612 that the Exchange 108 is willing to allow the market participant 104/106 to pledge against the margin requirement of their Futures account 606. Initially, the collateral value 614 may equal the monetized risk value 612 or may be slightly less, accounting for a "haircut" reduction to prevent the market participant from pledging the entire value of the account 608. On a periodic basis, as was discussed above, the Exchange's 108 risk management functionality 116 calculates the margin requirement 618 of the market participant's futures account 606 based on the positions 622 held within the account 606. Once the margin requirement 618 has been computed, the market participant 104/106 may then be permitted to pledge the some or all of the available collateral value 614 of their FX account 608 to reduce the margin requirement. Where the collateral value 614 exceeds the margin requirement 618, the margin requirement 618 may thereby be satisfied and the collateral value 614 is reduced by the amount pledged. This remaining collateral value may be available to be used against future requirements. However, where the collateral value 614 does not satisfy the margin requirement 618, the margin requirement 618 and collateral value 614 is reduced accordingly and a reduced margin requirement 618 is presented, e.g. a margin call, to the market participant for appropriate satisfaction. As the positions 620 of the account 608 may fluctuate with the activity of the market, the monetized risk 612 and collateral 614 values may similarly fluctuate. This fluctuation will further be reflected in the computation of the margin requirement 618. Overall, collateralization reduces the burden on the market participant 104, 106 to meet the margin requirement 618 of his Futures account 606 by allowing them to leverage value that is already being held by the Exchange 108.

It will be appreciated that the netting processor 610, collateral processor 616, as well as the other functionality of the Exchange 108, including the matching 110, clearing 112, settlement 114 and risk management 116 functionality, may be implemented in hardware, software or a combination thereof. In particular, the exchange 108 may provide a matching processor 110, clearing processor 112, settlement processor 114 and risk processor 116 to implement the disclosed functionality. Further, this functionality may be implemented in logic or computer program code stored in a memory and executable by one or more processors which may be directly or indirectly connected, such as via a network.

Figure 7:
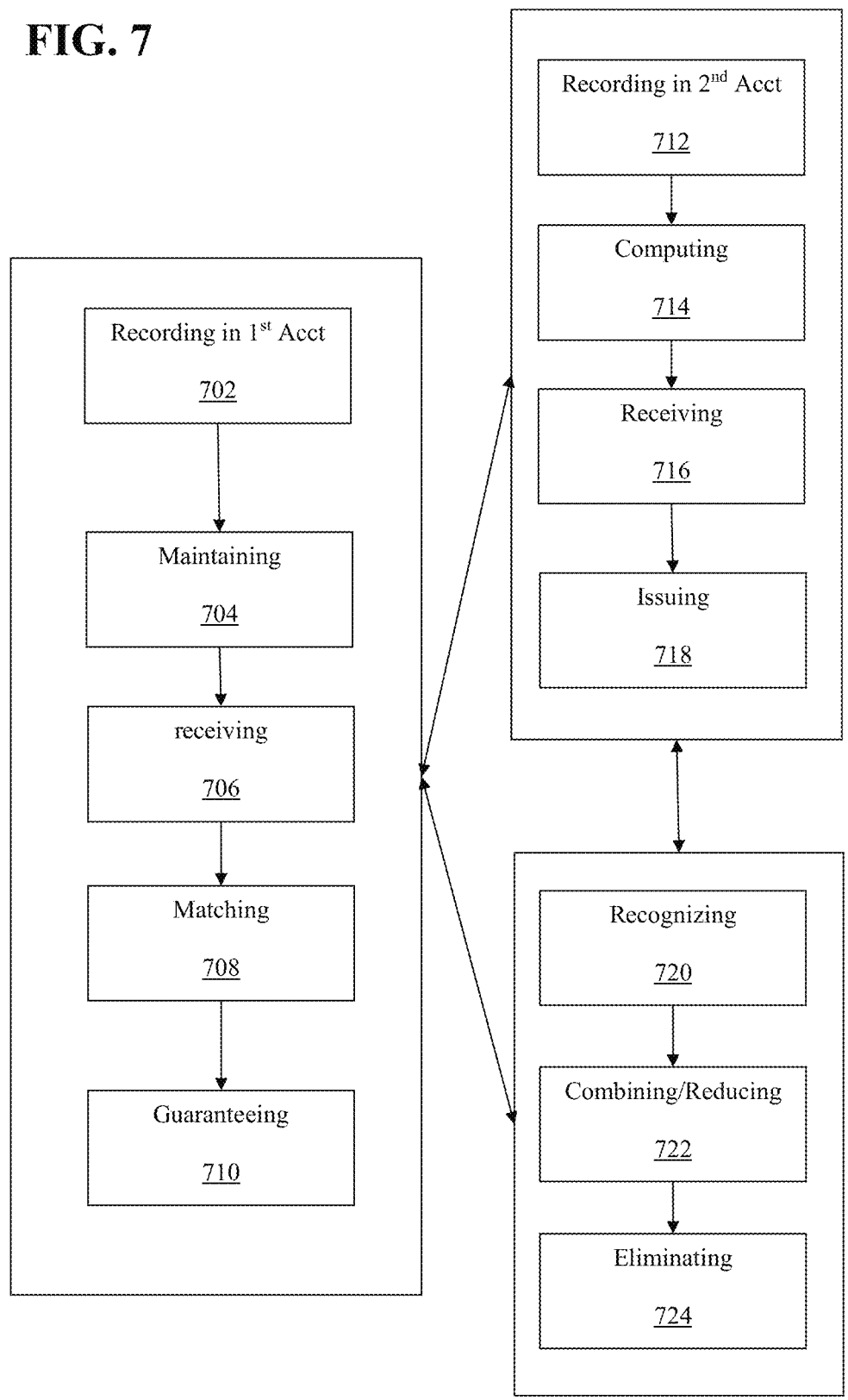
FIG. 7 depicts flow charts showing the operations of the system of FIGS. 1 and 6 according to one embodiment.

FIG. 7 depicts flow charts showing the operations of the system of FIGS. 1 and 6 according to one embodiment. In particular, in one embodiment, a method of trading financial instruments among a plurality of entities, i.e. market participants 104, 106, participating in a market is provided, where the financial instruments include foreign exchange instruments. The method utilizes an intermediary, i.e. a central counterparty, which, in one embodiment, is an Exchange 108 such as the CME. The method includes recording, in a first account 608 associated with a first entity 104, 106 of the plurality of entities 104, 106, a first plurality of positions 620 resulting from transactions related to one or more of the foreign exchange instruments (block 702). The method further includes maintaining the first account by the intermediary 108 (block 704) and receiving from the first entity 104, 106, by the intermediary 108, a request to transact in a particular foreign exchange instrument (block 706). In response thereto, the method further includes matching the request to transact with a counter request received from a second entity 104, 106 of the plurality of entities and facilitating an exchange of the particular foreign exchange instrument without identifying the first and second entities to each other (block 708) and guaranteeing, by the intermediary, that neither the first nor second entity will default on their request (block 710).

In an alternate embodiment, wherein the financial instruments further include futures instruments, the first account 606 may be characterized, based on the first plurality of positions 620, by a monetized risk value 612 and a collateral value 614, the collateral value 614 representative of the monetized risk value 612 less any value pledged as collateral. In this embodiment, the method may further include recording, in a second account 606 associated with the first entity 104, 106, a second plurality of positions 622 resulting from transactions related to one or more of the futures instruments, the second account 606 being characterized by a net position representative of the offset of one or more of the second plurality of positions 622 against another one or more of the second plurality of positions 622 (block 712). The method may further include computing a margin requirement 618 for the second account 606 based on the net position (block 714) and receiving a pledge of a portion of the collateral value of first account to cover the margin requirement of the second account (block 716). In addition, wherein the margin requirement is not satisfied by the pledged portion of the collateral value, the method may further include issuing a margin call to the first entity to fulfill the remaining margin requirement (block 718).

In yet another alternative embodiment, netting may be provided wherein each of the first plurality of positions is associated with an obligation subject to subsequent settlement. In particular, in this embodiment, the method may further include recognizing a first one or more obligations/positions which correlate with a second obligation (block 720) and combing those obligation to create a net obligation/position, whereby the second obligation/position may be reduced (block 722) and eliminating the second obligation where it is nullified (block 724), whereby fewer obligations/positions may remain for subsequent settlement.

The disclosed embodiments also feature Directed Request For Quote (Directed "RFQ" or "DRFQ") functionality. In particular, this functionality permits anonymous and private requests for quote, i.e. the request-recipient is unaware of the identity of the requestor but responses are still routed back solely to the requestor. In prior OTC FX markets, transactions were bilateral, due to the need to manage credit risk, and therefore the transacting parties were known to each other, thereby stifling some potential transactions. Parties needed to know each other so as to evaluate credit risk, etc. In the presently disclosed embodiments, the centralized clearing mechanism buffers this credit risk to the parties, as was described above, and permits transacting parties to remain anonymous, with the clearing mechanism acting as the intermediary and risk buffer. Further, in prior RFQ systems, requests might be directed to particular market makers but the responses thereto, i.e. actionable quotes, were broadcast back to the market generally, increasing the risk/exposure of the responder. In the disclosed Directed RFQ system, requests are anonymized and then routed to all of the market makers, or alternatively only to an appropriate subset of market makers based on the interest profiles of the market makers and/or parameters of the request (discussed in more detail below). Responses/actionable quotes are then routed back only to the requestor rather than the entire market, thereby limiting the exposure of the actionable quotes and reducing the exposure of the responder(s). The automated nature of the disclosed system permits the request/quote transactions to occur in parallel and at pace with the actual market in which the underlying products are being traded via the mechanisms available to all traders, thereby not inhibiting the participants participating in the market. While the disclosed embodiments may be described with respect to FX instruments, it will be appreciated that these embodiments are not limited thereto and may be utilized with other instruments such as futures or options instruments.

In one embodiment, the Directed RFQ functionality operates as follows:
1. A requestor wants to trade a specific amount of a particular instrument through a Directed RFQ. In one embodiment, the Directed RFQ communication includes size, price, side (optional), notional amount, product (currency pair), delivery date and Time to Live ("TTL"):
   a. The specific size is can be down to the whole unit ($1) is not constrained by the "contract size";
   b. Directed RFQ has a minimum and maximum quantity range, defined by currency pair and product type. The minimum can be lower than the contract size (1 million);
   c. The front-end should be able to display the quantity requested in terms of notional amount;
   d. The trade is all-or-nothing between two counterparties—in one embodiment, partial fills are not possible (but may be possible in alternative embodiments);
   e. In one embodiment, any market participant can submit a Directed RFQ;
   f. In one embodiment, the requestor may specify sell-side or buy-side with the system hiding this information from the market makers;
2. A publicly distributed Directed RFQ is broadcast to all, or alternatively, a subset of, market participants;
   a. This initial Directed RFQ has auto-cancel functionality known as a Time-To-Live (TTL), which may be entered by the requestor or automatically generated;
   b. The TTL is part of the public Directed RFQ and is sent out over market data;
   c. After the TTL expires, the initial Directed RFQ may be cancelled;
      i. In one embodiment, all Directed RFQ Responses which have not been accepted are canceled;
      ii. In one embodiment, no more Directed RFQ Reponses are accepted;
3. The trading community responds to the public RFQ with a Directed RFQ Response (new message type);
   a. Any market participant may respond to the Directed RFQ;
   b. Each quote may have auto-cancel functionality known as the Time-To-Live ("TTL");
   c. The TTL may be entered by the responder, as part of the Directed RFQ Response, or automatically generated;
   d. Expired responses receive cancel messages;
   e. Responders can also cancel their quotes at any time;
4. A Directed RFQ system manages all Directed RFQ Responses it receives;
   a. These responses are not put into the public order book, but are sent to the original requester only;
   b. Only the Directed RFQ originator can observe Directed RFQ Responses, along with the TTL associated with each response;
   c. Each quote is anonymous—containing only the price and TTL. In one embodiment, whether the request is a buy-side or sell-side request may be omitted;
5. The Directed RFQ originator can select from any of the live quotes in this private order book;
   a. Once a quote is accepted, the Directed RFQ system then automatically sends in a Privately Negotiated Trade ("PNT")/Block order for the exact notional amount, on behalf of the two parties;
   b. All other quotes are immediately cancelled. Cancel messages to all other responders;
   c. The Directed RFQ itself is "cancelled" and no more Directed RFQ Responses will be accepted for it;
6. Both parties receive normal iLink & Clearing trade reports, subject to the Consolidate Fill requirements below;
   a. The system will optionally update the market volume and other market data statistics, based on appropriate configuration settings.

The Time to Live ("TTL") parameter may be specified as an absolute time of expiration, such as a set time, or a relative time, e.g. a duration measured from some common reference or origin. In one embodiment, transmission delays in the DRFQ, or in the responses thereto, are accounted for in computing the TTL window and determining when responses are properly received therein. In one embodiment, Global Positioning System ("GPS") receivers or some other form of universal time reference, such as a network time reference, e.g. network time protocol ("NTP"), at each point of transmission may be used to provide accurate time synchronization and transmission delay detection. Alternatively, the system may ignore transmission delays, relying on a central time keeping mechanism as the ultimate arbiter.

In embodiments where Directed RFQ's are routed to only a select subset of market makers, the selection may be based on trader and/or market maker profile information known to the system. Selective routing thereby minimizes quote traffic. In both a broadcast and selective routing environment, incentives may be put in place to encourage recipient market makers to respond to the Directed RFQ. Incentives may include trading fee discounts or other incentives. Alternatively, penalties may be implemented to penalize recipient market makers who fail to respond. Penalties may include fines, increased trading fees, trading restrictions or other penalties.

The Directed RFQ mechanism manages all Directed RFQ traffic through the system. In one embodiment, in-bound requests are received and a unique identification number is generated and associated with the request, such as in a log. For example, the request messages/packets, having a particular data structure, may be received into a buffer storage which holds the request for subsequent processing. A computer or other number generator then generates a unique value which is concatenated or otherwise associated with the request, such as by being inserted into the data structure. The Directed RFQ is then pushed out to the market, i.e. broadcast to the market makers, all or a subset thereof, utilizing the identification number in place of the originator/requestor's identification information to identify the Directed RFQ. For example, the various data from the request data structure may be copied into a new message having a similar data structure including the unique identification number but omitting the originator/requestor's identification information. The central system maintains a cross reference database/log of the Directed RFQ identification numbers and the associated requestor identity so as to associate and route responses appropriately, e.g. at the same time that the anonymous request message is generated, the data is stored in the cross-reference database. This database may be maintained in a memory or other storage device.

In one embodiment, individual Directed RFQ Responses may have an associated TTL which extends beyond the expiration of the original Directed RFQ Request. This is acceptable, and Directed RFQ Responses which have not yet expired are fully executable against by the Directed RFQ originator.

In one embodiment, the Directed RFQ system is managed via a central server process. In the event of an "in flight" situation (such as a Directed RFQ Response being cancelled or otherwise expiring while the RFQ originator's acceptance is "on the wire"), whichever request is processed by the Directed RFQ central server first, wins. Other transaction coherency protection mechanisms may also be provided.

Mechanisms may also be provided to allow requestors to manage pending Directed RFQ requests and responders to manage pending responses. This would allow a requestor, for example, to track which Directed RFQ's are active, how long they have to live, the present response status, etc. For responders, the mechanisms permit them to know what actionable quotes are still live and how long they have to live. This would allow, for example, a responder to manage responses to multiple Directed RFQ's to the same product so as not to over expose themselves. For example, an application program interface ("API") may be provided which allows requestors and/or responders to access and/or modify the internal databases/tables maintained by the DRFQ system to manage requests and responses and their associated TTL's as will be described. The API may be a simple command and control interface which receives command/control messages, executes the command contained therein and sends back a response message to the sender based thereon. Alternatively, the API may be a web based interface providing a secure media-rich interactive client application permitting the described management tasks.

FIG. 4 shows an exemplary business message flow for the Directed RFQ functionality of the disclosed embodiments. It will be appreciated that other messaging protocols may also be used to achieve the disclosed functionality. Further, it will be appreciated that the media over which the Directed RFQ messaging traffic flows is implementation dependent and may include wireless and wired networks, private and publicly accessible networks, or combinations thereof.

In response to a Directed RFQ, there may be multiple responses from various interested parties. These responses may be generated substantially simultaneously or over a window of time as the various parties receive and react to the Directed RFQ. Further, the transmission of the Directed RFQ as well as the responses thereto, may be subject to various network latencies between and among the disclosed system and the transacting parties. Further, each response may include different parameters, including a different TTL. In one embodiment, the Directed RFQ is matched to the first response which meets the request parameters, i.e. the business requirements specified by the request originator, and all other responses are rejected. This matching may be automatically performed by the system or, alternatively, responses may be routed back to the originator who then selects the response they wish to trade with based on criteria of their choosing. In one embodiment, the originator may select a desired response based on at least the price wherein the system then automatically selects among the available responses at that price via the mechanisms described below. It will be appreciated that many different matching/selection mechanisms may be utilized ranging from fully automated systems to fully manual systems, and all such systems are contemplated herein.

In an alternate embodiment, the Directed RFQ central server may maintain a private order book on behalf of the originator which maintained, for example, until the TTL of the Directed RFQ expires. Mechanisms may be provided which balance the parameters of each response against the parameters/requirements of the Directed RFQ so as to match the most optimal response(s) with the request. For example, a "window of opportunity" may be defined in which responses are allowed to accumulate before evaluating those responses and matching to the most optimal. Such factors considered in matching requests with responses may include the price, quantity, TTL (of the request and/or the response), or combinations thereof. Once the "window of opportunity" closes, all subsequently received responses are rejected even if they may be more optimal than an accepted response. In one embodiment, the "window of opportunity" may be dynamic and may be based on the latest expiring response which meets one or more of the request parameters. Alternatively, the "window of opportunity" may be statically defined or may be defined by a parameter of the Directed RFQ itself, on a transaction by transaction basis, such as by the TTL of the Directed RFQ. Typically, the requestor will desire a long TTL on the responses to allow for the best selection of quotes while the responder will want a short TTL on the response to minimize exposure/risk. Once the window closes, the central server evaluates the received responses and takes the best price which matches the originator's requirements (as stated in the Directed RFQ). The system may then execute a block trade on behalf of both parties to complete the transaction. In one embodiment, multiple responses which tie for the best price or otherwise meet the requirements may be subject to selection by First in First Out, or other arbitration mechanism such as round-robin. Once the transaction is complete, fill notifications are sent back to both parties, etc.

Given the transmission latencies noted above, a given response may arrive at the system later than a later-generated response or miss the TTL of a given Directed RFQ, and may therefore miss a matching opportunity, depending on the transmission latencies in the system. In one embodiment, logic is included to evaluate responses based on the time they are generated and the time they are actually received to mitigate "in-flight" discrepancies and otherwise maintain coherency between Directed RFQ's and the responses thereto, ensuring equal opportunity to the market participants and minimizing re-transmission of requests and responses.

In one embodiment, Directed RFQ transactions occur outside of the normal central order book. In an alternative embodiment, a particular Directed RFQ may be allowed to match against the central order book where a suitable order is present.

In one embodiment, conditional responses to a Directed RFQ may be supported allowing a responder to attach conditions to their response/actionable quote. Matching of the response to the request factors in whether the specified conditions are met, in addition to other factors.

In an alternative embodiment, indicative quoting is also supported allowing market makers to publish indicative quotes to the market place and invite Directed RFQ's from interested parties prior to issuing actionable quotes.

Figure 8:
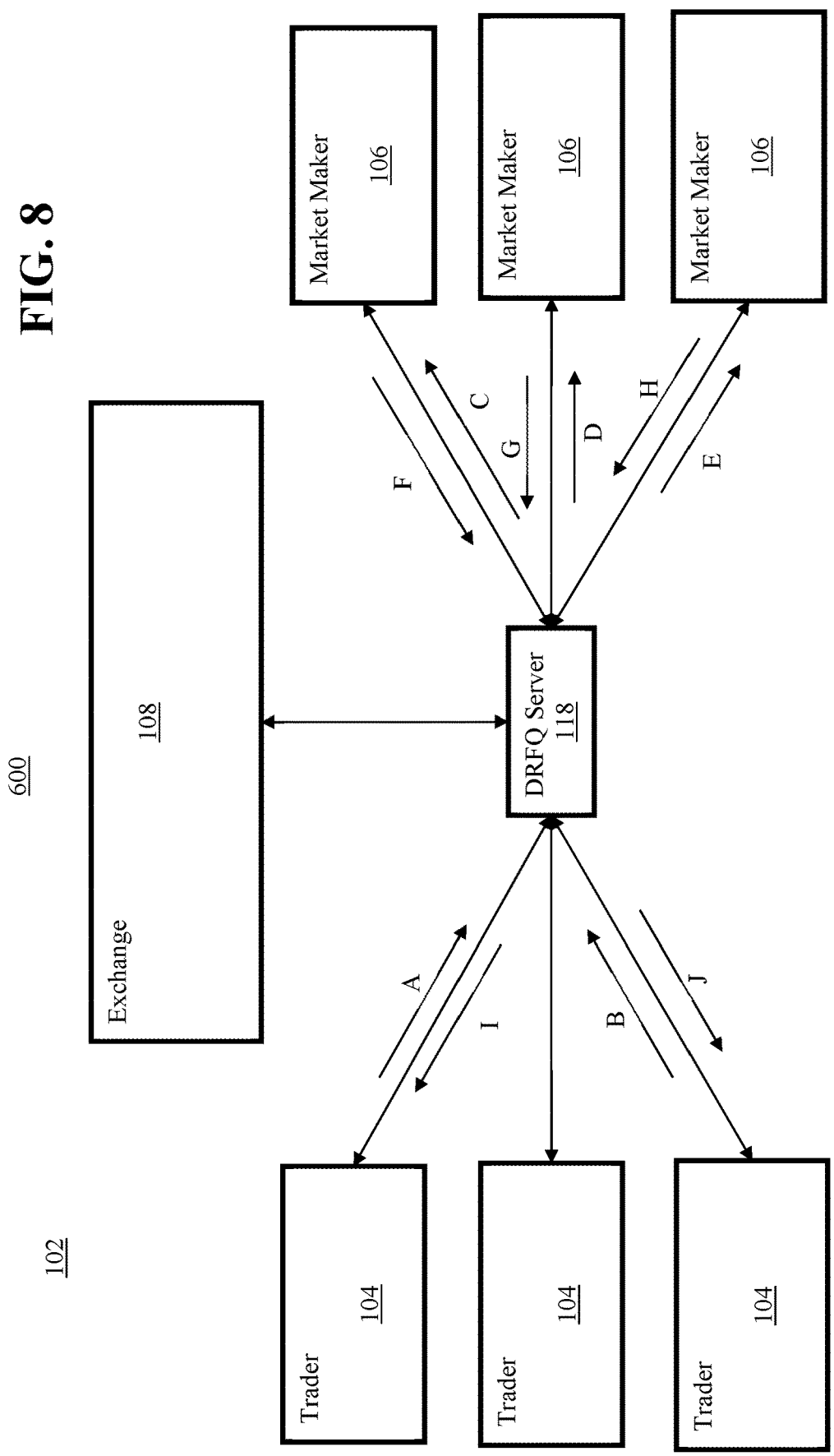
FIG. 8 depicts a block diagram of an exemplary system for trading OTC FX instruments having a directed request for quote system according to the disclosed embodiments.

FIG. 8 depicts a block diagram of an exemplary system 600 for trading OTC FX instruments having a directed request for quote server 118 according to the disclosed embodiments. It will be appreciated that the DRFQ server 118 may be integrated with an exchange 108 or separate therefrom. Further, the DRFQ server 118 may be implemented in hardware, software or a combination thereof and may be further implemented as one or more discrete devices and/or software programs interconnected via a wired and/or wireless network. The system 600 includes the DRFQ server 118 coupled with an exchange 108, such as the Chicago Mercantile Exchange described above. The DRFQ server 118 is further coupled with a plurality of market participants, such as traders 104 and market makers 106, such as via network connections, wired or wireless, between the DRFQ server 118 and terminals and/or terminal application software used by the market participants 104, 106 to participate in the market. It will be appreciated that interconnections between the DRFQ server 118 and the market participants 104, 106 may be implemented via the exchange 108. In one embodiment, the market participants 104, 106 execute a client application interface which communicates with the DRFQ server 118 using a defined communications protocol to implement the disclosed functionality. This client application interface may be integrated with the market participant's other software used for trading on the exchange 108 or may be separate therefrom, such as a web based interface. The communications protocol may include a proprietary protocol, non-proprietary protocol, e.g. TCP/IP based, or combinations thereof, and may feature security protocols to protect the communications and error detection/correction and quality of service ("QOS") protocols to ensure reliable and expedient communications. It will be appreciated that the described functionality may be implemented as hardware and/or computer program logic/software at the server 118, on the terminals of the market participants 104, 106, at the exchange 108 or via a combination thereof.

As an operational example, in one embodiment, a first entity, such as a trader 104 sends a DRFQ to the DRFQ server 118 (labeled A). For example, the trader 104 utilizes their application interface to generate a DRFQ message including the specified parameters according to a system-defined data structure, and transmit the DRFQ message to the DRFQ server 118 utilizing the system-defined communications protocol, which may include securing the DRFQ message, such as by encrypting it. The DRFQ A identifies the first trader 104, specifies an instrument, such as a particular FX instrument, that the first trader 104 is interested in trading, the time and date that the request was generated and/or transmitted and, in one embodiment, specifies a time to live for the request. The DRFQ A may further specify whether the first trader 104 is interested in buying or selling the specified instrument. A second trader 104 also sends a DRFQ to the DRFQ server 118 (labeled B), identifying the second trader 104 and specifying an instrument, an optional time to live and an optional buy or sell indication. It will be appreciated that the DRFQ's A and B may further specify other information necessary to accomplish the disclosed functionality and that such information is implementation dependent. Upon receipt of the DRFQ's A and B, the DRFQ server 118 may send acknowledgement (not shown) back to the first and second traders 104 to confirm the receipt of the DRFQ's A and B.

Upon receipt of the DRFQ's A and B, the DRFQ server 118, as will be described in more detail below, logs the time/date of receipt, anonymizes the DRFQ's A and B, determines one or more other entities, such as other market participants 104, 106, to which to transmit the anonymized DRFQ's A and B and transmits them thereto. In particular, the DRFQ server 118 removes the identity of the requesting trader 104 from the DRFQ A, B, while maintaining the ability to correlate the any responses back to the requesting trader 104. For example, the DRFQ server 118 may generate a unique identification code for the DRFQ A, B and log that identification code in a cross-reference log/database associated with the identity of the requesting trader 104. The identification code is then substituted in the DRFQ A, B for the identity of the requesting trader 104 such that the requesting trader 104 can only be identified from the DRFQ A, B using the cross-reference maintained by the DRFQ server 118.

Once anonymized, the DRFQ server 118 then identifies one or more other market participants, such as market makers 106, that would be interested in quoting for the instrument specified in the DRFQ A, B. In one embodiment, the anonymized DRFQ A, B may be broadcast to all market participants 104, 106 or all market makers 106. In an alternative embodiment, the DRFQ server 118 may maintain interest profiles for each of the market participants 104, 106 which specify what those participants 104, 106 are interested in trading. These interest profiles may be maintained by the market participants 104, 106 themselves, such as in real time. Based on these interest profiles, the DRFQ server 118 selects one or more market participants 104, 106 to receive the anonymized DRFQ A, B. In the example of FIG. 8, anonymized DRFQ A may be sent to first and second market makers 106 (labeled C and D) while DRFQ B may be sent only to the third market maker 106 (labeled E). In one embodiment, if the DRFQ A, B specifies the buy or sell intent of the requesting trader 104, this indication may be removed prior to transmitting the anonymized DRFQ A, B to the selected market participants.

The DRFQ server 118 may further note the time-to-live ("TTL") specified for each DRFQ A, B. As was discussed above, the TTL determines how long the particular request will be kept "alive," i.e. what is the window of time over which responses to the request will be considered. The TTL may be specified as an absolute expiration, e.g. 10:05 p.m., Apr. 18, 2006, or may be specified as a duration measured from a particular origin, e.g. 1 hour from the time the transmission time of the request (specified in the request) or 1 hour from the receipt of the request by the DRFQ server 118. As an alternative to specifying the TTL in the DRFQ itself, the TTL may be automatically specified by the DRFQ server 118, such as a default TTL, which may be used, for example, when the DRFQ fails to specify the TTL or completely in place of a DRFQ specified TTL. As will be described in more detail below, the once the TTL elapses or otherwise expires, the associated DRFQ expires, i.e. the window of opportunity to receive actionable quotes in response to the request is closed. In one embodiment, a server process monitors all of the TTL's of the pending requests and responses and determines when they expire. For example, each TTL may be used to set a counter maintained by a data structure which is decremented by the server process at a defined interval. When the counter value is determined to be zero, the server process generates an alert or alarm to indicate that the particular TTL has expired. This alert/alarm may trigger other server processes which implement the disclosed functionality. In one embodiment, the expiration of the TTL may cause the server 118 to transmit cancellation notices to all of the market participants to which the associated DRFQ was sent, or alternatively, to those market participants 104, 106 who have not yet responded with an actionable quote in response thereto. Actionable quotes received before expiration of the TTL, but not accepted before expiration may be either cancelled or accepted, as will described below. Where the actionable quote is cancelled, a cancellation message may be sent back to the originating market participant 104, 106. Actionable quotes received after expiration of the TTL may be rejected or allowed as will be described below. Responses carrying actionable quotes which are in transit at the time the TTL expires, e.g. "in flight", may be allowed or other algorithms may be employed to ensure fair operation which accounts for such situations, e.g. actionable quotes having been generated/transmitted prior to expiration of the TTL may be accepted. Where time of transmission may be utilized as the basis of accepting actionable quotes, mechanisms may be implemented to ensure certainty that no more "in-flight" transmissions exist, such as an absolute cut-off time.

Once the particular market participants 104, 106 receive the anonymized DRFQ's C, D, E, they will evaluate them to determine whether or not they wish to respond with an actionable quote. If so, the market participants 104, 106 will send a response back to the DRFQ sever 118. The response (labeled F, G, H) may include an actionable quote and identify the DRFQ to which the actionable quote is in response, such as by specifying the unique identification code of the particular DRFQ C, D, E, which will allow the DRFQ server 118 to associate the response with the DRFQ originator. Alternatively, a market participant 104, 106 may ignore the DRFQ if they have no interest in responding or respond to say they will not be providing an actionable quote rather than simply ignoring the DRFQ, such as to provide a confirmation back to the DRFQ server 118 that the DRFQ was at least received.

The response F, G, H may further specify a TTL for the actionable quote, similar to the TTL for the DRFQ, specifying how long the quote will remain valid. The response TTL serves to mitigate the exposure of the market participant 104, 106 by limiting the life span over which the actionable quote may be accepted by the DRFQ originator. As with the request TTL's, response TTL's may be specified in the response or may be automatically specified by the server 118, such as by a default value in situations where no TTL is specified. The TTL may specified as an absolute time or may be relatively specified such as by a specific duration measured from an origin, or the TTL may be specified based on an event, such as based on the expiration of the request TTL.

If the TTL of the response expires prior to acceptance of the associated actionable quote, the actionable quote may be cancelled. In such a situation, a cancellation message may be transmitted back to the response originator to inform them that their quote was not accepted prior to expiration of the TTL. Should the response be received after its TTL has expired, the response may be rejected with a suitable message being sent back to the originator. In one embodiment, the request TTL may be ignored so long as there is a response whose TTL has not yet expired.

In one embodiment, a market participant 104, 106 may explicitly cancel or rescind a previously submitted actionable quote so long as the cancellation request is received prior to acceptance of that quote. Mechanisms may further be provided so as to account for a cancellation which is sent prior, but received subsequent, to acceptance of the actionable quote. For example, the time of transmission and receipt may be analyzed to determine when the cancellation was sent and acceptance of the quote may be cancelled if the actionable quote was properly cancelled.

Once actionable quotes are received by the DRFQ server 118, they must be processed against the associated DRFQ's to determine if they are acceptable or not to the DRFQ requestor. In one embodiment, each response/actionable quote received by the DRFQ server 118 is associated with the DRFQ originator, such as by cross referencing the DRFQ identifier and identify the originating entity. The actionable quote is then forwarded to the DRFQ originator for review (labeled I, J). As described, the responses/actionable quotes are sent only to the DRFQ originator rather than the entire market. This minimizes the exposure of the originator of the actionable quote by restricting who in the market may see it. In one embodiment, the actionable quotes are anonymized prior to sending the DRFQ originator. The actionable quote is forwarded along with the associated TTL so that DRFQ originator knows how long they have to make a decision. If the DRFQ originator wishes to accept the quote, they may return an acceptance message back to the DRFQ server 118. Alternatively, the DRFQ server 118 may automatically match acceptable actionable quotes and accept those quote based on the parameters specified in the DRFQ itself. In this embodiment, while the actionable quotes may be forwarded back to the DRFQ originator for informational purposes, the acceptance of those quotes is automatically handled. In yet another alternative embodiment, the DRFQ originator may specify whether they want to specifically review and accept the quote or rely on the DRFQ server 118 to do so automatically. Where the DRFQ originator may respond with an acceptance to an actionable quote, mechanisms may be implemented to handle "in flight" issues such as where an acceptance is sent prior to expiration of the actionable quote TTL but received after expiration thereof or where the acceptance is sent prior to receipt of a cancellation of the actionable quote but received after the cancellation thereof. Such mechanisms ensure a fair market which operates in a definite/certain/unambiguous manner according to the expectations of the market participants.

In embodiments where the DRFQ server 118 may automatically accept actionable quotes, such acceptance may be based on whether the actionable quote is the first received of multiple actionable quotes received. Where the first actionable quote does not completely satisfy the DRFQ, the server 118 may allow partials fills, accepting actionable quotes in the order they are received until the entire DRFQ is satisfied. Again, mechanisms may be in place to ensure that an actionable quote sent prior to, but received after, another quote, is accepted first. Alternatively, the DRFQ server 118 may accumulate a number of actionable quotes over a window of time, such as the TTL of the request, or the shortest or longest TTL of a received actionable quote. Upon closing of this window of opportunity, the server 118 may then evaluate and accept the one or more actionable quotes which best meet the parameters of the DRFQ. In this embodiment, the DRFQ may further specify criteria for acceptance with the server 118 determining the degree to which the criteria are satisfied by the received actionable quotes. These criteria may include request lifetime, quantity, maximum price, minimum price, buy order, sell order, or combinations thereof. Where more than one actionable quote meets the criteria, the server 118 may allocate acceptance among one or more of those quotes. The server 118 may further notify each market participant as to whether their quote was accepted or not.

Once one or more actionable quotes are accepted in response to the DRFQ, the actionable quote is sent to an exchange, such as the CME, to be matched and completed.

As market participants 104, 106 may have multiple concurrent DRFQ's and actionable quotes pending at any given time, management functions are provided to allow the market participants 104, 106 to track pending/concurrent DRFQ's and/or actionable quotes and cancel or otherwise modify those pending DRFQ's and/or actionable quotes. For example, the server 118 may provide real time information showing the pending status of a DRFQ and all actionable quotes received in response thereto, showing the respective TTL's and a real time comparison/evaluation of the responses as measured against each other and the DRFQ. Further, the originator of the DRFQ or actionable quote may be permitted to extend the TTL if they so desire.

As was discussed, coherency issues exist when requests and responses thereto are characterized by an expiration period, such as a TTL as described. Transmission or other processing delays may cause "in flight" issues where messages sent before an expiration, arrive after or messages, such as acceptance and cancellation messages, cross in transit. Mechanisms to protect coherency in the market and maintain expectations among the participants 104, 106 of a definite, certain, consistent and unambiguous market may be established to minimize or eliminate coherency problems. For example, an acknowledgement protocol may be implemented requiring receipt of a message to be acknowledged within defined time window. Where a sender fails to receive the appropriate acknowledgement, they will assume a transmission failure and resend their message. Further, redundancies may also be added to ensure reliable message transmission. In addition, messages may be time-stamped with the time of transmission, the time of transmission being used to compare messages to ensure processing in the proper order, or otherwise compensate for out-of-order receipt. All of this information may further be logged to provide an audit trail allowing post-mortem evaluation of unexpected operation, failures, etc.

The DRFQ server 118, in conjunction with the exchange 108, then obviates the need for bilateral relationships between the market participants and buffers the risk of loss with respect to the instruments being traded among the market participants.

Figure 9:
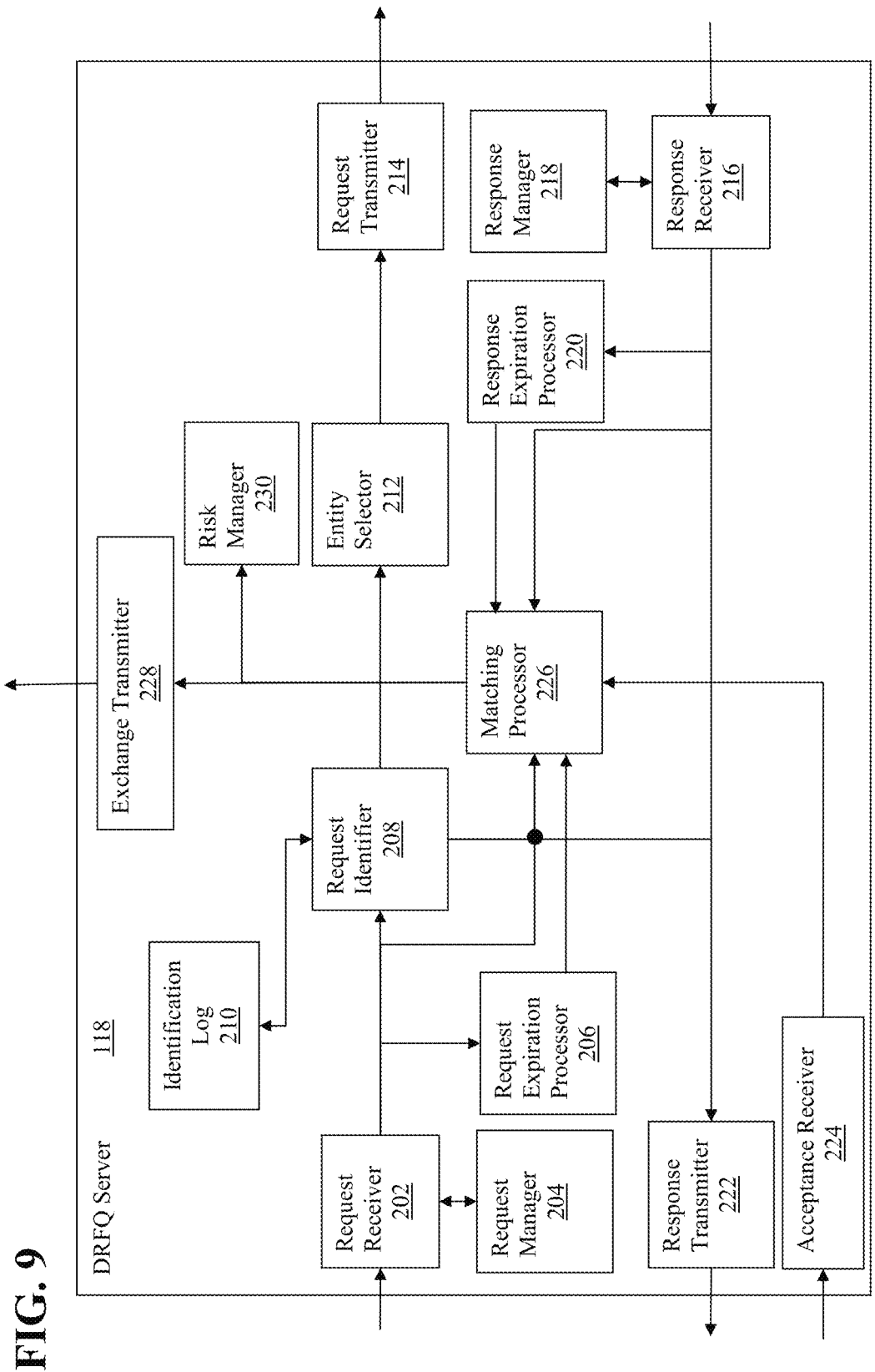
FIG. 9 depicts a block diagram of one embodiment of a directed request for quote server for use with the system of FIG. 6.

FIG. 9 depicts a block diagram of one embodiment of a directed request for quote ("DRFQ") server 118 for use with the system of FIG. 8. The DRFQ server 118 includes a request receiver 202 coupled with a network (not shown) and operative to receive a request for quote from a market participant as described above, a request transmitter 214 coupled with the request receiver 202 and the network and operative to transmit the request for quote to at least a subset of the plurality of market participants without identifying the request originator, a response receiver 216 coupled with the network and operative to receive at least one response from at least one of the market participants identifying the request for quote and including an actionable quote in response thereto, and a response transmitter 222 coupled with the response receiver 216 and operative to transmit the at least one response exclusively to the request originator. In one embodiment, the response transmitter 222 may further anonymize the responses/actionable quotes prior to sending them to the request originator. In an alternate embodiment, where the DRFQ specifies an intent to buy or sell, the request transmitter 214 may further transmit the request without identifying the intent. In one embodiment, the response receiver 216 is further operative to receive a cancellation of the actionable quote and prevent acceptance of the actionable quote in response thereto when the cancellation is received prior to acceptance.

In one embodiment the server 118 includes one or more processors (not shown), one or more memories (not shown) and/or other storage media coupled with the one or more processors and a network interface (not shown) coupled with the one or more processors and the network and operative to facilitate communications therebetween. Each of the request receiver 202, request transmitter 214, response received 216 and response transmitter 222 may be implemented in hardware, software/logic or a combination thereof. For example, the server 118 may further include first logic stored in the memory and executable by the processor(s) to receive a first communication comprising a request for quote via the network from one of the market participants as described above, second logic, coupled with the first logic, stored in the memory and executable by the processor(s) to transmit a second communication comprising the request for quote via the network to at least a subset of the other market participants without identifying the request originator, third logic stored in the memory and executable by the processor(s) to receive at least one third communication comprising a response via the network from at least one other market participant, the response identifying the request for quote and including an actionable quote in response thereto, and fourth logic, coupled with the third logic, stored in the memory and executable by the processor(s) to transmit via the network a fourth communication comprising the response exclusively to the request originator. As was described above, the server 118 may be implemented in hardware, software or a combination thereof, further, while various components are discussed in terms of their discrete functions, it will be further appreciated that one or more of the described functions may be implemented in a single component or any one function may be performed by multiple discrete components, or combinations thereof, and is implementation dependent.

The server 118 further includes, as logic stored in the memory and executable by the processor(s), or otherwise as hardware/software or a combination thereof, an entity selector 212 coupled with the request receiver 202 and request transmitter 214 and operative to identify one or more of the other market participants in response to the request for quote which may be interested in providing a quote. In one embodiment, the entity selector may maintain an interest profile for each of the market participants wherein the entity selector identifies which market participants to send the DRFQ to based on the interest profile of the associated market participant.

As was described, the DRFQ server 118 anonymizes the DRFQ's before sending them to the interested market participants. In one embodiment, the server 118 includes a request identification log 210 coupled with the request receiver 202 and response transmitter 222, wherein the request receiver 202 is further operative to store an identification of the request originator in relation to the request for quote in the request identification log 210 and the request transmitter 222 is further operative to associate the received responses with the request originator based on the identification stored in the request identification log 210 and transmit the response based thereon. The request identification log 210 may be implemented in the memory or other storage medium and may include a database, table or other data structure(s) suitable to implement the disclosed functionality. In one embodiment, the server 118 may include, as logic stored in the memory and executable by the processor(s), or otherwise as hardware/software or a combination thereof, a request identifier 208 coupled with the request receiver 202, the request transmitter 214 and the response transmitter 222, wherein the request identifier 208 is operative to generate a unique identification code having no externally discernable relation to the request originator and create a relationship between the unique identification code, the request for quote and the request originator, wherein the request transmitter 214 is further operative to transmit the unique identification code along with the request for quote, and further wherein the responses/actionable quotes received in response thereto include the unique identification code, the response transmitter 222 being further operative to transmit the responses to the request originator based the unique identification code from the response and the relationship provided by the request identifier 208. In one embodiment, the request identifier 208 may include a number generator, such as a random number generator, and may further be coupled with the identification log 210 to store the unique identification codes in relation to the identities of the associated DRFQ originators. Alternatively, the request identifier 208 may generate or assign unique identification codes based on events such as the time/date of the receipt of the request, based on an encoding of one or more of the parameters of the request, such as an encryption or hash thereof, or combinations thereof.

As was described above, the DRFQ's and/or responses thereto, may specify a TTL. The server 118 includes, as logic stored in the memory and executable by the processor(s), or otherwise as hardware/software or a combination thereof, a Request Expiration Processor 206 and Response Expiration Processor 220 to process the TTL's of the requests and responses as was described above. The processors 206, 220 log the TTL's of the requests and responses and monitor the TTL to determine when they expire. In one embodiment, the processors 206, 220 may maintain the requests, responses and their associated TTL's in a table or other suitable data structure wherein the data structure further includes a decremented value which is initialized as the TTL value and subsequently decremented at regular intervals by the processors 206, 220 until they reach a zero or negative value signifying expiration thereof. Upon expiration, the processors 206, 220 perform the described actions, such as canceling the requests and/or responses and/or sending cancellation/expiration messages to the appropriate entities. In embodiments featuring a default TTL for either the requests or responses, the appropriate processor 206, 220 may specify the default TTL to be used. The operations of the request and response expiration processor 206, 220 may further implement the coherency mechanisms described above. For example, in one embodiment, wherein the responses are further characterized by time of transmission and a time of receipt different from the time of transmission, the request and/or response expiration processor 206, 220 may further include a synchronization processor (not shown) coupled with the response receiver 216 and/or request receiver 202 to compensate for the difference between the time of transmission and the time of receipt.

The server 118 further includes, as logic stored in the memory and executable by the processor(s), or otherwise as hardware/software or a combination thereof, a matching processor 226 coupled with the request receiver 202 and the response receiver 216 and operative to determine acceptance of the actionable quotes which are received in response to the DRFQ's sent to the market participants. As described, the matching processor 226 may accept quotes based on instructions from the DRFQ originator, may automatically accept quotes by comparing the DRFQ against the received actionable quotes or based on some other criteria, such as on a first received or best match basis, or a combination thereof. In embodiments where the DRFQ originator may evaluate and accept one or more of the actionable quotes, an acceptance receiver 224 is provided as logic stored in the memory and executable by the processor(s), or otherwise as hardware/software or a combination thereof, which is coupled with the matching processor 226 and operative to receive the acceptance from the DRFQ originator. The acceptance receiver 224 may also be coupled with the response expiration processor 220 to determine if the acceptance was received prior expiration of the TTL of the actionable quote. In one embodiment, if the acceptance is received too late, the acceptance may be rejected and an appropriate message sent back to the DRFQ originator.

In embodiments which provide for automated acceptance of the actionable quotes, the server 118 may permit the DRFQ to further specify at least one criteria for acceptance of an actionable quote in response thereto. The matching processor 226 would then determine the degree to which the criteria are satisfied by the actionable quote(s) received. The criteria may include request lifetime, quantity, maximum price, minimum price, buy order, sell order, or combinations thereof. Where multiple actionable quotes are received, the matching processor 226 may determine which of those actionable quotes best satisfies the DRFQ. In one embodiment, the matching processor 226 may allocate the DRFQ among multiple actionable quotes that best match the specified criteria.

The matching processor 226 may further send notifications to those market participants 104, 106 whose quotes where not accepted informing them of such.

The DRFQ server 118 further includes, as logic stored in the memory and executable by the processor(s), or otherwise as hardware/software or a combination thereof, an exchange transmitter 228 coupled with the matching processor 226 and operative to transmit the request for quote and the accepted actionable quote(s) to an exchange upon acceptance, as was described.

In addition, in one embodiment, the DRFQ server 118 further includes, as logic stored in the memory and executable by the processor(s), or otherwise as hardware/software or a combination thereof, a request manager 204 and/or a response manager 218. The request manager 204 permits DRFQ originators to manage multiple pending DRFQ's, for example to allow them to cancel a pending DRFQ or modify its TTL, or other parameter such as the acceptance criteria which define an acceptable actionable quote. The response manager 218 permits respondents to DRFQ's to modify their pending actionable quotes such as by canceling them, modifying their TTL or modifying some other parameter. The request manager 204 and/or response manager 218 may be implemented as an API, such as web based API, to which the market participants use a client application, such as a web browser, to interact.

The DRFQ server 118 may further include, as logic stored in the memory and executable by the processor(s), or otherwise as hardware/software or a combination thereof, a risk manager 230 which monitors all of the pending DRFQ's and pending actionable quotes, along with the identities of the associated participants. The risk manager 230 may compute, on a real time or other basis, the various exposures/risks of loss of each participant, compute margin requirements, identify trading anomalies or irregularities, such as fraud or illegal activity, or combinations thereof. The risk manager 230 may report this data to the market participants and/or to the exchange or operator of the DRFQ server 118.

Figure 10:
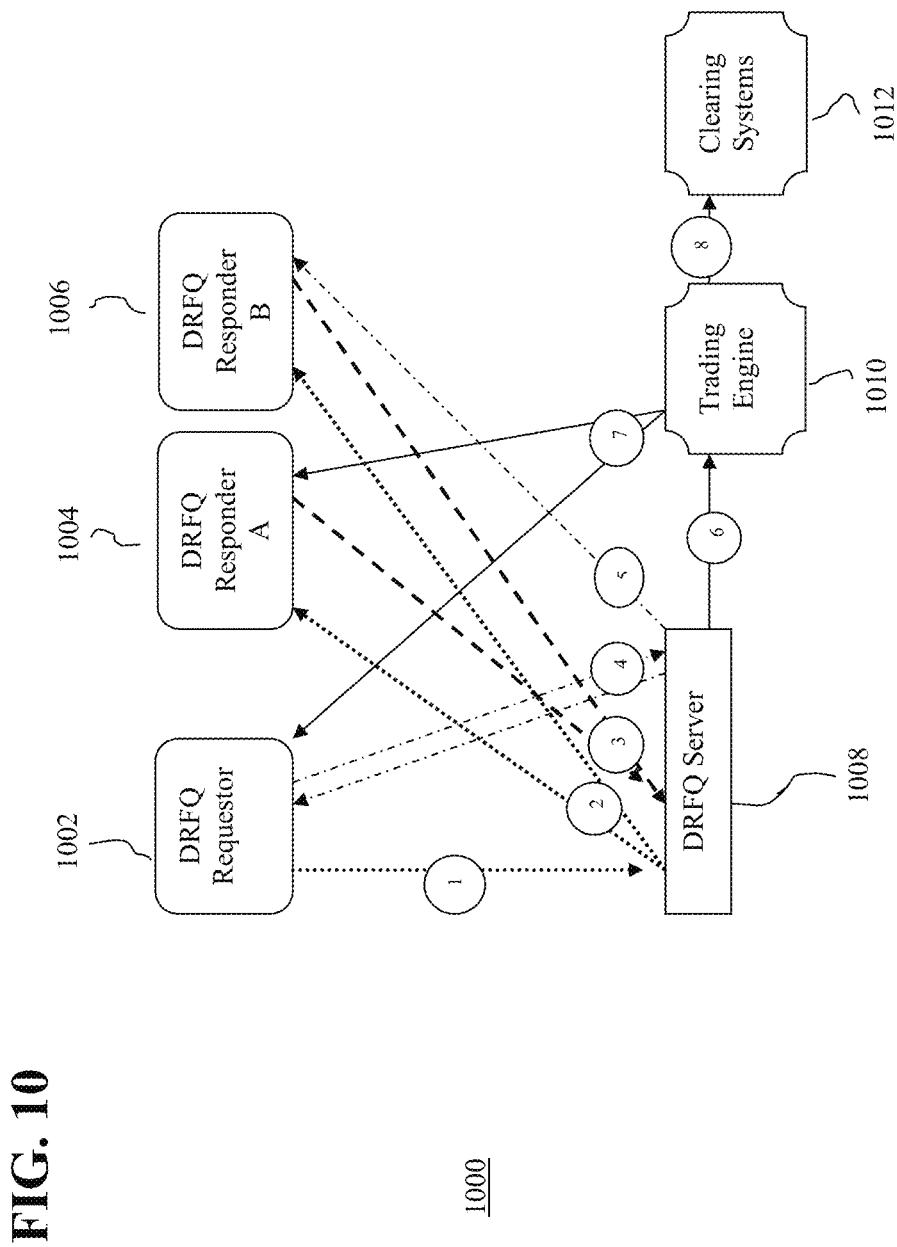
FIG. 10 depicts a block diagram of an exemplary system for trading OTC FX instruments having a directed request for quote system according to an alternative embodiment.

FIG. 10 depicts a block diagram of an exemplary system 1000 for trading OTC FX instruments having a directed request for quote system according to an alternative embodiment. Each box shown in FIG. 10 represents a specific computer, or set of computers, performing a unique function as described. The system 1000 operates as follows:

1. A DRFQ Requestor 1002 sends in a new request for quote to the DRFQ Server 1008. This could be an RFQ for size (quantity), for price, or both.
   a. The DRFQ Server 1008 accepts the DRFQ Request from the DRFQ Requestor 1002 and responds with an acknowledgement message (not shown), directly back to the DRFQ Requestor 1002.
   b. If the DRFQ Request was malformed or if it was otherwise invalid (due to instrument/market definition or timing), the DRFQ Server 1008 could reject the Request with a reject message sent direct back to the Requestor (not shown).
2. The DRFQ Server 1008 publicly publishes an anonymous DRFQ, all market participants receive this message via CME's Market Data interfaces. The DRFQ has a unique identifier which the DRFQ Server 1008 can use to map it back to the original DRFQ Request.
3. Various market participants 1004, 1006 may respond with actionable DRFQ Responses. These DRFQ Response will fulfill the DRFQ Request and use the unique identifier as a reference.
4. The DRFQ Server 1008, either via a query to the DRFQ Requestor 1002 or via some normalized/algorithmic booking means, determines the best DRFQ Response and matches up the two sides of the transaction.
   a. OPTIONAL: Message segments 4 below show the DRFQ Server 1008 sending the query to the DRFQ Requestor 1002. This could be the best DRFQ Response matching the original DRFQ Request 1002 or it could be the entire set of DRFQ Responses. In either case, it is anonymous data. The DRFQ Requestor 1002 can then choose which DRFQ Response to use for the transaction.
   b. OPTIONAL: The algorithmic selection criteria could be best price, best size, best time, or some set therein. It could also have a Market Maker feature which allowed certain DRFQ Responders 1004, 1006 priority over others.
5. The DRFQ Server 1008 will send an acknowledgement to the DRFQ Responders 1004, 1006, letting each know the status of their DRFQ Response. It could be cancelled, in the case where it did not meet the selection criteria
6. The DRFQ Server 1008, having both sides of the transaction in hand, will create a Block trade and send it into the Trading Engine 1010.
7. The Trading Engine 1010 sends FIX Fill Notification messages (normal/current practice) to the two parties associated with the trade.
8. The Trading Engine 1010 then sends the trade information to the Clearing Systems 1012 whereupon normal CME clearing processes take effect.

More information regarding Directed Requests For Quotes may be found in U.S. patent application Ser. No. 11/452,653, entitled "SYSTEM AND METHOD FOR DIRECTED REQUEST FOR QUOTE", filed Jun. 14, 2006, the disclosure of which is herein incorporated by reference.

In one embodiment, Mass Quoting and associated market maker protections are supported for Directed RFQ trade flow. Where market maker protections are triggered, by either a Directed RFQ or CLOB-based mechanism, both the MassQuotes in the existing CLOB markets may be canceled and, additionally, any active Directed RFQ responses may also be immediately cancelled by the system.

As noted above, DRFQ responses, generated by market participants in response to DRFQ's, include actionable quotes for the requested products which may be accepted by the DRFQ requestor, such as within the TTL window of the DRFQ response. Acceptance of an actionable quote binds the market participant to the transaction. As each actionable quote represents a transaction, open for given period of time, to which the responding market participant may be bound, there is a certain amount of risk associated therewith until such time as the DRFQ response terminates, i.e. is accepted or expires. In addition, in an active market, there will be many DRFQ's pending/open at any given time, some for the same products, and a given market participant may have many responses, i.e. actionable quotes "alive" at any given time, in response to many DRFQ's, including DRFQ's for the same products. The TTL mechanism described above assists in mitigating the number of open-ended transactions that are pending at any given time, however, a market participant may still have a significant amount of exposure in the system. For example, in response to several DRFQ's for the same product, a given market participant may issue multiple actionable quotes, intending, upon acceptance of one of those quotes, to terminate the remaining quotes. If, however, more than one of the pending actionable quotes should be accepted before the market maker can act and terminate those they did not wish to have accepted, they will be bound to the associated transactions, potentially incurring more liability than anticipated. Alternatively, or in addition, the Exchange may desire to limit the amount of exposure/risk of the various participating market makers in order to maintain market stability and reliability and avoid activities which would be detrimental thereto. Accordingly, the disclosed embodiments provide a mechanism to monitor the amount of exposure/risk that a given market participant has at any given time and provide mechanisms to mitigate or otherwise control that exposure. Such mechanisms may include alerting mechanisms and/or transaction management mechanisms such as mechanisms to prevent a market maker from further responding to DRFQ's, and thereby incur additional risk/exposure, reduce the number pending actionable quotes, or combinations thereof. Further, the disclosed embodiments recognize that excessive exposure may be incurred via multiple smaller transactions, a few large transaction or combinations thereof.

In one embodiment, the system quantifies risk into defined/measurable units, each unit representative of a defined "amount" of risk, measured in dollars or some other metric. Each market participants is then allocated a certain amount of risk units, either statically and/or dynamically, to be used over a particular period which may be temporally defined, transactionally defined, or combinations thereof. For example, the system may include a centralized risk allocation system such as a risk bank which maintains risk accounts for each market participant, each risk account maintaining a risk balance reflecting the amount of risk units available, used, consumed or otherwise unavailable, or a combination thereof. The initial allocation of risk units may be based on multiple factors including credit rating, historical performance, margin account levels, government or other regulation, self or exchange imposed limitations/policies or other factors or combinations thereof. As a market participant issues actionable quotes, the system allocates/checks-out an amount of risk units to the market participant, in relation to the pending quote, based on the risk thereof. The amount/block of risk units allocated may be fixed or may vary depending on parameters of the transaction, government or other regulation, policies of the Exchange or market participant, characteristics of the market participant or other factors or combinations thereof. If the pending transaction is terminated, either cancelled or completed, the allocated risk units may be returned/checked-in to the risk account and thereby be available for future transactions. Alternatively, once consumed, a unit of risk may not be re-used, either permanently, for a period of time or other metric, thereby acting as a limit control. If the risk account is depleted, actions may be taken such as alerting the Exchange and/or the market participant, preventing the market participant from issuing more actionable quotes, or combinations thereof. In one embodiment, the market participant may be able to receive or purchase an additional allocation of risk units. For example, when warranted, they may earn or are awarded more risk units, such as if their credit rating improves or they post an additional bond or collateral. Further, the risk account may reset, either based on a time limit, a transactional limit or a combination thereof, restoring the risk balance. This may be used in systems where the market maker is only protected from over-extending themselves over a defined time window, number of transactions or combination thereof.

In implementation, a supervisory process, coupled with the risk bank, monitors the transaction flow and allocates or de-allocates risk unit from the various risk accounts in the risk bank. In one embodiment, the allocation/de-allocation occurs in real time, allowing for real-time transaction risk processing. Alternatively, the allocation/de-allocation process occurs in non-real-time so as to avoid impeding transaction flow. In this case, depletions of a market-maker's risk account are logged and mitigating measures are enacted after the fact, such as at the end of the trading day. In yet another alternative embodiment, the allocation/de-allocation process occurs in non-real time so as not to impede transaction flow until the level of risk units remaining in the risk account falls below a particular threshold. At that point, the process becomes real-time, allocating and de-allocating risk units so as to ensure that the market participant does not over-extend themselves.

In one embodiment, the fluctuations in the level of risk units in the risk account are monitored. For example, large swings in the risk balance are flagged as an indication of a problem. These fluctuations, or deltas, may be accumulated across periods where the risk balance is reset.

In one embodiment, the amount of risk allocated for a given transaction is fixed. Alternatively, the amount of risk allocated may be dynamic. For example, in determining the amount of risk units to allocate for a given transaction, the system may look at the parameters of the transaction, as well as other transactions, such as total executed quantity, the number of fills, the number of quotes at least filled once, value/settlement date, e.g. for a forward-type product, such as an FX contract, the settlement date of the obligations therein, or combinations thereof. These parameters, or derivative values thereof, such as an absolute value or running average across multiple transactions, may be analyzed over a particular fixed or variable time period, such as one minute, one hour or the trading day. Alternatively, or in addition to, characteristics of the trading entity may be evaluated in determining the amount of risk allocated, such as the credit rating/history of the market participant. Further, risk allocation may occur on a progressive basis, e.g. the amount of risk allocated may increase with each subsequent transaction, based on the number of outstanding transactions or the frequency of transactions, reflecting the extent of the trading entity's overall exposure and the cumulative risk involved.

Figure 11:
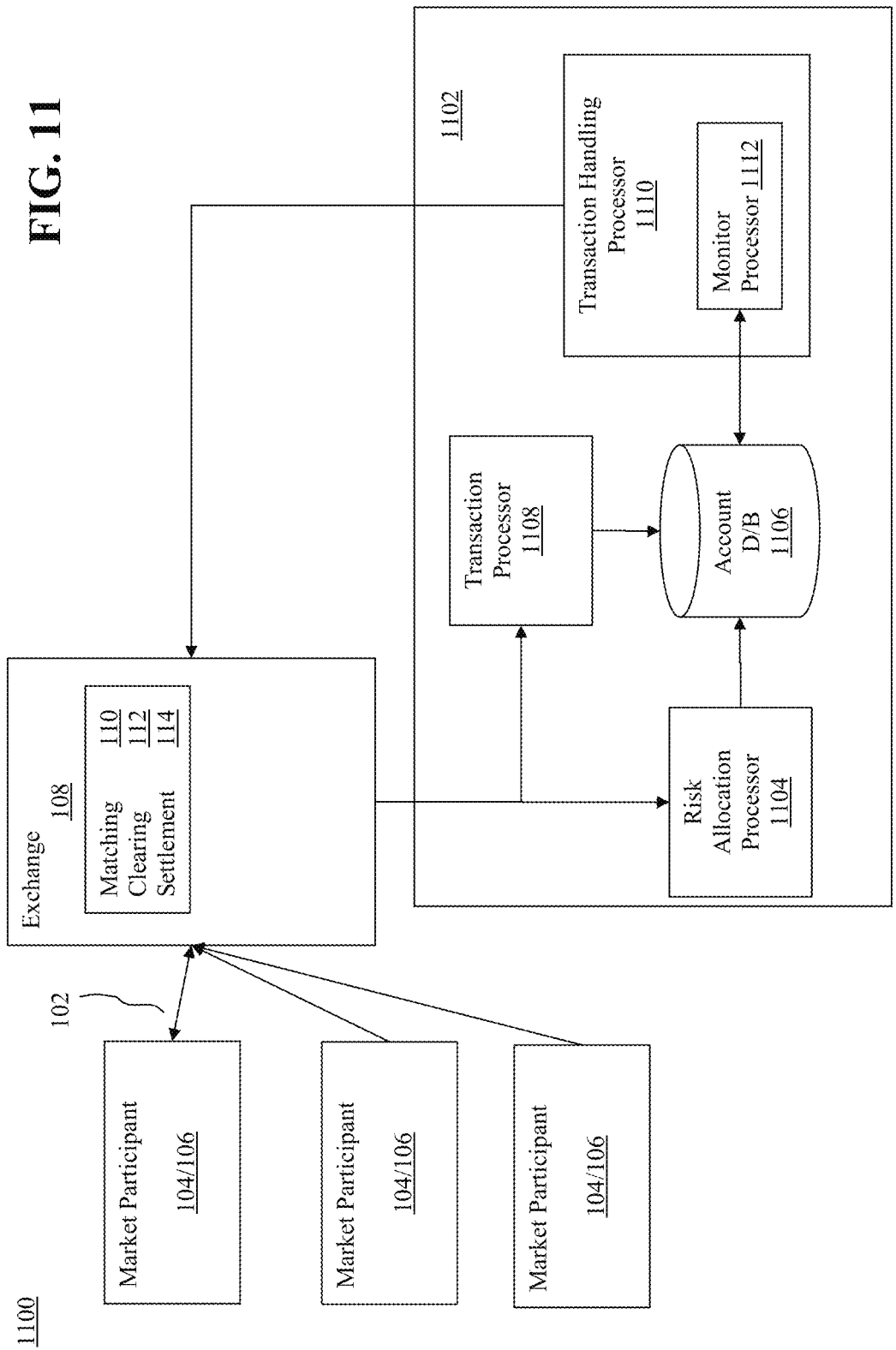
FIG. 11 depicts a block diagram of an exemplary system of managing risk undertaken by market participants according to one embodiment.

FIG. 11 depicts a block diagram of an exemplary system 1100 of managing risk undertaken by market participants 104/106 transacting via an Exchange 108 according to one embodiment. The system 1100 includes a risk management system 1102 which includes a risk allocation processor 1104, a transaction processor 1108 and a transaction handling processor 1110, all coupled with the Exchange 108 and further coupled with an account database 1106.

The risk allocation processor 1104 is operative to allocate an amount of risk to the market participant, the allocated amount of risk being stored in an account, e.g. a "risk account" in the account database 1106, also referred to herein as a risk bank. In one embodiment, the risk allocation processor allocates an amount of risk based on a credit rating of the market participant. Alternatively, or in addition thereto, the risk allocation processor allocates an amount of risk based on the maximum liability the market participant may be expected to satisfy. The amount of risk that is allocated may be for a fixed or variable period of time or for a fixed or variable number of transactions, or a combination thereof, after the elapse of which, the amount is reset or reallocated. Alternatively, the allocation may be a one-time allocation.

The transaction processor 1108 monitors transactions by the market participants undertaken with the Exchange 108 and reduces or deducts from the stored allocated amount of risk, an amount based on a transaction proposed by the market participant. In one embodiment, the proposed transactions are reviewed and used as the basis for risk account adjustments. Alternatively, completed pending transactions, e.g. the proposed transaction has been accepted but not yet matched, may be reviewed. The transaction processor 1108 then stores the reduced allocated amount of risk in the account in place of the stored allocated amount of risk, effectively reducing the amount of risk allocated in the account for future transactions as will be described. In one embodiment, the amount of risk deducted from the account is fixed, i.e. each transaction causes the same amount of risk to be deducted. Alternatively, the amount of risk that is deducted may be based on the proposed transaction, e.g. based on a risk assessment of the proposed transactions, such as an assessment of the credit worthiness or transaction history of the transacting parties and/or the volatility of the particular market, or other factors or combinations thereof.

The transaction processor 1108 is further operative to determine that the proposed transaction has been concluded, e.g. matched and completed, and, based thereon, increase the stored allocated amount risk. In this way, the risk amounts are only allocated for open transactions that have not yet been accepted/matched. The risk amount is then credited back to the risk account in the account database 1106 upon conclusion of the transaction and, thereby, elimination of the risk therein.

The transaction handling processor 1110 further includes a monitor processor 1112 coupled with the account database and operative to determine if the stored allocated amount of risk has been depleted by the reductions made by the transaction processor 1108. In one embodiment, the monitor processor may generate a warning message, such as via electronic mail or via the market participant's trading interface, to the market participant that the stored allocated amount of risk is nearing depletion. The threshold for the warning may be fixed, defined by the market participant 104/106, the Exchange 108, may vary, such as based on the credit history of the market participant, or combinations thereof.

In response to the depletion of the risk account of the market participant 104/106, or when the amount of risk in the account falls below a defined threshold, as determined by the monitor processor 1112, the transaction handling processor is operative to take an action in accordance with the determination. Exemplary actions include alerting the market participant when the stored allocated amount of risk has been depleted, blocking the proposed transaction when the stored allocated amount of risk has been depleted, or combinations thereof.

In one embodiment the risk management system 1102 includes one or more processors (not shown), one or more memories (not shown) and/or other storage media coupled with the one or more processors and a network interface (not shown) coupled with the one or more processors and a network operative to facilitate communications therebetween and with the Exchange 108 and market participants 104/106. Each of the risk allocation processor 1104, transaction processor 1108, transaction handling processor 1110, monitor processor 112 and account database 1106 may be implemented in hardware, software/logic or a combination thereof. While various components are discussed in terms of their discrete functions, it will be further appreciated that one or more of the described functions may be implemented in a single component or any one function may be performed by multiple discrete components, or combinations thereof, and is implementation dependent.

For example, the risk management system 1102 may include a processor and a memory coupled with the processor, wherein: first logic is stored in the memory and executable by the processor to allocate an amount of risk to the market participant, the allocated amount of risk being stored in an account in the memory; second logic is stored in the memory and executable by the processor to reduce the stored allocated amount of risk based on a transaction proposed by the market participant; and third logic is stored in the memory and executable by the processor to determine if the stored allocated amount of risk has been depleted by the reduction and act in accordance with the determination.

Figure 12:
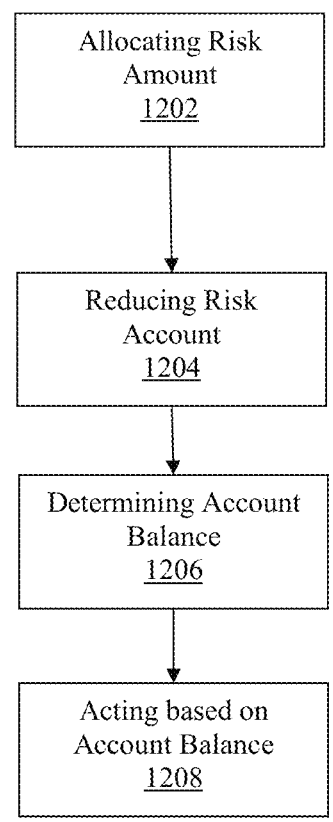
FIG. 12 depicts a flow chart showing the operation of the system of FIG. 11 according to one embodiment.

FIG. 12 depicts a flow chart showing exemplary operation of the system of FIG. 11 according to one embodiment. The operations of protecting a market participant participating in a market include allocating an amount of risk to the market participant, the allocated amount of risk being stored in an account (block 1202). In one embodiment, the allocation is based on a credit rating of the market participant. Alternatively, or in addition thereto, the allocation may be based on the maximum liability the market participant may be expected to satisfy. The operations further include reducing the stored allocated amount of risk based on a transaction proposed by the market participant (block 1204), such as by determining a first amount of risk associated with the proposed transaction and deducting the first amount of risk from the stored allocated amount of risk. Further, the reduced allocated amount of risk may be stored in the account in place of the stored allocated amount of risk. In one embodiment, the first amount is fixed. Alternatively, the first amount may be based on the proposed transaction. The operations also include determining if the stored allocated amount of risk has been depleted by the reduction (block 1206) and acting in accordance therewith (block 1208). The determining may further include warning the market participant that the stored allocated amount of risk is nearing depletion. The acting may include alerting the market participant when the stored allocated amount of risk has been depleted and/or blocking the proposed transaction when the stored allocated amount of risk has been depleted. In one embodiment, the operations further include determining that the proposed transaction has been concluded and increasing the stored allocated amount risk based thereon. In another alternative embodiment, the amount of risk may be re-allocated to the market participant after an elapse of a period of time.

In one embodiment, the market maker protections include those provided by the CME Falcon trading engine and include protections specified in Table 2 below.

TABLE 2

| | | |
|---|---|---|
| 10. | Falcon provides Enhanced Market Maker Protection | |
| 10.1 | Falcon restricts the number of fills, the number of matched trades, or the number of contracts occurring within a CME defined time interval. | |
| | 10.1.1 | The restriction time is defined at the Group Level. |
| | 10.1.2 | Market Maker protection applies to MASS QUOTER's only. |
| | 10.1.3 | Market Maker Protection (MM Protection) applies to incoming Mass Quotes and resting Mass Quotes only. |
| | 10.1.4 | Market Maker Protection applies to each side of a Quote separately. Note: Market Maker Protection does not apply to Orders submitted by a Market Maker. |
| | 10.1.5 | The CME defined time interval (variable N) is input via FAS and is applied at the Group level. |
| | 10.1.5.1 | The variable N is only applied to Products eligible for Mass Quotes. |
| | 10.1.5.2 | The variable N is based on a Trading Engine established heartbeat. |
| | 10.1.5.3 | The heartbeat will commence randomly at start-up. |
| | 10.1.5.3.1 | The heartbeat will commence at the same time for each Group. |
| | 10.1.5.4 | The variable N may be changed on a real-time basis. |
| | 10.1.5.4.1 | A variable N change takes place at the end of the current N period. |
| | 10.1.5.5 | The variable N is maintained for MASS QUOTERs at the Group Level. |
| | 10.1.5.6 | N resets at the end of N time period, whether market action occurs (execution/quote entry/etc.)or not. |
| | 10.1.5.7 | Mass Quoters setting/resetting MM Protection to Y enter the N time period in progress. Note: no unique N time clock for MQ. |
| | 10.1.5.8 | N variable is maintained at Millisecond level-ssSSSS. |
| 10.2 | Falcon realizes three protection mechanisms applied at the group level for MASS QUOTERs: New Fill Protection (X), Execution Protection (Y), Quantity Protection (Z) | |

TABLE 2-continued

| | | |
|---|---|---|
| | 10.2.1 | New Fill Protection (X)-Falcon tracks the total new quote executions per new quote side for all instruments within a Group for a MASS QUOTER. |
| | 10.2.1.1 | A count starts at 1 for a Group when an execution occurs for a new quote side. |
| | | 10.2.1.1.1    The size of the executions and number of executions do not affect the count for the specific instrument's quote side. |
| | | 10.2.1.1.2    Executed Cancel/Replace and New Mass Quotes occurring within the N time period for an instrument's quote side within a group increment the count by 1. |
| | 10.2.1.2 | The count increments by 1 for a Group for every execution occurring against a new quote on a quote side for an instrument group within the N time interval.<br>Note: New quote is defined a modification of an existing quote or a quote entered after a total fill for an instrument. |
| | 10.2.1.3 | New Fill Protection (X) is determined by the MASS QUOTER and is modifiable at the FAS. |
| | | 10.2.1.3.1    Setting the New Fill Protection to 0 turns off the protection. |
| | 10.2.1.4 | The count X is reset every time a new N time interval starts. |
| | 10.2.1.5 | Mass Quote Cancels do not impact the value of X. |
| | 10.2.1.6 | MM protection is triggered when X is greater than or equal to the MASS QUOTER defined X value. |
| | 10.2.2. | Execution Protection (Y) -Falcon tracks the total number of executions per quote side for all instruments within a Group for a MASS QUOTER. |
| | 10.2.2.1 | A count starts at 1 for a Group when an execution occurs for a quote side. |
| | 10.2.2.2 | The count increments by 1 for a Group for every execution occurring against a quote on a quote side for an instrument (in the Group) within the N time interval. |
| | 10.2.2.3 | Execution Protection (Y) is determined by the MASS QUOTER and is modifiable at the FAS. |
| | | 10.2.2.3.1    Setting the Execution Protection (Y) to 0 turns off the protection. |
| | 10.2.2.4 | The count Y is reset every time a new N time interval starts. |
| | 10.2.2.5 | Mass Quote Cancels have no impact on the value of Y |
| | 10.2.2.6 | MM protection is triggered when Y is greater than or equal to the MASS QUOTER defined Y value. |
| 10.2.3 | | Quantity Protection (Z) -Falcon sums the total quantity of executed trades per quote side for all instruments within a Group for a MASS QUOTER. |
| | 10.2.3.1 | Aggregation starts for a Group when an execution occurs for a quote side. |
| | 10.2.3.2 | The sum increases for a Group by the trade quantity amounts occurring against quotes on a quote side for an instrument (in the Group) within the N time interval. [Note: quantity in instrument, not leg totals of instrument] |
| | 10.2.3.3 | Quantity Protection (Z) is determined by the MASS QUOTER and is modifiable at the FAS. |
| | | 10.2.3.3.1    Setting the Quantity Protection (Y) to 0 turns off the protection. |
| | 10.2.3.4 | The sum Z is reset every time a new N time interval starts. |
| | 10.2.3.5 | Mass Quote Cancels have no impact on the value of Z |
| | 10.2.3.6 | MM protection is triggered when Z is greater than or equal to the MASS QUOTER defined Z quantity value. |
| 10.3 | | Market Makers determine the X, Y, and Z values at the Group Level. |
| 10.3.1 | | Falcon engine maintains the MM defined X, Y, Z values at the Group Level. |
| 10.3.2 | | X, Y, Z values are entered and maintained via the FAS at the Group level. |
| 10.3.3 | | X, Y, Z values are modifiable on a real-time basis. |
| | 10.3.3.1 | Changes do not take effect until the end of the N time period. |
| 10.3.4 | | X, Y, and Z data type is Long |
| 10.3.5 | | X, Y, and Z values can be between 0 and max. value. |
| 10.3.6 | | X, Y, and Z cannot be negative. |
| 10.3.7 | | If the Fill Protection count is greater than X, or the number of executions greater than Z, or the quantity of contracts traded is equal to or greater than Y per Group within the N interval, MM Protection is triggered. |
| | 10.3.7.1 | When MM Protection is activated, Falcon cancels the Quotes for all instruments within the Group for the MASS QUOTER's SenderCompID. |
| | 10.3.7.1.1 | Quote Entries within the Mass Quote message which trigger MM protection are cancelled and added to the Number of Cancels Accepted field. Cancel/Replace QuoteEntries are only counted once. |
| | 10.3.7.1.2 | The QuoteEntry which triggers MM Protection generates an execution. |
| | 10.3.7.1.3 | Any remaining quantity is cancelled and added to the Number of Cancels Accepted field. |
| | 10.3.7.2 | Falcon sends a Mass Quote Cancel Confirmation message with a Quote Status of F. |
| | 10.3.7.3 | MM Protection is not enforced when the X, Y, Z variables are met in mid-matching. |
| | 10.3.7.4 | MM Protection is triggered after the quote which causes the X, Y, or Z variable to trigger completes a matching process. |
| | 10.3.7.5 | Mass Quote messages which trigger MM Protection are returned an Ack before cancellation message. |
| 10.3.8 | | When MM Protection is triggered, Falcon does not accept any new Mass Quotes for a MASS QUOTER in the triggered Group. |
| | 10.3.8.1 | Falcon rejects Mass Quotes for the MASS QUOTER in the Group.<br>Message Reject Code and Reason Text will denote that MM Protection has been initiated.<br>Message Reject Code = 00<br>Message Reason Text = " " |
| | 10.3.8.1 | Falcon accepts Quotes in the triggered Group if the Market Maker Protection reset flag Tag 9773 has been reset to Y in a Mass Quote Msg by the MASS QUOTER. |
| | 10.3.8.1.1 | The value received from the MASS QUOTER is echoed back to the MASS QUOTER. |
| | 10.3.8.1.2 | If the value of the reset flag is N and MM Protection is in effect, Falcon sends the following reject:<br>Quote status = 5<br>Reject code = 98<br>Reason Text = "Market Maker Protection" |

TABLE 2-continued

| | |
|---|---|
| 10.3.8.1.3 | After the MASS QUOTER submits the Protection Reset flag set to 'Y', they may continue to enter Mass Quotes with the flag set back to 'N'. |
| 10.3.8.2 | Falcon accepts Quotes in the triggered Group if the Market Maker Protection reset flag Tag 9773 has been reset to Y for the MASS QUOTER by the GCC via FAS. |
| 10.3.8.3 | The MM Protection is triggered if an inbound Mass Quote message contains more than 110 invalid quotes. |
| 10.3.8.3.1 | If more than 110 quotes within a Mass Quote message are invalid, the Falcon rejects the entire message and cancels all resting quotes in the Group for the MASS QUOTER. |
| 10.3.8.3.1.1 | Reject and cancellation occur whether MM Protection flag is on or off. |
| 10.3.8.3.1.2 | Mass Quote Cancel Confirmation Message set as follows: Cancel Status = "F", Reject_Code = 00, Reason_Text = " " |
| 10.3.8.3.1.3 | Falcon will continue to reject Mass Quotes until the MASS QUOTER receives a Protection reset flag in a Mass Quote Message |
| 10.3.8.3.1.4 | Subsequent Mass Quotes Messages received before reset will be rejected and sent a Mass Quote Confirmation message with a Quote Status of 5. Message Reject Code = 98 Message Reason Text = "Market Maker Protection" |
| 10.3.8.4 | In the event of a Falcon Engine restart, new MassQuote Messages are accepted regardless of the Protection Reset flag. |
| 10.3.8.5 | Falcon does not reset Market Maker Protection status when entering the close or pause state. |
| 10.3.8.6 | Falcon does reset Market Maker Protection on the last scheduled close of a trading week. |
| 10.3.8.7 | MM Protection is on if X, Y, Z has values present. |
| 10.3.8.8 | MM Protection is off if X and Y and Z have 0 values. |
| 10.3.8.9 | MM Protection default value is 0 for X and Y and Z. |
| 10.4 | Over two N time periods, the worst case exposure for a Mass Quoter is two times the X or Y or Z variable minus 2 of that variable. |
| 10.5 | Falcon executes ACKs for MQ quotes before Canceling when MM Protection is triggered. |

In the disclosed embodiments, the Market Data functionality ensures that market data is efficiently and accurately communicated to the market participants. All market data for these markets may be in notional terms, i.e. expressed as the face value of the underlying instruments on which derivatives are traded, but other representations may be used.

Market data for the Central Limit Order Book may include:

The market depth of the Top of Book MA message (and Implied Top of Book MY message) at 5.
Consolidated fills
Spreads and legs and/or spread quantities Market data for the Directed RFQ may include:
The request message (and expiration message);
The fill and fill price.

In the disclosed systems, quotes and order book updates are anonymous and Traders cannot directly advertise their quotes.

Market statistics may include:
Update volume, high, low, last from central limit order book;
For block trades in this market, the market data statistics, such as the overall volume, high, low and last, will be updated based on the existing rules (these rules are defined in the EOS 2.0 RFC/Blocks feature set);
For Directed RFQ In the disclosed embodiments, for Swap trades, market data for Spot and the Forward outright legs is disseminated. For reciprocal markets, those which use a Spot from another associated market, this market data must be rounded in some fashion.

In the disclosed embodiments, the Trade Data functionality ensures that trade and order data is efficiently and accurately communicated to the market participants.

Consolidated fill notifications need to be distributed immediately after a match, independent of the venue the match occurred:
Notification to the front-end;
Notification to the clearing house;
Notification to the trade (account) owner's clearing firm;
Notification to a trader's back office system (open question);
Notification to market data (conditional on venue);
Consolidated Fill:
Front-end—sending only a single fill notification per aggressor order, per price level, regardless of the number of counterparties;
This could be accomplished either via modifying existing iLink FIX messages (and overall messaging model) or via message aggregation on the front-end;
Back-end—similar to the front-end consolidation, there would only be a single notification per aggressor order, per price level, regardless of the number of counterparties and individual trades involved. It may be critical to this portion of the Consolidated Fill is that the consolidation rules match the Front-end rules exactly.
Fill notifications should include
Forward swaps—the Swap with the differential, the Spot leg with its associated value date, and the forward leg with its associated value date.
This will require either using the D1 message (as well as the M1) from the Match Engine to Clearing, or a new interface/message altogether. D1 and M1 are trade messages sent by the trading engine to the clearing and reporting organizations. See the Section below on Clearing/Settlement for more information;
Spot contracts—the generic Spot contract and its associated value date;
Forward out-rights—the generic forward out-right, and it's associated value date.

In the disclosed embodiments, counterparty information may not be included in the fill notification:
To the front-end;
To the clearing firm.
Trade reporting maintains the original trade price & date to match cash market convention. Trade reporting is currently done via FIX ML and TREX, while the industry standards in OTC FX such as TOF, TWIST, & SWIFT. In the disclosed embodiments, clearing supports trade messages in these major OTC FX formats. In one embodiment, DealHub or a similar service can be used to convert from an originating CME format to one of these OTC FX standards.

Trade reporting is done in notional amount, rather than in quantity of the contract, using FIX ML as an originating CME formats.

In the disclosed embodiments, the Clearing/Trade Reporting/STP functionality essentially performs the trading functions of the Exchange. Clearing handles all instrument creation & modification for the Match Engine. As noted above, the Swap contract symbols do not change daily. In one embodiment, each day the most economically appropriate end-of-day settlement prices for open contracts needs to be determined, so as to mark open positions to market. Daily settlements will result in unrealized gain/loss. Pending deliveries, unrealized losses will be collateralized (rather than daily banking of that mark-to-market amount).

The collateral requirements are based on:
The exact amount of unrealized gain/loss so far;
The maximum reasonably likely loss over the next trading day, as determined by SPAN according to parameters we set; and
CLS requirements for capital against expected settlement obligations;

Settlement/trade reporting contains information on the spread traded as well as the outright legs (with the implied linkage between legs & spread present):
Clearing will optionally compress trades, based on client/CLS need (note that this is not pre-netting, as that would zero out a buy & sell whereas compression would not);
Clearing will optionally pre-net trades, based on client/CLS need;
This pre-netting or compression can be done on a per currency level of granularity;
All settlements will be made through Continuous Linked Settlement Bank (CLS);
For normal open positions with the two-day value date convention, we will be sending transactions to CLS between 4 and 5 pm Chicago time—needs to be validated against existing OTC practices;
Normal clearing settlement-cycle timelines will not be affected and will remain 7 pm for completion of all post-trade activity prior to the second day before the value date; and
Settlement reports are generated for each clearing firm enumerating each account's specific activity.

In an alternative embodiment, support for Bilateral Credit, Give-Up's, Average Pricing (APS) and Single Line Entry of Differential Spreads (SLEDS) is provided.

Post-Trade Account number modifications are not allowed in this market

For Clearing/Trade Reporting, as mentioned above, the disclosed embodiments may use one of several options which are implementation dependent:
1. Pre-net each side by trade; or
2. Pre-net each side by trade date.

CME Clearing House can settle directly through CLS for each clearing firm. If that clearing firm has CLS standing instructions for a given account, CME can clear through CLS to the account level.

In the disclosed embodiments, the Fee functionality permits the Exchange to charge transaction fees and other wise obtain compensation for use of the provided trading mechanisms. The Fee functionality accounts for trading and other activities and appropriately obtains compensation from the transacting parties.

For the purposes of Fees, this will be a new class of market participant.

The system will have the ability to fee by the following:
Discrete quantity tiers; and/or
Aggressor orders.
All quantity is in notional terms.
This market will be a "Payout" versus a "Revenue Share"
The attributes or qualities of a Market Maker, for the purposes of Fees only, can be defined in the following terms:
SubscriberAlias—Where the order is coming from (i.e. a desk);
TraderID—Who the order is coming from; and
Account—For whom is this order.
The buy/sell file from Clearing must include the 'aggressor order' indicator as well as information about what product this trade was a part of (specifically, in the case of a Swap, the buy/sell file typically only includes the legs, with no reference to the spread).
There is the potential for a negative fee.
The Fee functionality handles the new transaction type which is the Block trade resulting from a Directed RFQ which is different from a normal Block or Ex-Pit transaction.
In one embodiment, a variable fee structure may be provided in which fees vary as a function of the risk of the transaction and/or of the trading party.
The Front-End/Distribution functionality of the disclosed embodiments include the interfaces, e.g. Application Program Interfaces ("API's"), GUI, etc. which permit the receipt of orders, Directed RFQ's, etc. from the market participants and the dissemination of trade and market data to the market participants.

Access and market data for Independent Software Vendor ("ISV") and Proprietary front-ends into the Central Limit Order Book ("CLOB") and Directed RFQ will be available through API's:
In one embodiment, CME will distribute this new market via iLink 2.0, CME's market data API, only, with the required API enhancements to encompass the new order types and this marketplace; and
This market will use the existing market data infrastructure.
API access will be made available to any approved entity as determined by FX Marketplace:
FX Marketplace must be able to prevent selected front-ends and data centers from accessing it (for example EBS);
ISVs may also be permitted to create access for authorized users (i.e. OTC market ISVs) via a GCC operated registration process. These markets are not generally available to all traders on the ISV network;
A front end may take one of three forms:
Deal with Reuters, using the existing CME interfaces (updated iLink 2.0 API, Clearing link described above, market data);
New product development, either internal or through a joint venture dependency; or
Update and existing CME front end (EOS/GL/CME.com).

In one embodiment, the front-end is browser based, rather than a stand-alone application. The front-end must know the real-time, full product definitions, inclusive of value dates for Spot and Swap markets. ISV's may also be permitted to create access for authorized users (i.e. OTC market ISV's). This system is not generally available to all traders on the ISV network.

The Distribution/Front-End system employed here would optionally conform to the Consolidated Fill guidelines mentioned above. In one embodiment, the system has the ability to deliver this information in the required industry formats currently used in the OTC FX space.

In one embodiment, additional trading functionality is provided to transacting parties. For example, in one embodiment, Implied Spreads in Currencies are provided. This function permits implying/interpolating price in one of multiple inter-related markets based on (sufficient) pricing data known in the remaining markets. Exemplary inter-related markets are: spot rate/swap rate/forward outright; cross currency (A/B, B/C, A/C) (across or within product lines), e.g. dollar/yen-yen/euro-dollar/euro; and between broken dates. In the case of an incoming order for a swap market in currency A/B, the swap is broken down into its two forward legs for said currency pair. These legs can be used to imply open interest in reciprocal markets or in those forward markets using either specific currency. The disclosed embodiments are not specific to the cash or futures market.

With FX products, the underlying currencies covered by the contracts are not carried as instruments themselves on the Exchange, i.e. the individual currencies are not instruments that are tradeable like contracts. Instead, the Exchange, in the FX context, handles trades of cross-currency instruments; e.g. forward swaps, which are based on an underlying currency-pairing, e.g. euros/dollars, yen/euro, etc. However, at any given time, a market for a particular product, i.e. currency pair, may not exist in the Exchange, i.e. no parties have submitted orders, buy or sell, for such a swap contract/combination of particular currencies, and therefore no order book yet exists. In this case, the first time an order is received for that particular currency pair, a price and an associated order book will not be available. The disclosed embodiments relate to a system that can determine the price for a previously un-traded currency pair and, if necessary, create an order book, i.e. a market for the instrument. Effectively, the disclosed embodiments imply an entirely new product from existing products upon request, thereby permitting markets to be created on the fly. This may allow for emerging markets in particular currency pairs to be recognized. In one embodiment, the process is triggered based off of a DRFQ for the particular currency pair. The DRFQ may be an indication of a potentially developing market therefore. Alternatively, an actual order, e.g. an offer to buy or sell the given instrument, may be entered in the system and trigger the disclosed mechanism. In the traditional bilateral OTC market for FX instruments, handling a new product, such as a new cross-currency swap, would require locating a trading counterparty for the instrument willing to enter into a bilateral agreement with the inquiring party. The central counterparty of the disclosed embodiments eliminates that requirement as the Exchange acts as the intermediary and establishes the marketplace for the inquiring party. In one embodiment, an assessment of the liquidity of the underlying markets for the base instruments may be factored into whether or not a new market can be created for the specified currency pair.

For example, if a DRFQ is received for a contract relating to a Canadian Dollar (CAD)/Kiwi pair, and this pairing does not exist in the Exchange, the disclosed system will locate existing "bridging" or "unifying" products/markets for the individual component currencies as paired with a common currency such as US dollars (USD) or Euros (Eur), such as a market for CAD/USD and a market for Kiwi/USD or a market for CAD/Eur and a market for Kiwi/Eur. As most currencies enjoy a swap market with either US dollars or Euros, bridging products/markets are typically available. If a bridging market is not available, it may be possible to bridge across an additional currency pair, such as the USD/Eur market, assuming a currency pairing exists that resolves to at least one of US dollars or Euros. Once two or more bridging markets are identified, the prices thereof are used to imply the market for the currency pair in question. For example, if the present market, such as the inside market (the best buy and sell price) for CAD/USD is buy at price 'A' and sell at price 'C' and the present market for Kiwi/USD is buy at price 'D' and sell at price the market, e.g. inside market, for CAD/Kiwi may be implied as buy at price 'A-B' and sell at price 'C-D'. Wherein the bridging markets include a subset of the overall available orders, e.g. the top five bids and asks, this data may be utilized, as described, to generate a set of available "virtual" orders, e.g. a set of bids and asks virtually representing the best bids and asks of the implied market. From this data, an order book for CAD/Kiwi may be created in which the market participants may trade. In one embodiment, matches among orders in this market may then be executed by executing trades in the markets for the underlying/bridging cross-currency products and crossed books across each of the separate order books, i.e. counter positions in each cross currency market, are matched.

Figure 13:
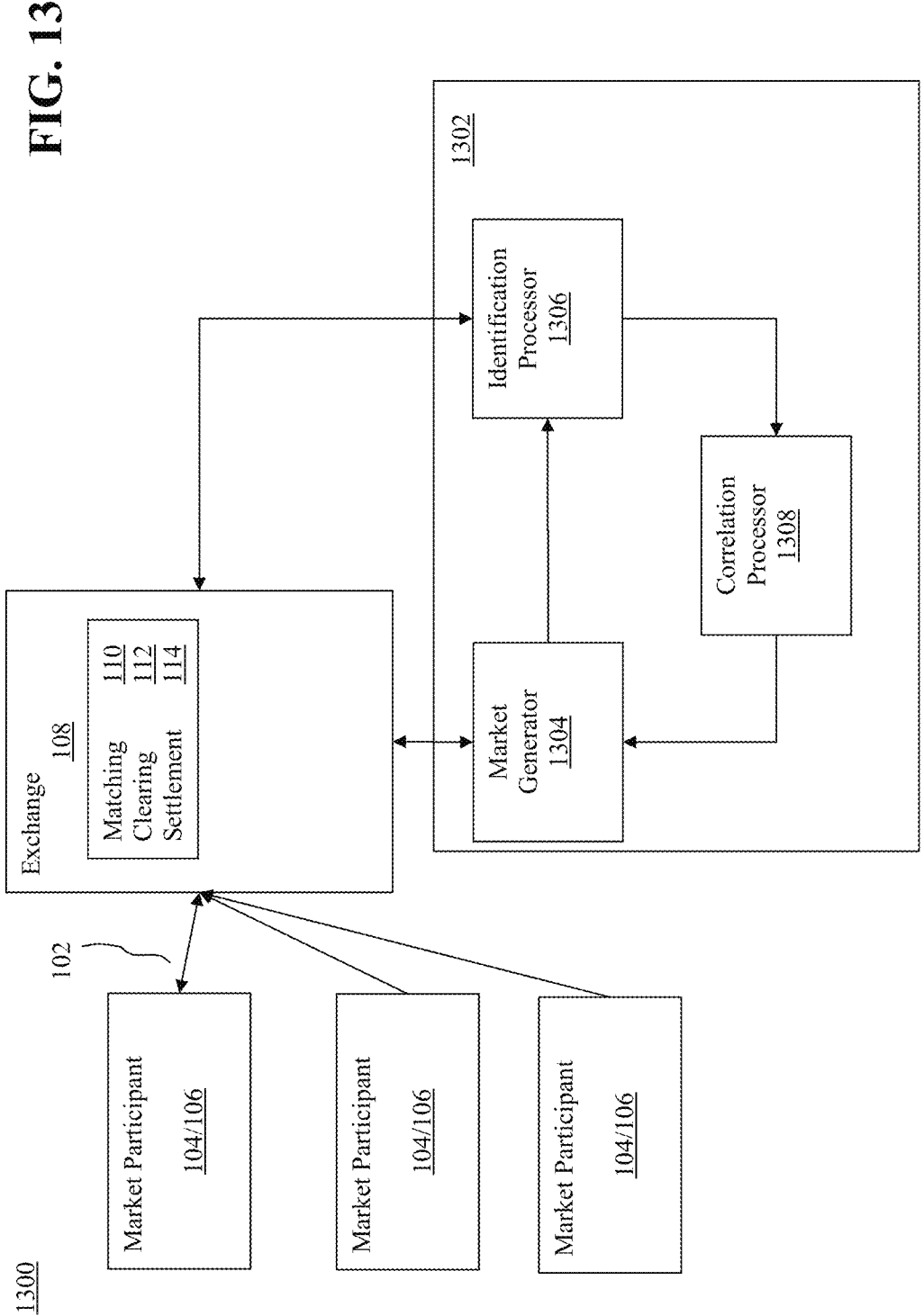
FIG. 13 depicts a block diagram of an exemplary system for providing intra-currency spreads according to one embodiment.

FIG. 13 depicts a block diagram of an exemplary system 1300 for providing intra-currency/implied spreads to market participants 104/106 transacting via an Exchange 108 according to one embodiment. The system 1300 includes an implied spread processor 1302 for determining a market for a new product, the new product comprising a relationship, such as a price spread, between first and second components, e.g. first and second currencies, such as Kiwi and Canadian Dollars, the relationship between the first and second components being undetermined at least in part, such as because the requested spread/currency pair has not been traded before. The implied spread processor 1302 includes an identification processor 1306 coupled with the Exchange 108, a correlation processor 1308 coupled with the identification processor 1306 and a market generator 1304 coupled with the correlation processor 1306, the identification processor 1306 and the Exchange 108.

In one embodiment, upon receipt of a request to transact in a particular product, such as via a request receiver (not shown) or other interface, the Exchange 108 determines whether a market for the particular product exists. If a market exists, the transaction proceeds as described herein. However, if the Exchange is unable to identify an existing market, a request is transmitted to the implied spread processor 1302 identifying the requested product. Alternatively, all transaction requests may be filtered through the implied spread processor 1302, such as via request receiver (not shown) or other interface, which determines whether a market for the requested product exists. If a market exists, the request is passed to the Exchange 108 as usual. If a market for the requested product does not exist, the implied spread processor 1302 operates as described.

The identification processor 1306 receives the request and is operative to identify a first existing, i.e. bridging, market for a first product comprising a market determined relationship between the first component, i.e. one of the currencies that is part of the requested product, and a third component, i.e. a currency that is not a part the requested product. The identification processor 1306 is further operative to identify a second existing market for a second product comprising a market determined relationship between the second component, i.e. the other currency that is a part of the requested product, and a fourth component, i.e. another currency not part of the requested product and, in one embodiment, the same as the third component/currency. The market determined relationship may include price spreads between the currency pairs.

The correlation processor 1308 is coupled with the identification processor 1306 and is operative to correlate the third and fourth components, e.g. determine that the third and fourth components are the same, i.e. the same currency, or alternatively, identify a third existing market for a third product comprising a market determined relationship between the third and fourth components, such as a Eur/USD or other bridging market.

The market generator 1304 is coupled with the identification processor 1306 and the correlation processor 1308 and is operative to generate a market for the new product by determining at least the undetermined part of the relationship between the first and second components based on the first and second existing markets and the correlation between the third and fourth components. In one embodiment, the market generator 1304 implies the price spread between the first and second components, e.g. currencies, based on the price spreads of the first and second existing markets. In one embodiment, the market generator 1304 analyzes the market depth of each of the first and second markets so as to imply or otherwise compute a corresponding market depth in the generated market, which may then be published to the market participants 104/106, i.e. made public.

For example, wherein the first existing market comprises at least one buy price and at least one sell price for the first product, the second existing market comprises at least one buy price and at least one sell price for the second product, the market generator 1304 is further operative to determine at least one buy price for the new product based on the at least one buy price of the first product and the at least one buy price of the second product, such as the difference or other mathematical relationship therebetween, and determining the at least sell price of for the new product based on the at least one sell price of the first product and the at least one sell price of the second product, such as the difference or other mathematical relationship therebetween, the market for the new product comprising the determined at least one buy and sell prices. Effectively, the market generator 1304 is further operative to imply the at least one buy price for the new product from the at least one buy prices of the first and second products and imply the at least one sell price for the new product from the at least one sell prices of the first and second products. As described, the market generator 1304 may look at the top five buy and sell prices of the first and second products in order to generate and publish a top five buy and sell prices for the new market.

In one embodiment, the market generator 1304 is further operative to create an order book for the new product to allow other market participants to transact in the particular product. The new order book is then transferred to the Exchange 108. Alternatively, the implied spread processor 1302 may further include a transaction processor (not shown) coupled with the request receiver (not shown) and the market generator 1304 and operative to complete the transaction by matching the request to suitable counter-requests in the first and second existing markets. These "component transactions" are then submitted to the Exchange in lieu of the requested transaction, thereby completing the requested transaction.

In one embodiment the implied spread processor 1302 includes one or more processors (not shown), one or more memories (not shown) and/or other storage media coupled with the one or more processors and a network interface (not shown) coupled with the one or more processors and a network and operative to facilitate communications therebetween and with the Exchange 108 and market participants 104/106. Each of the market generator 1304, identification processor 1306, and correlation processor 1308 may be implemented in hardware, software/logic or a combination thereof. While various components are discussed in terms of their discrete functions, it will be further appreciated that one or more of the described functions may be implemented in a single component or any one function may be performed by multiple discrete components, or combinations thereof, and is implementation dependent.

For example, the implied spread processor 1302 may include a processor and a memory coupled with the processor for determining a market for a new product, the new product comprising a relationship between first and second components, the relationship between the first and second components being undetermined at least in part, the system comprising a processor and a memory coupled with the processor. The system further includes first logic stored in the memory and executable by the processor to identify a first existing market for a first product comprising a market determined relationship between the first component and a third component, and identify a second existing market for a second product comprising a market determined relationship between the second component and a fourth component; second logic stored in the memory and executable by the processor to correlate the third and fourth components; and third logic stored in the memory and executable by the processor to generate a market for the new product coupled with means for identifying and the means for correlating and comprising means for determining at least the undetermined part of the relationship between the first and second components based on the first and second existing markets and the correlation between the third and fourth components. In one embodiment wherein the first existing market comprises at least one buy price and at least one sell price for the first product, the second existing market comprises at least one buy price and at least one sell price for the second product, the third logic is further executable by the processor to determine at least one buy price for the new product based on the at least one buy price of the first product and the at least one buy price of the second product and determining the at least sell price of for the new product based on the at least one sell price of the first product and the at least one sell price of the second product, the market for the new product comprising the determined at least one buy and sell prices.

Figure 14:
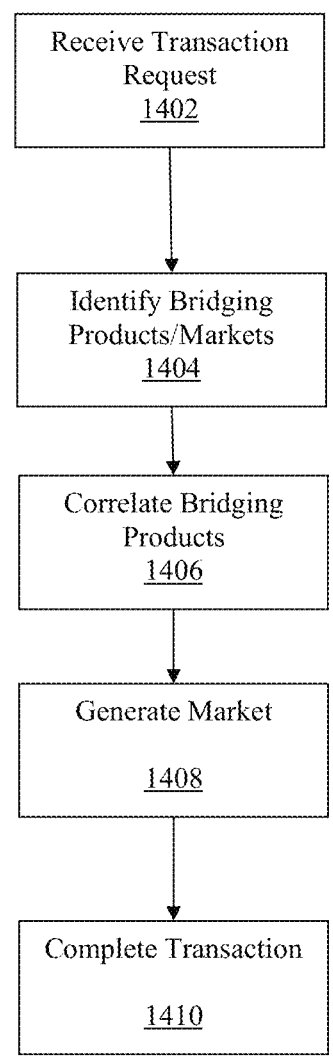
FIG. 14 depicts a flow chart showing the operation of the system of FIG. 13 according to one embodiment.

FIG. 14 depicts a flow chart showing the operation of the system of FIG. 13 according to one embodiment. In operation, the process determines a market for a new product, the new product comprising a relationship between first and second components, the relationship between the first and second components being undetermined at least in part. The process includes identifying a first existing market for a first existing product comprising a market determined relationship between the first component and a third component and identifying a second existing market for a second existing product comprising a market determined relationship between the second component and a fourth component (block 1404). In one embodiment, the first, second, third and fourth components each comprise a currency, wherein each of the relationships comprising a price spread between the associated currencies.

The process further includes correlating the third and fourth components (block 1406), such as by determining that the third and fourth components are the same or, alternatively, or in addition thereto, identifying a third existing market for a third existing product comprising a market determined relationship between the third and fourth components.

The process also includes generating a market for the new product by determining at least the undetermined part of the relationship between the first and second components based on the first and second existing markets and the correlation between the third and fourth components (block 1408). In one embodiment, wherein the first existing market comprises at least one buy price and at least one sell price for the first product, the second existing market comprises at least one buy price and at least one sell price for the second product, the generating further comprises determining at least one buy price for the new product based on the at least one buy price of the first product and the at least one buy price of the second product and determining the at least sell price of for the new product based on the at least one sell price of the first product and the at least one sell price of the second product, the market for the new product comprising the determined at least one buy and sell prices. For example, the determining may include implying the at least one buy price for the new product from the at least one buy prices of the first and second products and implying the at least one sell price for the new product from the at least one sell prices of the first and second products. Further, this process may be performed on the top five buy and sell prices of the first and second products to produce a top five buy and sell price for the new product. These prices may then be published to the market participants 104/106 to allow trading thereof.

In one embodiment, the generating further comprises creating an order book for the new product. In another embodiment, the process further includes receiving a request to transact in the new product (block 1402) and completing the transaction by matching the request to suitable counter-requests in the first and second existing markets for the first and second existing products (block 1410).

In another embodiment, Intra-Firm Match Avoidance protections are provided to monitor for and/or prevent a particular entity from transacting with itself. The system detects and/or prevents firms or traders from matching with themselves in any of the central limit order book markets. This may be accomplished using information related to the order at the trader, desk, or firm level of granularity. When an aggressor order is matching the resting book and the opposite order has been deemed to be unmatchable, there are several options: the aggressor order may be cancelled before any matching occurs; or the aggressor order matches normally and any resting order it attempts to match with, which is deemed unmatchable, may be cancelled immediately. In either case, appropriate fill and cancellation messages are sent to the parties involved, per normal operations of those actions (order cancel and trade).

An intra-firm match is a transaction where the same entity is effectively on both sides, of the transaction, e.g. the same entity has two pending opposing orders, a buy and a sell, which match. This can happen because within any given entity, there are many sub-entities which are individually authorized to place orders with the Exchange and the sub-entities, or the orders that they place, may not always identify that they are a part of the larger entity. Further, it is not always clear, based on the orders alone, that particular trading entities, are in fact, sub-entities of the same larger entity. Generally, orders are matched in an Exchange based on the nature and subject of the transaction, e.g. buy vs. sell for the same specified product at a particular price. It is further not always clear whether order placed by a given entity, referred to as a proxy entity, are in fact placed on behalf of another entity. In this case if the order matches with another entity that is in fact related to the proxy entity, rather than the underlying entity, there may be no issue. Accordingly, not all intra-firm matches are undesirable or improper but generally, where undesirable or improper matches occur, such matches result in unnecessary transaction fees, e.g. the entity could have just traded internally rather than incur the costs associated with trading via an Exchange, may be counter to the rules of the Exchange or the trading entity, and/or may have possible legal implications, e.g. the transactions may violate SEC, accounting or anti-trust rules. Identification of such intra-firm matches is therefore desirable. Once identified, various actions may be taken such as canceling the transaction or merely notifying the parties that originated the order so that they may internally resolve any systemic problems and/or avoid future occurrences. There is currently no automated method for detecting intra-firm matches. Current detection methods rely on post-transaction audits to identify these events. While such post-transaction detection may aid in preventing future occurrences of intra-firm matches, it makes dealing with the specific transactions that have already occurred difficult.

As discussed above, a given trading entity includes a collection or hierarchy of sub-entities. For example, a given trading entity may include a trading firm, a clearing firm or a trading firm that is also a clearing firm. Within trading/clearing firms, there may be one or more trading desks, traders, customers, clerks or other sub-entities or combinations thereof. Any of these entities may act, e.g. place orders, on behalf of the themselves and/or other entities, such as customers or other trading firms. For example a larger trading firm may act as a surrogate for a smaller trading firm. Further, the authority under which a given entity, or sub-entity thereof, may act may overlap with the authority granted to another entity or sub-entity. It will be appreciated, that the organization of a given entity as a collection and/or hierarchy of sub-entities may vary and that all such organizations are contemplated. As used herein, any two sub-entities are considered to be part of the same entity, or not, based on the intent of each sub-entity or the entity to which they belong. For example, two trading desks of the same trading firm, each trading on behalf of a different customer, may not be considered to be part of the same entity and transactional matches between their orders may be permitted. In contrast, two trading desks of the same trading firm, each trading on behalf of the trading firm, may be considered part of the same entity and transaction matches between their order may be denied or otherwise flagged. In addition, an entity, or sub-entity thereof, may explicitly specify other entities, or sub-entities thereof, that they wish not to trade with regardless of their affiliation, either by specifically identifying the entity or sub-entity they wish to avoid, by specifying attributes, or the type, of an entity or sub-entity they wish to avoid, or combinations thereof. For example, entities or sub-entities may specify who they will or will not trade with based on the credit risk/rating of the potential counter-party or based on a business agreement that they have in place, etc. Further, whether two sub-entities are considered to be part of the same entity, or not, may vary, such as over time. For example, during regular trading hours ("RTH"), two particular sub-entities may be considered part of the same entity for the purposes of detecting intra-firm matches. However, during extended trading hours ("ETH"), the same two sub-entities may not be considered part of the same entity, allowing for different treatment. As will be described below, the determination of sub-entities as being part of the same entity may be implemented so as to control what factors trigger a match and which do not. Alternatively, or in addition thereto, the actions selected to be performed based on a match may be implemented so as to take certain actions or not, based on other parameters. For example, the system may either be configured so as to not flag two particular sub entities as being part of the same entity or the system may be alternatively configured to take no action if the two sub-entities are determined to be part of the same entity, with the net result being substantially similar. Preventing the match from occurring as opposed to detecting the match but taking no action may each have their own advantages such as for audit or reporting purposes.

The disclosed embodiments detect the occurrence of two sub-entities of the same entity attempting to transact, referred to herein as an intra-firm match, analyze the transaction and apply one or more rules, i.e. take one or more actions, to handle the transaction. The action to be taken may be based on preferences and/or regulations of the Exchange, the participating entities, governing regulations/laws, or combinations thereof. In one embodiment, the handling of a transaction between two sub-entities of the same entity may depend on where the transacting sub-entities are, organizationally, within the hierarchy of sub-entities of the entity, e.g. two sub-entities at the same "level" may or may not be allowed to transact. Business relationships may be further considered so as to avoid any nuisance or unnecessary fees, and generally maintain a good relationship between the Exchange and the entities that trade thereon. The selected action(s) may vary dynamically based on other parameters, such as time of day described above, e.g. RTH or ETH, day of week, month, or some varying characteristic of the entities and/or sub-entities involved. For example, during RTH, intra-firm match transactions may be blocked whereas during ETH, they are permitted.

Exemplary actions to be taken when an intra-firm match is detected are: take no action and fill both orders; notify one or more of the parties involved and/or the Exchange of the detected intra-firm match where the notification may or may not identify one or more of the parties to each other; fill the order pending approval of one or more of the parties and/or the Exchange; cancel both orders; cancel one of the orders based on a defined algorithm, such as canceling the incoming/aggressor order and maintaining the resting order, canceling the smaller order, canceling one of the orders based on a priority, hierarchical or other attribute of the order; fill as much of each order against other non-intra-firm-match matching orders, on a priority or non-priority basis, and then take a defined action with any unfilled remainder; leave the orders unfilled, i.e. crossed, on the order book so as to match with other non-intra-firm-match orders (crossed orders are orders at the same price on opposite sides of a transaction that would normally match but which are prevented from doing so); complete the transaction, i.e. fill both orders, but either at a lower or zero cost or at a higher cost, possibly dependent on the relationship between the parties and the Exchange and the preferences thereof; or combinations thereof. One, or a combination, of these action may be defined as the default action to take, unless otherwise specified or overridden, in an intra-firm match situation. For example, no matter what other action is taken, the parties involved and/or the Exchange may be notified that an intra-firm match was detected.

Figure 15:
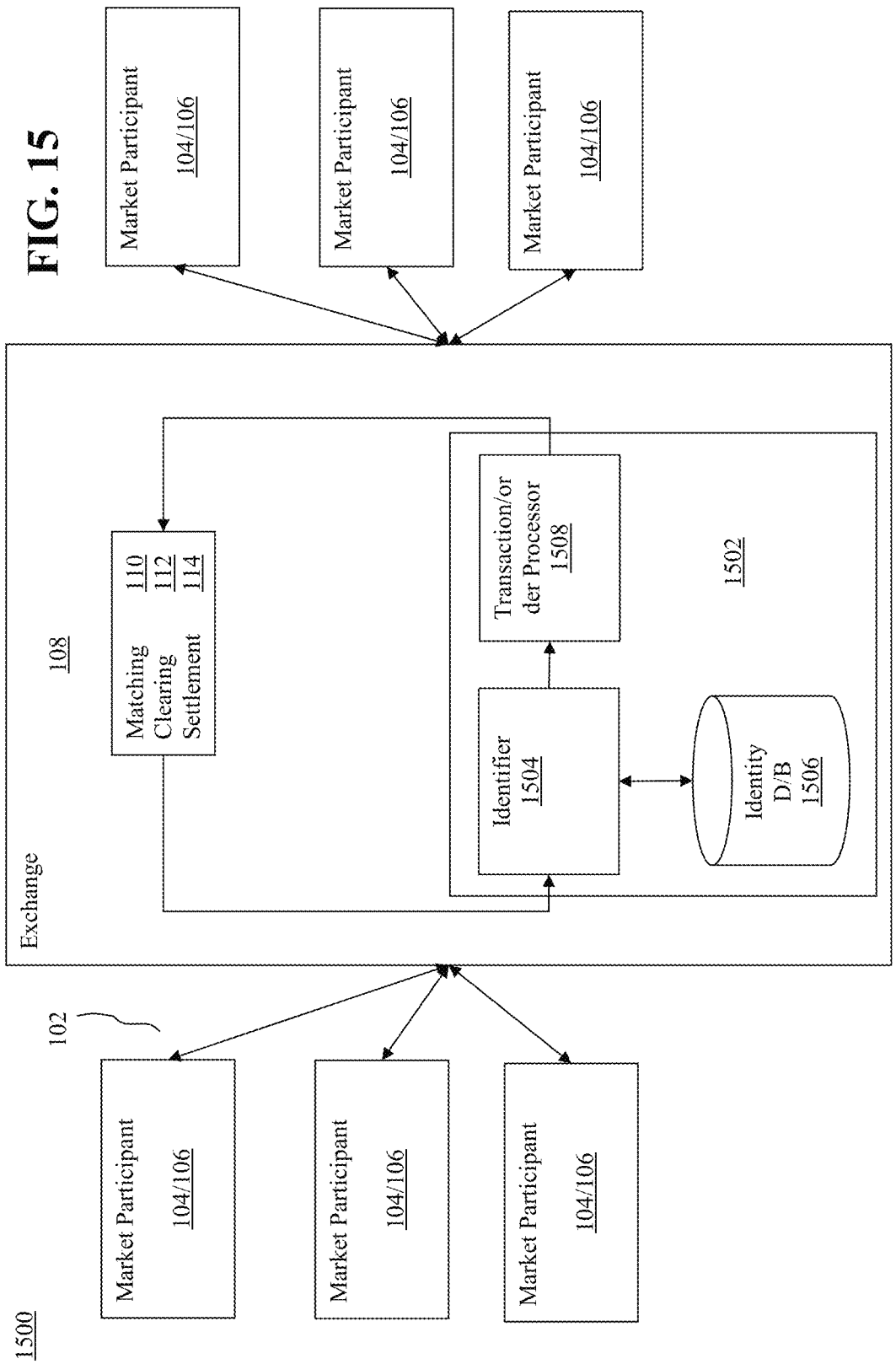
FIG. 15 depicts a block diagram of an exemplary system for handling intra-firm matches according to one embodiment.

FIG. 15 depicts a block diagram of an exemplary system 1500 for detecting and handling intra-firm matches among market participants 104/106 transacting via an Exchange 108 according to one embodiment. In order to identify intra-firm matching orders, also referred to as intra-firm matches, the system 1500 needs to be able to identify the source of a given order so as to be able to determine whether the same entities are in fact dealing with each other. Once an intra-firm match is identified, the system 1500 executes one or more defined actions and/or applies one or more rules, such as stopping the firms from matching with each other or implementing a priority matching scheme.

The system 1500 includes an intra-firm match detector 1502 coupled with the matching 110, clearing 112 and settlement 114 functionality of the Exchange 108. In particular, the intra-firm match detector 1502 is coupled with the matching engine 110 so as to intercept potential intra-firm match transactions, i.e. a first order received from a first trading entity/market participant, and a second order received from a second trading entity/market participant, before they are matched and subsequently determine what actions are to be taken. In an alternate embodiment, the intra-firm match detector 1502 may be a part of the matching engine 110. The intra-firm match detector 1502 includes an identity identifier 1504 and a transaction/order processor 1508 coupled with the identifier 1504. In one embodiment, the intra-firm match detector 1502 further includes an identity database 1506 coupled with the identity identifier 1504. The first and second trading entities may each comprise a trading firm, clearing firm, trading desk, trader, customer, clerk, or combination thereof.

The transaction/order processor 1508 is operative to establish that the first order is at least partially counter to the second order, i.e. if the orders do not match, then the trading entities and their relationship are irrelevant for the disclosed functionality since they will not match. However, if the first and second orders are at least partially matching, the identity identifier 1504, coupled with the order processor 1508, is operative to identify whether the first trading entity is permitted to transact with the second trading entity based on a relationship there between. For example, each order/transaction may include an identification code which may be used to identify the trading entity. In one embodiment, the identification code encodes identity information, such as information which identifies the trading firm hierarchy to which the entity belongs, e.g. the identification code may be a concatenation of multiple codes representative of the hierarchy of entities to which the given trading entity belongs. The identification codes of the various transactions may then be compared to determine if an intra-firm match exists. In one embodiment, the identification codes are matched and/or compared in an ordered fashion, such as by performing a logical operation on binary representations thereof, on each component identification code representative of the hierarchy of entities. For example, the codes may be related together using a logical exclusive-or function other Boolean logic, the results of which may be used to determine whether a suitable match exists. The identity identifier 1504 may be further programmed with rules as to what constitutes an intra-firm match, such as what portion of the identification codes must match, if less than all.

In an alternate embodiment, the identity identifier 1504 is coupled with an identity database 1506. Identification codes provided in the orders are used to look up the entities in the database 1506 for subsequent comparison to determine if a match exists.

Where the first trading entity is related to a third trading entity and the second trading entity is related to a fourth trading entity, the identity identifier 1504 is further operative to identify whether the first trading entity is permitted to transact with the second trading entity based on a relationship between the third and fourth entities. For example, the first trading entity may be a sub-entity of the third trading entity and the second trading entity may be a sub-entity of the fourth trading entity. In one embodiment, the first and second trading entities may be identified by the identity identifier 1504 as being related when the relationship comprises the first and second trading entities being at least part of a common entity, when the relationship comprises the first and second trading entities being the same entity, when the relationship comprises the first and second trading entities being contractually related to each other, when the relationship comprises a specification by one of the first and second trading entities of the other of the first and second entities, or combinations thereof. Where one entity specifies that transactions with another entity should result in an intra-firm match, the specification may specifically identify entities or the specification may be a general specification of a category of entities comprising the other of the first and second entities, such as a credit rating of entities that should or should not cause an intra-firm match.

The transaction/order processor 1508 is coupled with the identity identifier 1504 and operative to allow the first order to be matched to the second order where the first trading entity is identified as being unrelated to the second trading entity and the first order is at least partially counter to the second order. The transaction processor 1508 is further operative to determine an action to take with respect to the first and second orders when the first trading entity is identified as being related to the second trading entity. The action may be based on business rules that are stored in the identity database 1506, such as rules associated with either of the trading entities. The rules may be specified by the Exchange, the trading entities, government regulators, or combinations thereof.

For example, the action may include notifying the first and second trading entities of the relation, canceling the first and second orders, matching the first order to the second order, allowing the first and second order to be matched to other orders but not to each other, or combinations thereof. In one embodiment, the action may further include charging one of a standard transaction fee, a lower transaction fee, a higher transaction fee or no transaction fee.

In one embodiment the intra-firm match detector 1502 includes one or more processors (not shown), one or more memories (not shown) and/or other storage media coupled with the one or more processors and a network interface (not shown) coupled with the one or more processors and a network operative to facilitate communications therebetween and with the Exchange 108 and market participants 104/106. Each of the identity identifier 1504, transaction/order processor 1508, and identity database 1506 may be implemented in hardware, software/logic or a combination thereof. While various components are discussed in terms of their discrete functions, it will be further appreciated that one or more of the described functions may be implemented in a single component or any one function may be performed by multiple discrete components, or combinations thereof, and is implementation dependent.

For example, the of matching a first order received from a first trading entity with a second order received from a second trading entity may include a processor and a memory coupled with the processor, the system further including: first logic stored in the memory and executable by the processor to establish that the first order is at least partially counter to the second order; second logic stored in the memory and executable by the processor to identify whether the first trading entity is permitted to transact with the second trading entity based on a relationship there between; third logic stored in the memory and executable by the processor to allow the first order to be matched to the second order where the first trading entity is identified as being unrelated to the second trading entity and the first order is at least partially counter to the second order; and fourth logic stored in the memory and executable by the processor to determine an action to take with respect to the first and second orders when the first trading entity is identified as being related to the second trading entity.

Figure 16:
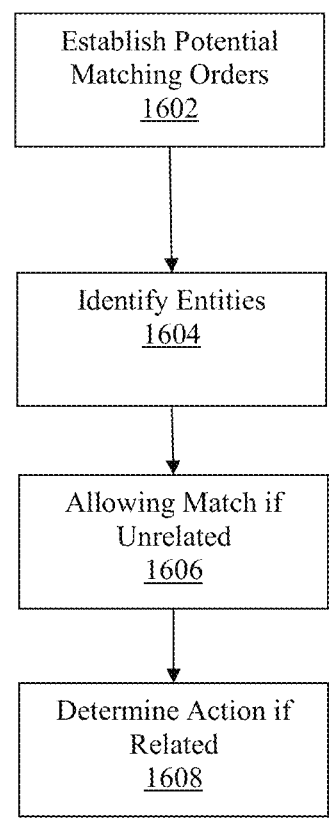
FIG. 16 depicts a flow chart showing the operation of the system of FIG. 15 according to one embodiment.

FIG. 16 depicts a flow chart showing the operation of the system of FIG. 15 according to one embodiment. The disclosed process relates to matching a first order received from a first trading entity with a second order received from a second trading entity wherein the first and second trading entities may each comprise a trading firm, clearing firm, trading desk, trader, customer, clerk, or combination thereof. The process includes establishing that the first order is at least partially counter to the second order (block 1602) and identifying whether the first trading entity is permitted to transact with the second trading entity based on a relationship there between (block 1604). Wherein the first trading entity is related to a third trading entity and the second trading entity is related to a fourth trading entity, the identifying further includes identifying whether the first trading entity is permitted to transact with the second trading entity based on a relationship between the third and fourth entities. The first trading entity may be a sub-entity of the third trading entity and the second trading entity may be a sub-entity of the fourth trading entity. The identifying may further include identifying the first and second trading entities as being related when the relationship comprises the first and second trading entities being at least part of a common entity, when the relationship comprises the first and second trading entities being the same entity, when the relationship comprises the first and second trading entities being contractually related to each other, when the relationship comprises a specification by one of the first and second trading entities of the other of the first and second entities, or combinations thereof. Where a specification is provided, the specification may include identification of a specific entity or a general specification of a category of entities, e.g. credit rating, etc., comprising the other of the first and second entities, or combinations thereof.

The process further includes allowing the first order to be matched to the second order where the first trading entity is identified as being unrelated to the second trading entity and the first order is at least partially counter to the second order (block 1606) and determining an action to take with respect to the first and second orders when the first trading entity is identified as being related to the second trading entity (1608). In one embodiment, the action comprises notifying the first and second trading entities of the relation, canceling the first and second orders, matching the first order to the second order, allowing the first and second order to be matched to other orders but not to each other, or combinations thereof. The action may further include charging one of a standard transaction fee, a lower transaction fee, a higher transaction fee or no transaction fee.

In another embodiment, Universal Pass Through is provided which allows parties to swap interest rates among currencies where the clearing house takes over the credit risk/funds transfer mechanism.

In another embodiment, shown in FIG. 5A, Flexible Hybrid Central Counter-party Cross-Margining or Cross Collateralization is supported. In particular, one-bucket and two-bucket cross-margining or collateralization processes are combined into a single streamlined process. Cross- Margining or Cross-Collateralization allows for a reduction in margin or collateral amount requirements for trading in either OTC or exchange traded derivatives markets. This reduction is possible because assessed risk is reduced when offsetting (risk-offset or 'Spreadable") positions are cleared by the same or affiliated "clearing members" or market participant firms at the cross-margin participating central-counterparty clearing organization(s).

In the present embodiment, both one-bucket and two-bucket cross-margining or collateralization processes are combined into a one streamlined and single process by combining 'One-pot Approach' and 'Two-pot Approach' to support both OTC and exchange traded derivatives clearing transactions. Process 1: 1 Pot Approach is initially achieved with two or multiple partnering parties. Process 2: 2 Pot Approach is achieved with one or multiple partnering parties dealing with risk-offset eligible positions after the process 1 is done.

Figure 5B:
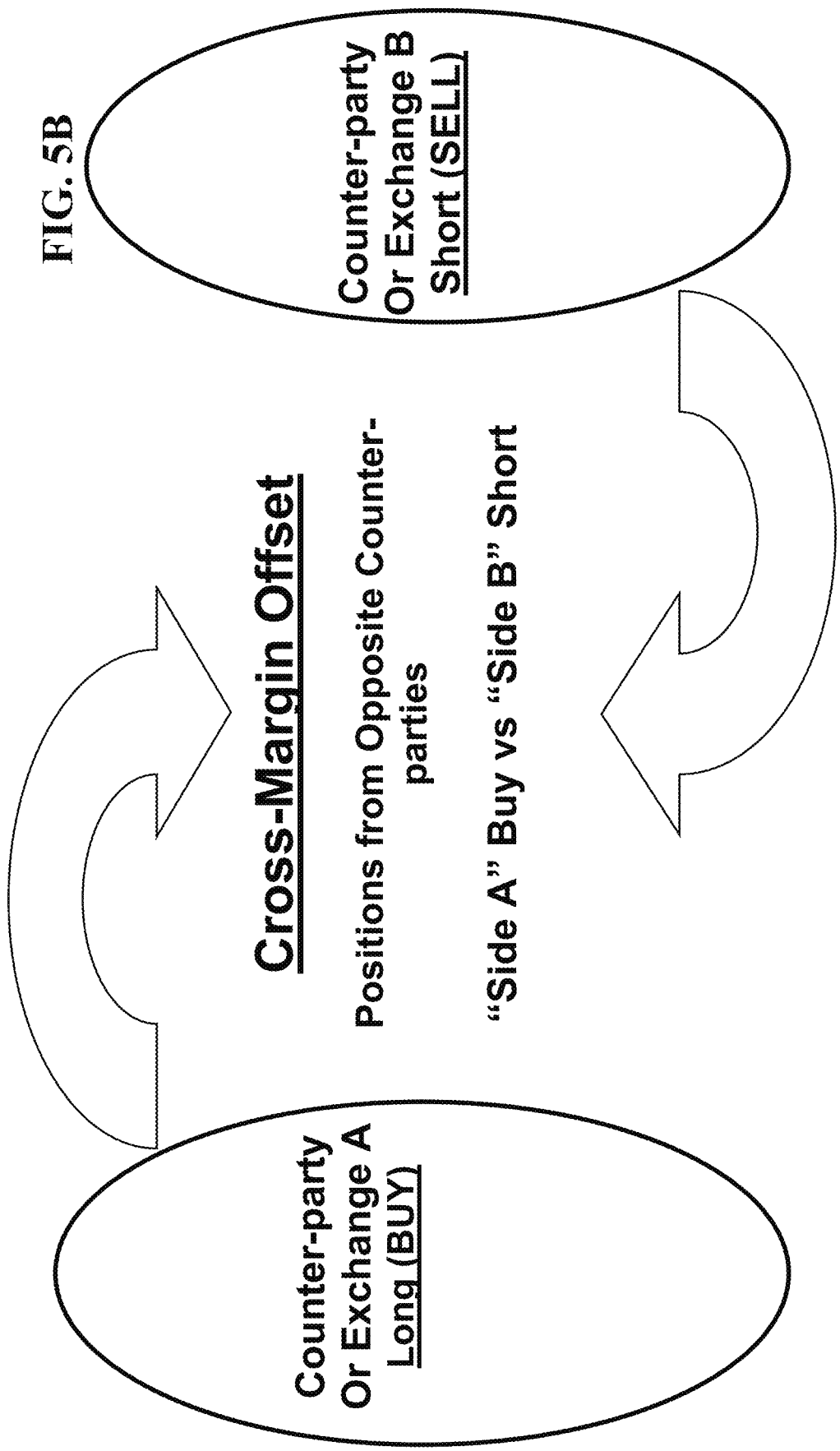

Referring to FIGS. 5B and 5C, the 1 Pot Approach is shown:
  Clearing Transactions Scope Participants: clearing members of exchange or counter-parties in the OTC market
  Multiple contracts or products of all types (both OTC and exchange traded) at different exchanges or counter-parties
  All Cross-Margin Activity=Joint Cross-Margin/collateral Account
    Identified with a Separated into Cross-Margin Origin
    It is separate from participant's normal clearing at respective clearing organizations, entities or counter-parties.
  Only ALLOW Cross-Margin/Collateral Eligible Trades to Clear in the Joint Cross-Margin/Collateral Accounts
    Trades executed directly into the Cross-Margin Accounts
    Positions can be transferred between a normal Clearing Account and Cross-Margin Clearing/Collateral Account.
    Separate Position Records/Data is submitted for the Cross-Margin process Origin
  Banking Settlement or collateralization only Dedicated to the Joint Cross-Margin Accounts
    Treated as Separate Origin
    Separate Bank Accounts, Wires, Transactions, etc.
Referring to FIG. 5D, the 2 Pot Approach is shown:
Transactions of Participating Clearing Organizations=Occurs at Each Clearing Org.+Offset Risk=2 Pot
No Joint Cross-Margin Accounts
  No Separation from Clearing Member's Primary Clearing Account at respective clearing organizations
  Hold Collateral in the Same Separate Firm Accounts
Each Participating Organization Calculates its PB Requirements, Offset and Share Offset, Gain & Loss Guarantee Information
  Positions Remain at each participating organization origin
  No Need for Position Transfer into Cross-Margin Account
  No Separate Position Change Submission (PCS) report is Needed
Transparent Transaction
  For example,
  CME offers credit on cross-margin eligible contracts for offsetting positions at the opposite clearing organizations
    Opposite Clearing Org. will offer credits on their positions.
  No Dedicated Banking Settlement for Cross-Margin Purposes
  No Separate Bank Accounts, Wires, Transactions, etc.
  Transactions become part of current banking transactions.
  In the 2 Pot approach, Cross-Margin Offsets are Calculated as follows: Internal Process for Cross-Margin Eligible Product:
  1. Do all Internal Intra-Commodity Spreading.
  2. Do all Internal Inter-Commodity Spreading.
  3. Look at the available cross-margin delta positions at other clearing organizations to see if additional spreads could be formed from CME's remaining delta positions.
  4. Allocate Prioritized Spread Credit to each Clearing Organization
    i.e. Multiple organization cross-margin program.
    Assign Priority from Highest to Lowest spread credit amounts based on the information from other participating clearing organizations.
    Calculate the Spread Allocation based on the priority.

Figure 5E:
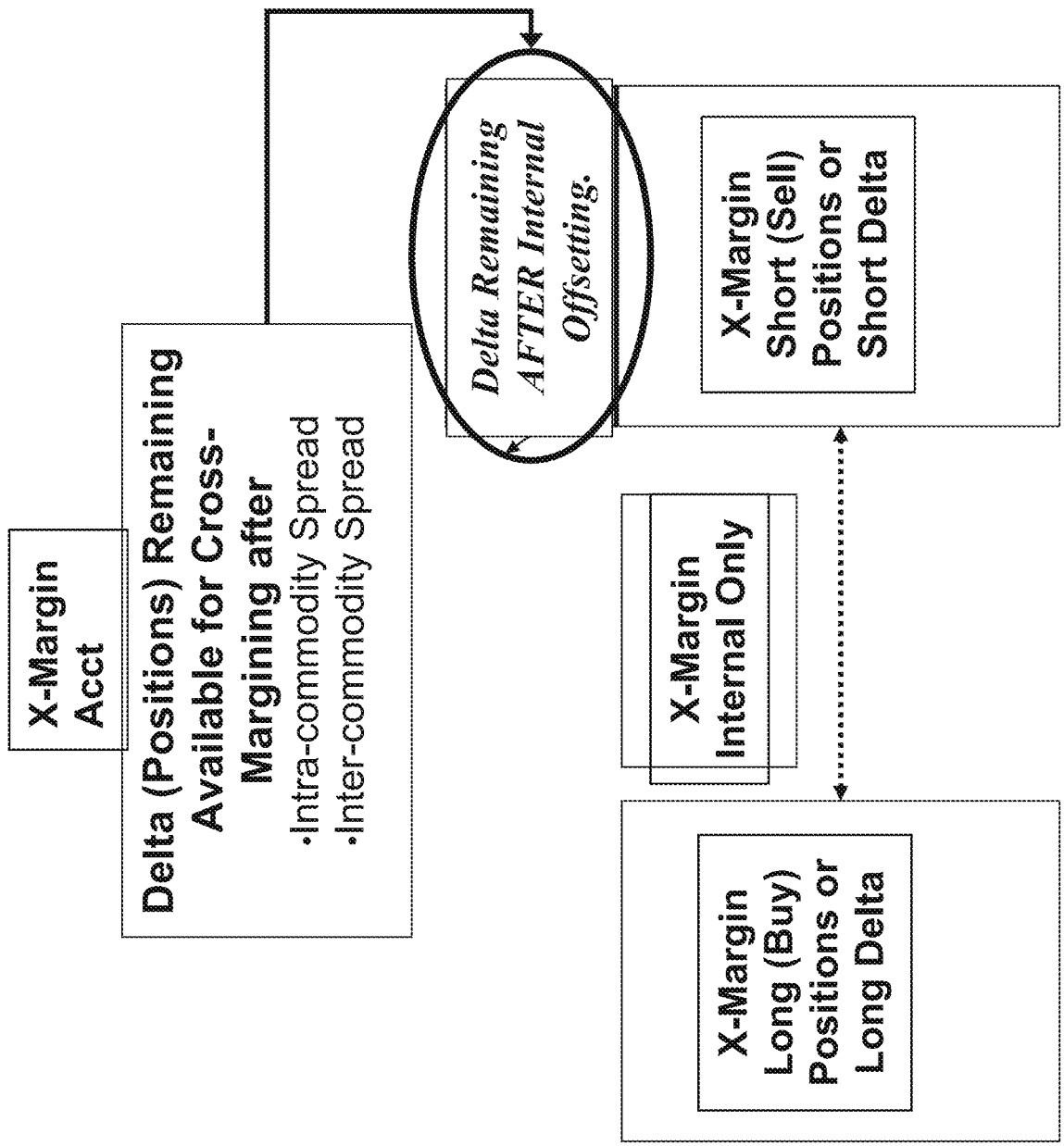
Figure 5F:
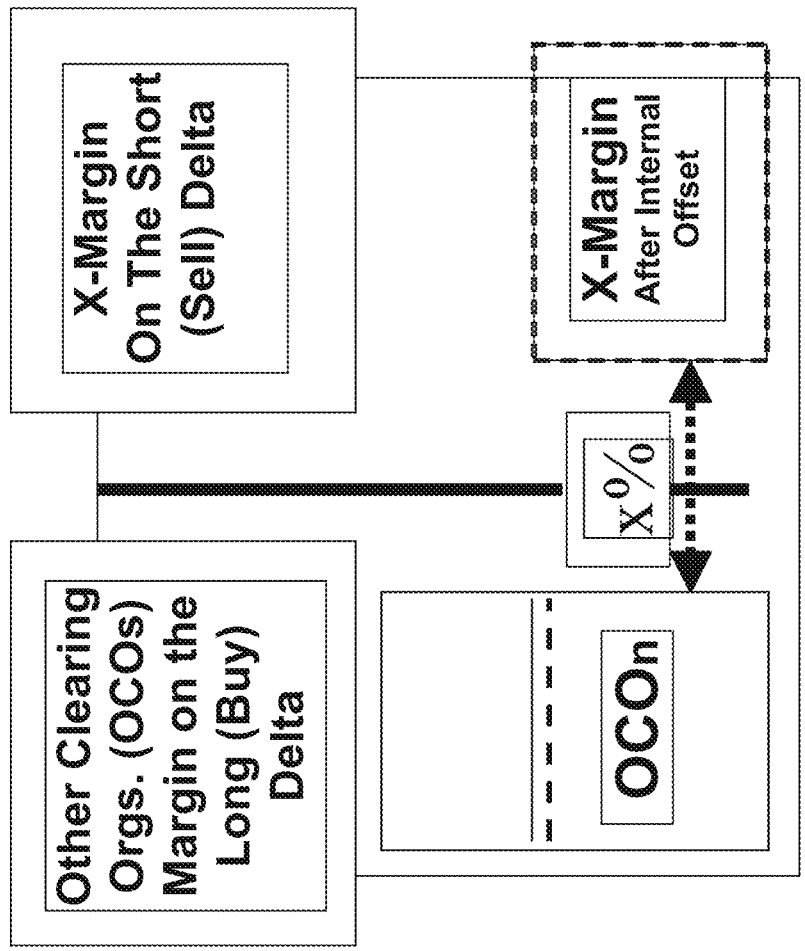
Figure 5G:
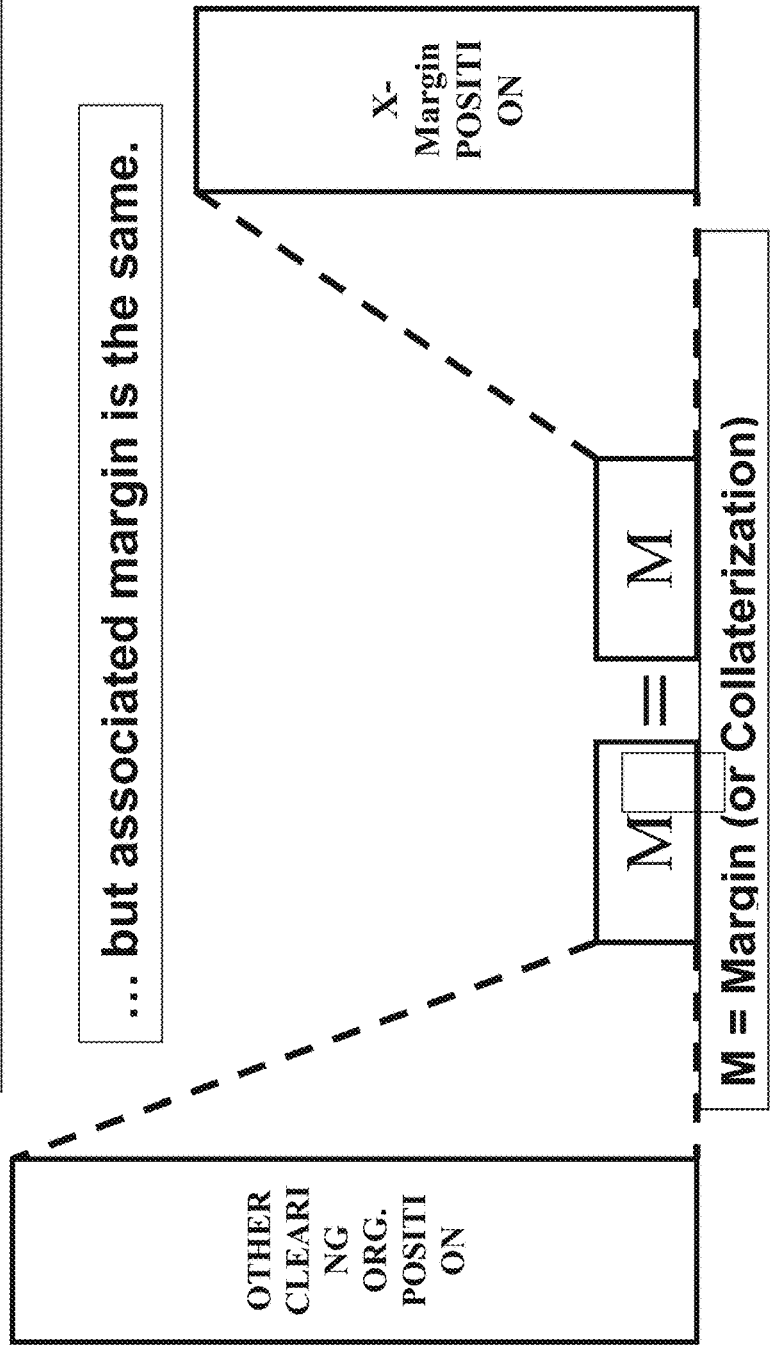

FIG. 5E shows the process for dealing with positions that were not originally offset. FIG. 5F shows how cross-margining utilizes X-margin margin that was not offset. FIG. 5G demonstrates how cross-margining matches positions of similar absolute risk at two or more clearing organizations.
Allocation of Savings on Proportional Basis:
  Cross-Margining with Multiple Organizations,
    Allocation of its Positions and Margin necessary
    Allocations Will Optimize Members' Margin Reductions
    Amounts are First Allocated to Products With Best Correlations
    If Equally Correlated, Allocations Are Pro-Rata Based on Margin Amounts Submitted by Each Clearing Organization

| Exchange | CME | LCH | GSCC |
|---|---|---|---|
| Eligible Contract | Eurodollar | Euribor | Treasury Eq. |
| Eligible Delta | 1000 | −700 | −500 |
| Spread Credit % | | 80% | 35% |
| Spreads Formed | 1000 | −700 | −300 |
| Remaining Delta | 0 | 0 | −200 |

The 2 pot approach offers the advantages of: flexibility in managing collateral is unaffected using "Two Pot" Approach; avoids legal and operational complexities of establishing and maintaining joint margin Accounts in a multiple-clearing organization cross margining environment; the ability to pledge margin collateral for liquidity purposes is unaffected; and there is no operational impact except in performing an audit trail.

In another embodiment, pricing of the swap legs, using the mid-point in the spot market is provided, with error handling where the spot market is illiquid. In particular, as used herein, "Spot" refers to the day on which deals agreed today are actually carried out. In the foreign exchange markets, spot is usually two working days ahead; so for deals concluded on Tuesday, spot is Thursday; for deals concluded on Friday, spot is Tuesday (unless bank holidays intervene). A spot deal is a simple exchange of two volumes of currency to take place two working days ahead—in other words, with a value date of spot. The foreign exchange rates commonly quoted in the media are spot rates—the rates agreed in today's spot deals. The term "Outright/Forward"

refers to a simple Forward exchange of two volumes of currency where the value date is any date other than spot. The rate for the deal is normally quoted as a premium or a discount ('negative premium') on top of the current spot rate. So the formula for the dealt rate (the rate specifying the relationship between the two volumes) is:

Dealt Rate=Spot Rate+Premium, or

Dealt Rate=Spot Rate−Discount

In a swap deal, a volume of one currency is exchanged for a volume of a second currency. After an agreed period, the transaction is reversed. It is possible for the volumes in the second 'leg' of the transaction to differ from the first. For example, a deal might specify that at spot:
Bank A pays 5,000,000 US Dollars to Bank B
Bank B pays 7,565,000 Swiss Francs to Bank A (Rate 1.5130)
. . . and that three months later:
Bank B pays 5,000,000 US Dollars to Bank A
Bank A pays 7,530,000 Swiss Francs to Bank B (Rate 1.5060)

The difference in the rates of the second currency for the two legs of the swap deal arises from differences in the deposit rates for the two currencies, and expectations about variations in the spot rates.

In one embodiment, the disclosed system will:
Price a Spot and Forwards in absolute terms (i.e. the rate); and
Price Swap in differential terms.

When a trade on a Swap occurs, the system has the agreed upon differential between the Spot and the Forward leg. At this point, the system anchors the Spot for the transaction as the mid-point between the bid/ask in the current Spot market.

Additionally, four alternative mechanisms for how to assign the leg prices to the CME FX Swaps are provided if there are no bid and ask prices for a given currency in CME FX Spot:

1. Use Reuters contributor spot FX pages (such as EUR=, JPY=, CAD=, GBP=, CHF=, AUD=) and take the average of the spot bid and ask quotations at the time of the trade;

2. Use Reuters Dealing Terminal Quotations (perhaps utilizing information from CME GFX) for the target currencies and calculate the average of the spot bid and offer to use in assigning SWAP leg prices;

3. Use a combination of Reuters Dealing Terminal Quotations for its strong currencies and CME GFX spot resources for the EBS strong currencies;

4. Use CME currency futures prices (bid and ask on CME Globex) for the nearby (most active) contract month and use Reuters forward points (or a combination of Reuters and Bloomberg forward points) to the IMM dates to strip out the synthetic spot bid and ask for pricing the CME SWAP leg prices. Simply average the bid and ask of these synthetic spot prices to assign the CME SWAP leg prices. This may be similar to CME trading floor operations' plans to use an analogous version of this technique to set CME FX futures settlement prices for the expiring months during the one-week rollover period by using the next deferred, more actively-traded CME FX futures contract prices and forward points to back out the expiring CME FX futures settlement price.) CME trading floor operations has a program that could possibly be modified to back out spot bid and asks from CME FX futures prices; or 5. Use the last price in the Spot market, through a certain age. If the last spot price was too old, this spot price would backstopped by the "daily settlement price" used to determine unrealized gains and losses (thus, never more than 24 hours old). However, number 4 above could work as an alternative for any time there is no spot, and if there are no futures bids and offers on CME Globex, then it could be backstopped by the last spot, and if no last spot price that day, could further be backstopped by the last daily settlement price.

It is therefore intended that the foregoing detailed description be regarded as illustrative rather than limiting, and that it be understood that it is the following claims, including all equivalents, that are intended to define the spirit and scope of this invention.

We claim:

1. A computer implemented method comprising:
receiving, by an intermediary via an electronic communication network, a first order from a first trading entity subsequent to receipt, via the electronic communication network, of a second order from a second trading entity, the second order having not previously been completely satisfied prior to receipt of the first order, wherein the first order comprises a first electronically encoded identifier identifying the first trading entity and the second order comprises a second electronically encoded identifier identifying the second trading entity, wherein the first and second electronically encoded identifiers are different;
prior to determining that any unsatisfied remainder of the first order is at least partially counter to another order received subsequent to the first order, establishing, by an order processor, that the first order is at least partially counter to the second order, and identifying, subsequent to the establishing by an identity identifier, that the first trading entity is not permitted to transact with the second trading entity by performing a logical computer program operation on the first and second electronically encoded identifiers based on an application of a rule which specifies a relationship which the first and second electronically encoded identifiers must satisfy resulting in a determination that at least a portion of the first electronically encoded identifier matches at least a portion of the second electronically encoded identifier; and
preventing, by a transaction processor coupled with the identity identifier, a matching engine of the intermediary from matching the first and second orders with each other when the first order is at least partially counter to the second order and the first trading entity is determined by the identity identifier to not be permitted to transact with the second trading entity.

2. The computer implemented method of claim 1, wherein the first and second electronically encoded identifiers are encoded in a binary format.

3. The computer implemented method of claim 1, wherein the first electronically encoded identifier comprises a concatenation of data identifying the first trading entity with data identifying the second trading entity and wherein the second electronically encoded identifier comprises a concatenation of data identifying the second trading entity with data identifying the first trading entity.

4. The computer implemented method of claim 1, further comprising determining that the first order is at least partially counter to at least one other order previously received from another trading entity to which the first trading entity is determined by the identity identifier to be permitted to transact and, based thereon, allowing the matching engine to match the first order and the determined at least one other order, and making any unsatisfied remainder of the first order available to match against orders at least partially counter thereto subsequently received from other trading entities to which the first trading entity is determined by the identity identifier to be permitted to transact.

5. The computer implemented method of claim 1, wherein the receiving, establishing, and preventing are performed without identifying the first trading entity to the second trading entity and wherein, upon previous transmission to the intermediary of the first order by the first trading entity, the transaction processor does not identify that the second order was submitted by the second trading entity to the first trading entity and the transaction processor does not identify that the first order was submitted by the first trading entity to the second trading entity.

6. The computer implemented method of claim 1, wherein the first trading entity is related to a third trading entity and the second trading entity is related to a fourth trading entity, the identifying further comprising identifying that the first trading entity is not permitted to transact with the second trading entity based on a relationship between the third and fourth trading entities.

7. The computer implemented method of claim 1, wherein the method further comprises determining, by the transaction processor, an action to take, the action comprising at least one of notifying, via the electronic communication network, the first and second trading entities of the relationship, canceling at least one of the first and second orders, allowing at least one the first and second orders to be matched to other orders but not to each other, or combinations thereof.

8. The computer implemented method of claim 7, wherein the action varies based on time of day.

9. The computer implemented method of claim 1, wherein the identifying further comprises identifying, by the identity identifier, the first and second trading entities as being related when the relationship comprises the first and second trading entities being at least part of a common trading entity, when the relationship comprises the first and second trading entities being the same trading entity, when the relationship comprises the first and second trading entities being contractually related to each other or when the relationship comprises a specification by one of the first and second trading entities of the other of the first and second trading entities.

10. The computer implemented method of claim 9, wherein the relationship is encoded in the first and second electronically encoded identifiers.

11. A system comprising:
an order processor operative to receive via an electronic communication network a first order from a first trading entity subsequent to receipt via an electronic communication network of a second order from a second trading entity, the second order having not previously been completely satisfied prior to receipt of the first order, wherein the first order comprises a first electronically encoded identifier identifying the first trading entity and the second order comprises a second electronically encoded identifier identifying the second trading entity and, prior to a determination of whether any unsatisfied remainder of the first order is at least partially counter to another order received subsequent to the first order, establish that the first order is at least partially counter to the second order, wherein the first and second electronically encoded identifiers are different;
an identity identifier coupled with the order processor and operative to, prior to the determination of whether any unsatisfied remainder of the first order is at least partially counter to another order received subsequent to the first order, identify that the first trading entity is not permitted to transact with the second trading entity based on performance of a logical operation on the first and second electronically encoded identifiers based on an application of a rule which specifies a relationship which the first and second electronically encoded identifiers must satisfy to determine that at least a portion of the first electronically encoded identifier matches at least a portion of the second electronically encoded identifier; and
a transaction processor coupled with the identity identifier and operative to prevent a matching engine from matching the first and second orders with each other when the first order is at least partially counter to the second order and the first trading entity is determined by the identity identifier to not be permitted to transact with the second trading entity.

12. The system of claim 11, wherein the first and second electronically encoded identifiers are encoded in a binary format.

13. The system of claim 11, wherein the transaction processor is further operative to determine whether the first order is at least partially counter to at least one other order previously received from another trading entity to which the first trading entity is determined by the identity identifier to be permitted to transact and, based thereon, allow the matching engine to match the first order and the determined at least one other order, determine whether there is any unsatisfied remainder of either the first order, and make any unsatisfied remainder of the first order available to match against orders at least partially counter thereto subsequently received from other trading entities to which the first trading entity is determined by the identity identifier to be permitted to transact.

14. The system of claim 11, wherein the first trading entity is related to a third trading entity and the second trading entity is related to a fourth trading entity, the identity identifier being further operative to identify that the first trading entity is not permitted to transact with the second trading entity based on a relationship between the third and fourth trading entities.

15. The system of claim 11, wherein the transaction processor is further operative to determine an action to take, the action comprising at least one of notifying, via the electronic communication network, the first and second trading entities of the relationship, canceling at least one of the first and second orders, allowing the first and second order to be matched to other orders but not to each other, or combinations thereof.

16. The system of claim 15, wherein the action varies based on time of day.

17. The system of claim 11, wherein the first and second trading entities are identified as being related when the relationship comprises the first and second trading entities being at least part of a common trading entity, when the relationship comprises the first and second trading entities being the same trading entity, when the relationship comprises the first and second trading entities being contractually related to each other or when the relationship comprises a specification by one of the first and second trading entities of the other of the first and second trading entities.

18. The system of claim 17 wherein the relationship is encoded in the first and second electronically encoded identifiers.

19. A system comprising:
- means for receiving, via an electronic communication network by an intermediary, a first order from a first trading entity subsequent to receipt via the electronic communication network of a second order from a second trading entity, the second order having not previously been completely satisfied prior to receipt of the first order, wherein the first order comprises a first electronically encoded identifier identifying the first trading entity and the second order comprises a second electronically encoded identifier identifying the second trading entity, wherein the first and second electronically encoded identifiers are different;
- means for establishing, prior to determining that any unsatisfied remainder of the first order is at least partially counter to another order received subsequent to the first order, that the first order is at least partially counter to the second order, and identifying, subsequent to the establishing by an identity identifier, that the first trading entity is not permitted to transact with the second trading entity by performing a logical operation on the first and second electronically encoded identifiers based on an application of a rule which specifies a relationship which the first and second electronically encoded identifiers must satisfy resulting in a determination that at least a portion of the first electronically encoded identifier matches at least a portion of the second electronically encoded identifier; and
- means for preventing a matching engine of the intermediary from matching the first and second orders with each other when the first order is at least partially counter to the second order and the first trading entity is determined by the identity identifier to not be permitted to transact with the second trading entity.

20. A system comprising:
- a non-transitory memory storing computer-executable instructions executable by a processor coupled with a network interface to cause the processor to perform operations comprising:
  - receiving, via an electronic communication network, a first order from a first trading entity subsequent to receipt of a second order from a second trading entity, the second order having not previously been completely satisfied prior to receipt via an electronic communication network of the first order, wherein the first order comprises a first electronically encoded identifier identifying the first trading entity and the second order comprises a second electronically encoded identifier identifying the second trading entity and, prior to a determination of whether any unsatisfied remainder of the first order is at least partially counter to another order received subsequent to the first order, establish that the first order is at least partially counter to the second order, wherein the first and second electronically encoded identifiers are different;
  - identifying, prior to the determination of whether any unsatisfied remainder of the first order is at least partially counter to another order received subsequent to the first order, that the first trading entity is not permitted to transact with the second trading entity based on performance of a logical operation on the first and second electronically encoded identifiers based on an application of a rule which specifies a relationship which the first and second electronically encoded identifiers must satisfy to determine that at least a portion of the first electronically encoded identifier matches at least a portion of the second electronically encoded identifier; and
  - preventing a matching engine from matching the first and second orders with each other when the first order is at least partially counter to the second order and the first trading entity is determined to not be permitted to transact with the second trading entity.

* * * * *